US012656787B2

(12) United States Patent　　(10) Patent No.:　US 12,656,787 B2
Suzuki　　(45) Date of Patent:　Jun. 16, 2026

(54) MOVING APPARATUS AND MOVING APPARATUS CONTROL METHOD

(71) Applicant: SONY GROUP CORPORATION, Tokyo (JP)

(72) Inventor: Atsushi Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 131 days.

(21) Appl. No.: 18/682,452

(22) PCT Filed: Feb. 21, 2022

(86) PCT No.: PCT/JP2022/006848
§ 371 (c)(1),
(2) Date: Feb. 9, 2024

(87) PCT Pub. No.: WO2023/021734
PCT Pub. Date: Feb. 23, 2023

(65) Prior Publication Data
US 2024/0345598 A1　　Oct. 17, 2024

(30) Foreign Application Priority Data

Aug. 18, 2021　(JP) ................................. 2021-133417

(51) Int. Cl.
*G05D 1/644*　　(2024.01)
*B62D 57/032*　　(2006.01)
*G05D 109/12*　　(2024.01)

(52) U.S. Cl.
CPC ........... *G05D 1/644* (2024.01); *B62D 57/032* (2013.01); *G05D 2109/12* (2024.01)

(58) Field of Classification Search
None
See application file for complete search history.

(56) References Cited

U.S. PATENT DOCUMENTS 9,868,210 B1 * 1/2018 Whitman ............. B62D 57/032
2015/0073592 A1 * 3/2015 Kaneko ................ B62D 57/024
901/29
(Continued)

FOREIGN PATENT DOCUMENTS

| JP | 2013-033356 A | 2/2013 |
| JP | 2013-066996 A | 4/2013 |
| JP | 2019-079375 A | 5/2019 |

OTHER PUBLICATIONS

International Search Report and Written Opinion of PCT Application No. PCT/JP2022/006848, issued on May 17, 2022, 09 pages of ISRWO.

*Primary Examiner* — Jelani A Smith
*Assistant Examiner* — Davin Seol
(74) *Attorney, Agent, or Firm* — CHIP LAW GROUP

(57) ABSTRACT

Provided is an apparatus that includes a path planning unit that determines a travel path of a moving apparatus, calculates a path cost for each of a plurality of path candidates by applying a cost calculation algorithm in which a path that enables more stable traveling has a lower cost, and determines the path candidate having the path cost that has been calculated to be the lowest cost as the travel path that is best. The path planning unit further sets a plurality of sampling points in a path, calculates a cost corresponding to each sampling point by applying the cost calculation algorithm in which the cost becomes higher as the difference between landing heights of the left and right legs at each sampling point becomes larger, and calculates an addition value of the costs of the sampling points as the path cost.

15 Claims, 38 Drawing Sheets

(56)        References Cited

U.S. PATENT DOCUMENTS

| | | | |
|---|---|---|---|
| 2017/0165836 A1* | 6/2017 | Kanazawa | G05D 1/021 |
| 2021/0278852 A1* | 9/2021 | Urtasun | G05D 1/644 |
| 2022/0203534 A1* | 6/2022 | Ma | G05D 1/0217 |

* cited by examiner

10 ROBOT

11 BODY PART (MAIN BODY PART)

21 JOINT PART

15 VISUAL SENSOR (CAMERA)

12 LEG PART

13 LANDING PART

22 JOINT PART

ADVANCING DIRECTION

FIG. 2A  FRONT VIEW

FIG. 2B  SIDE VIEW

FIG. 2C  REAR VIEW

10 ROBOT

11 BODY PART (MAIN BODY PART)

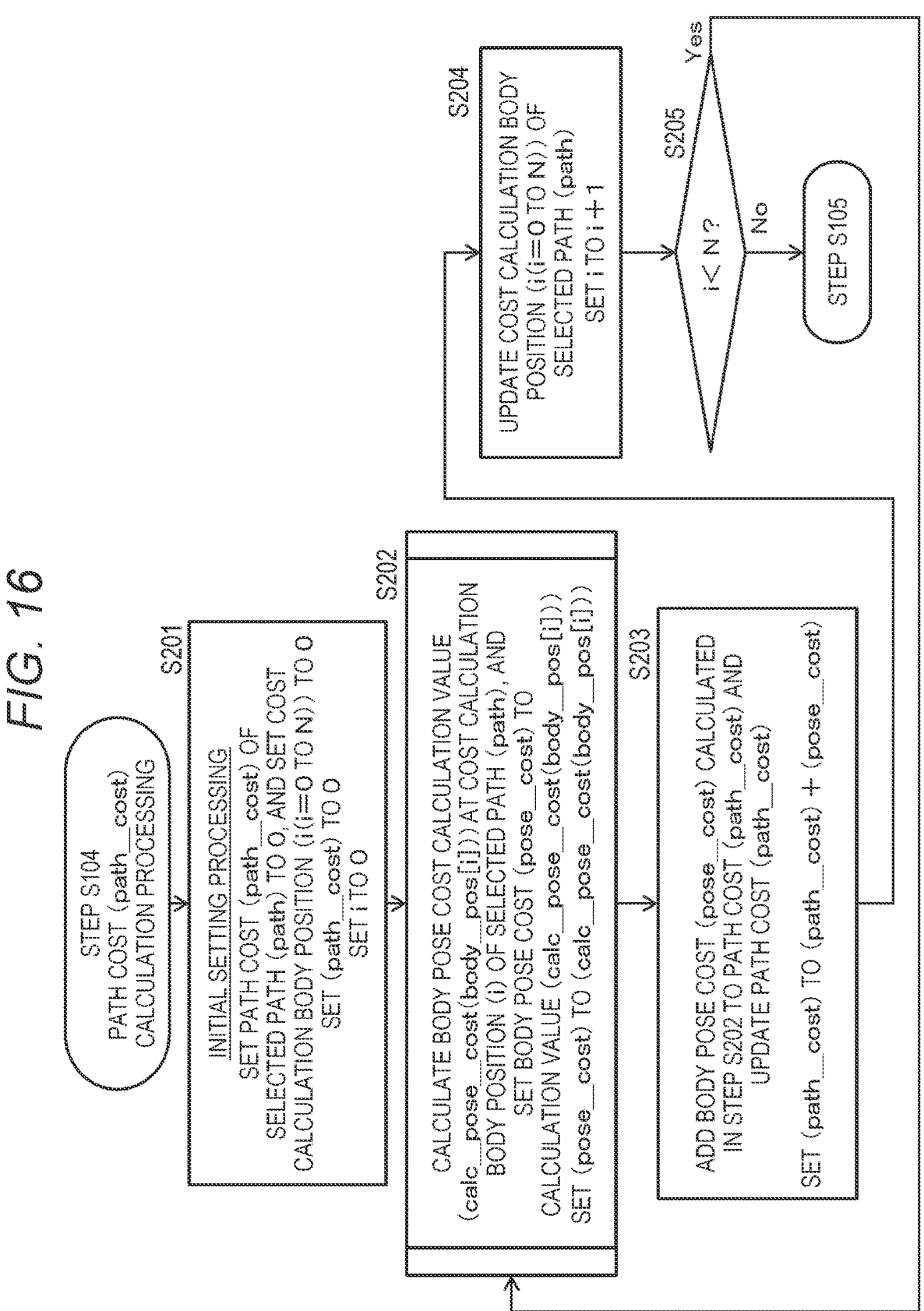

FIG. 16

STEP S104
PATH COST (path_cost)
CALCULATION PROCESSING

S201

INITIAL SETTING PROCESSING
SET PATH COST (path_cost) OF
SELECTED PATH (path) TO O, AND SET COST
CALCULATION BODY POSITION (i(i=0 TO N)) TO O
SET (path_cost) TO O
SET i TO O

S202

CALCULATE BODY POSE COST CALCULATION VALUE
(calc_pose_cost(body_pos[i])) AT COST CALCULATION
BODY POSITION (i) OF SELECTED PATH (path), AND
SET BODY POSE COST (pose_cost) TO
CALCULATION VALUE (calc_pose_cost(body_pos[i]))
SET (pose_cost) TO (calc_pose_cost(body_pos[i]))

S203

ADD BODY POSE COST (pose_cost) CALCULATED
IN STEP S202 TO PATH COST (path_cost) AND
UPDATE PATH COST (path_cost)

SET (path_cost) TO (path_cost) + (pose_cost)

S204

UPDATE COST CALCULATION BODY
POSITION (i(i=0 TO N)) OF
SELECTED PATH (path)
SET i TO i + 1

S205 i < N ?

Yes

No

STEP S105

FIG. 18

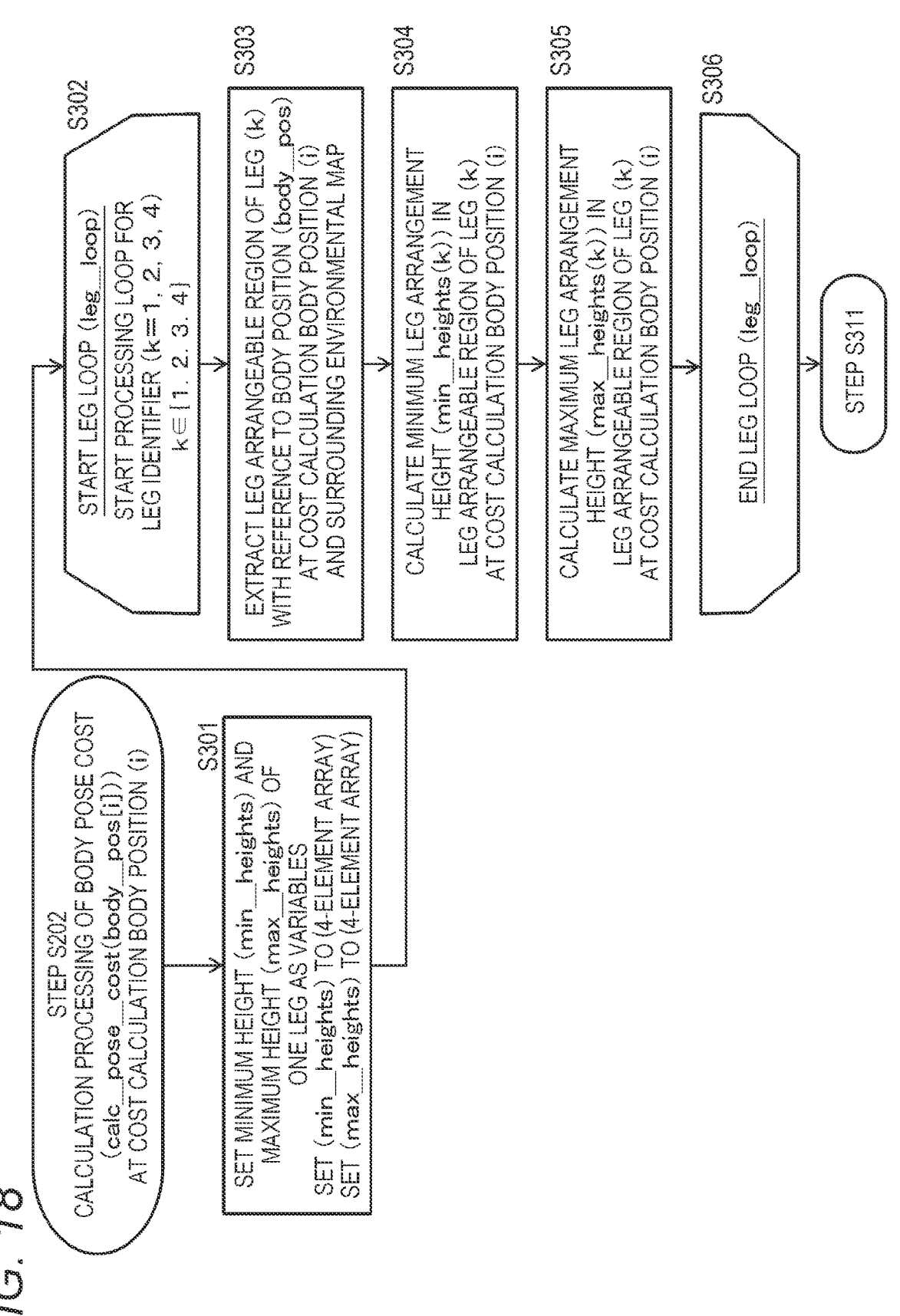

STEP S202
CALCULATION PROCESSING OF BODY POSE COST
(calc_pose_cost(body_pos[i]))
AT COST CALCULATION BODY POSITION (i)

S301
SET MINIMUM HEIGHT (min_heights) AND
MAXIMUM HEIGHT (max_heights) OF
ONE LEG AS VARIABLES
SET (min_heights) TO (4-ELEMENT ARRAY)
SET (max_heights) TO (4-ELEMENT ARRAY)

S302
START LEG LOOP (leg_loop)
START PROCESSING LOOP FOR
LEG IDENTIFIER (k=1, 2, 3, 4)
k∈{1, 2, 3, 4}

S303
EXTRACT LEG ARRANGEABLE REGION OF LEG (k)
WITH REFERENCE TO BODY POSITION (body_pos)
AT COST CALCULATION BODY POSITION (i)
AND SURROUNDING ENVIRONMENTAL MAP S304
CALCULATE MINIMUM LEG ARRANGEMENT
HEIGHT (min_heights(k)) IN
LEG ARRANGEABLE REGION OF LEG (k)
AT COST CALCULATION BODY POSITION (i)

S305
CALCULATE MAXIMUM LEG ARRANGEMENT
HEIGHT (max_heights(k)) IN
LEG ARRANGEABLE REGION OF LEG (k)
AT COST CALCULATION BODY POSITION (i)

S306
END LEG LOOP (leg_loop)

STEP S311

FIG. 19

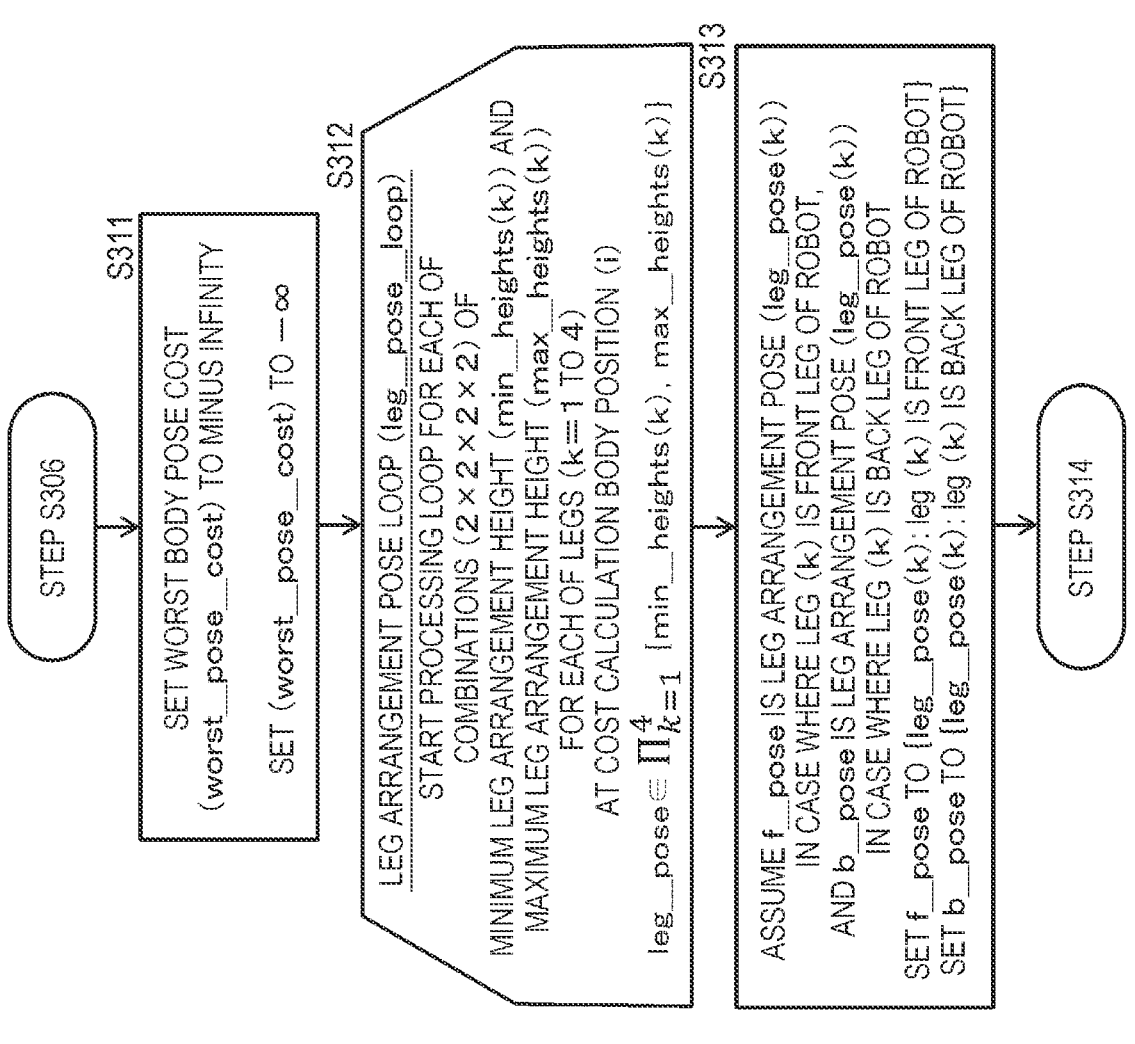

STEP S306

S311

SET WORST BODY POSE COST
(worst_pose_cost) TO MINUS INFINITY

SET (worst_pose_cost) TO −∞

S312

LEG ARRANGEMENT POSE LOOP (leg_pose_loop)
START PROCESSING LOOP FOR EACH OF
COMBINATIONS (2×2×2×2) OF
MINIMUM LEG ARRANGEMENT HEIGHT (min_heights(k)) AND
MAXIMUM LEG ARRANGEMENT HEIGHT (max_heights(k))
FOR EACH OF LEGS (k=1 TO 4)
AT COST CALCULATION BODY POSITION (i)

leg_pose ∈ $\prod_{k=1}^{4}$ [min_heights(k), max_heights(k)]

S313

ASSUME f_pose IS LEG ARRANGEMENT POSE (leg_pose(k))
IN CASE WHERE LEG (k) IS FRONT LEG OF ROBOT,
AND b_pose IS LEG ARRANGEMENT POSE (leg_pose(k))
IN CASE WHERE LEG (k) IS BACK LEG OF ROBOT SET f_pose TO [leg_pose(k): leg (k) IS FRONT LEG OF ROBOT]
SET b_pose TO [leg_pose(k): leg (k) IS BACK LEG OF ROBOT]

STEP S314

*FIG. 20*

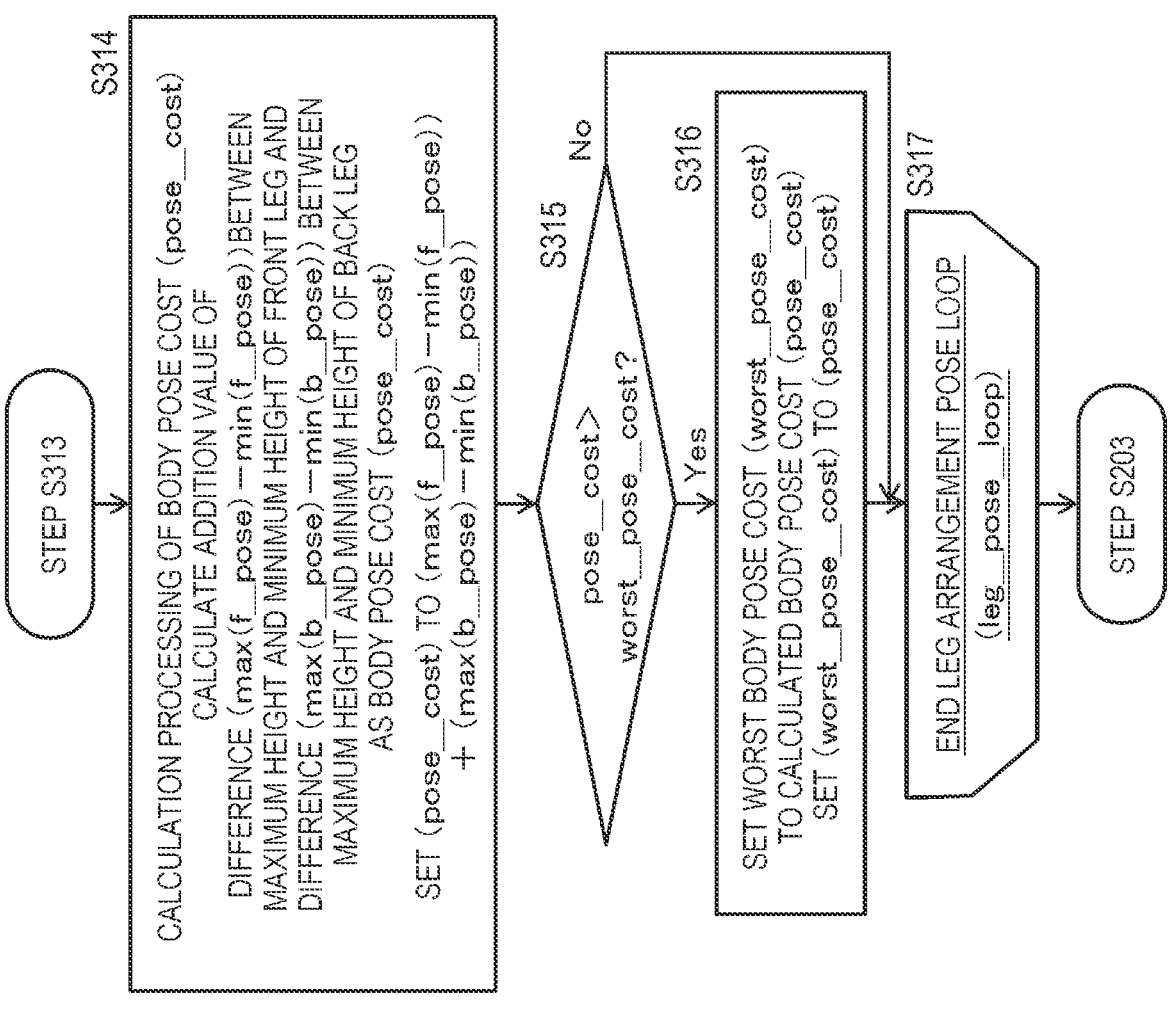

STEP S313

S314

CALCULATION PROCESSING OF BODY POSE COST (pose_cost)

CALCULATE ADDITION VALUE OF
DIFFERENCE (max(f_pose)−min(f_pose)) BETWEEN
MAXIMUM HEIGHT AND MINIMUM HEIGHT OF FRONT LEG AND
DIFFERENCE (max(b_pose)−min(b_pose)) BETWEEN
MAXIMUM HEIGHT AND MINIMUM HEIGHT OF BACK LEG
AS BODY POSE COST (pose_cost)

SET (pose_cost) TO (max(f_pose)−min(f_pose))
+ (max(b_pose)−min(b_pose))

S315 pose_cost >
worst_pose_cost?

No

Yes

S316

SET WORST BODY POSE COST (worst_pose_cost)
TO CALCULATED BODY POSE COST (pose_cost)
SET (worst_pose_cost) TO (pose_cost)

S317

END LEG ARRANGEMENT POSE LOOP
(leg_pose_loop)

STEP S203

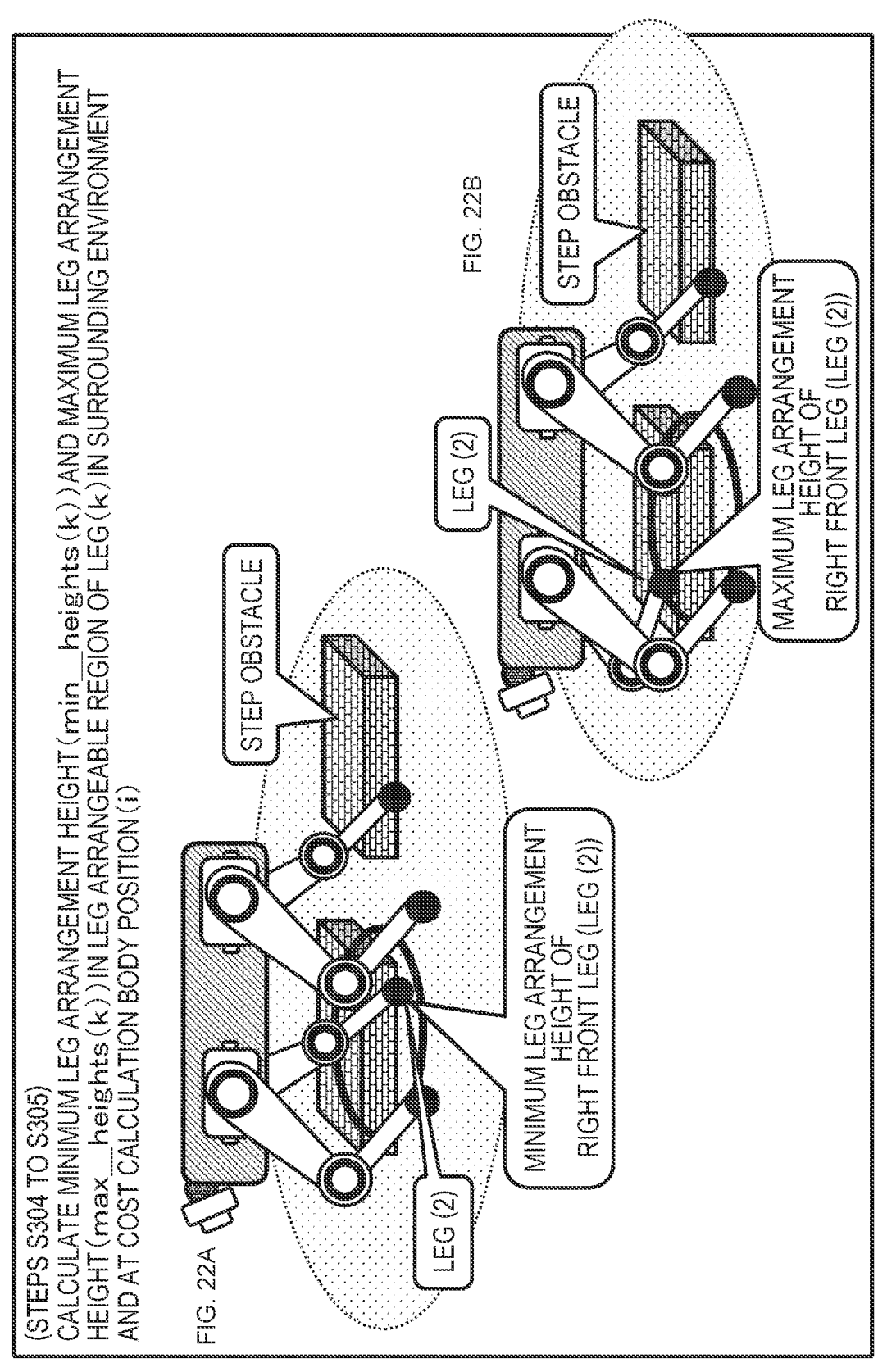

(STEPS S304 TO S305)
CALCULATE MINIMUM LEG ARRANGEMENT HEIGHT(min_heights(k)) AND MAXIMUM LEG ARRANGEMENT HEIGHT(max_heights(k)) IN LEG ARRANGEABLE REGION OF LEG(k)) IN SURROUNDING ENVIRONMENT AND AT COST CALCULATION BODY POSITION(i)

FIG. 22A

STEP OBSTACLE

LEG (2)

MINIMUM LEG ARRANGEMENT HEIGHT OF RIGHT FRONT LEG (LEG (2))

FIG. 22B

STEP OBSTACLE

LEG (2)

MAXIMUM LEG ARRANGEMENT HEIGHT OF RIGHT FRONT LEG (LEG (2))

*FIG. 23*

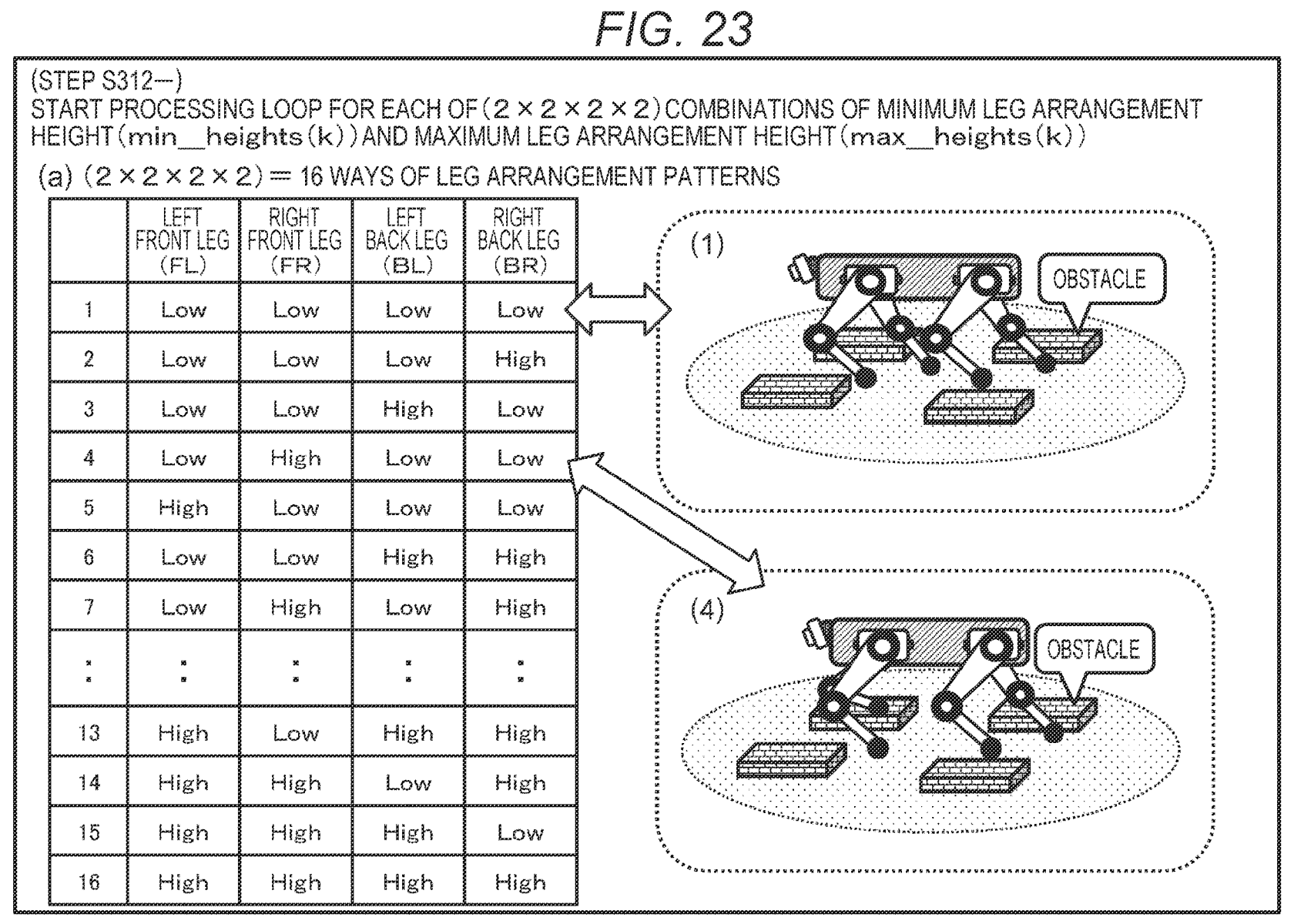

(STEP S312—)
START PROCESSING LOOP FOR EACH OF (2 × 2 × 2 × 2) COMBINATIONS OF MINIMUM LEG ARRANGEMENT HEIGHT (min_heights(k)) AND MAXIMUM LEG ARRANGEMENT HEIGHT (max_heights(k))

(a) (2 × 2 × 2 × 2) = 16 WAYS OF LEG ARRANGEMENT PATTERNS

|  | LEFT FRONT LEG (FL) | RIGHT FRONT LEG (FR) | LEFT BACK LEG (BL) | RIGHT BACK LEG (BR) |
|---|---|---|---|---|
| 1 | Low | Low | Low | Low |
| 2 | Low | Low | Low | High |
| 3 | Low | Low | High | Low |
| 4 | Low | High | Low | Low |
| 5 | High | Low | Low | Low |
| 6 | Low | Low | High | High |
| 7 | Low | High | Low | High |
| : | : | : | : | : |
| 13 | High | Low | High | High |
| 14 | High | High | Low | High |
| 15 | High | High | High | Low |
| 16 | High | High | High | High |

(1) OBSTACLE (4) OBSTACLE

*FIG. 24*

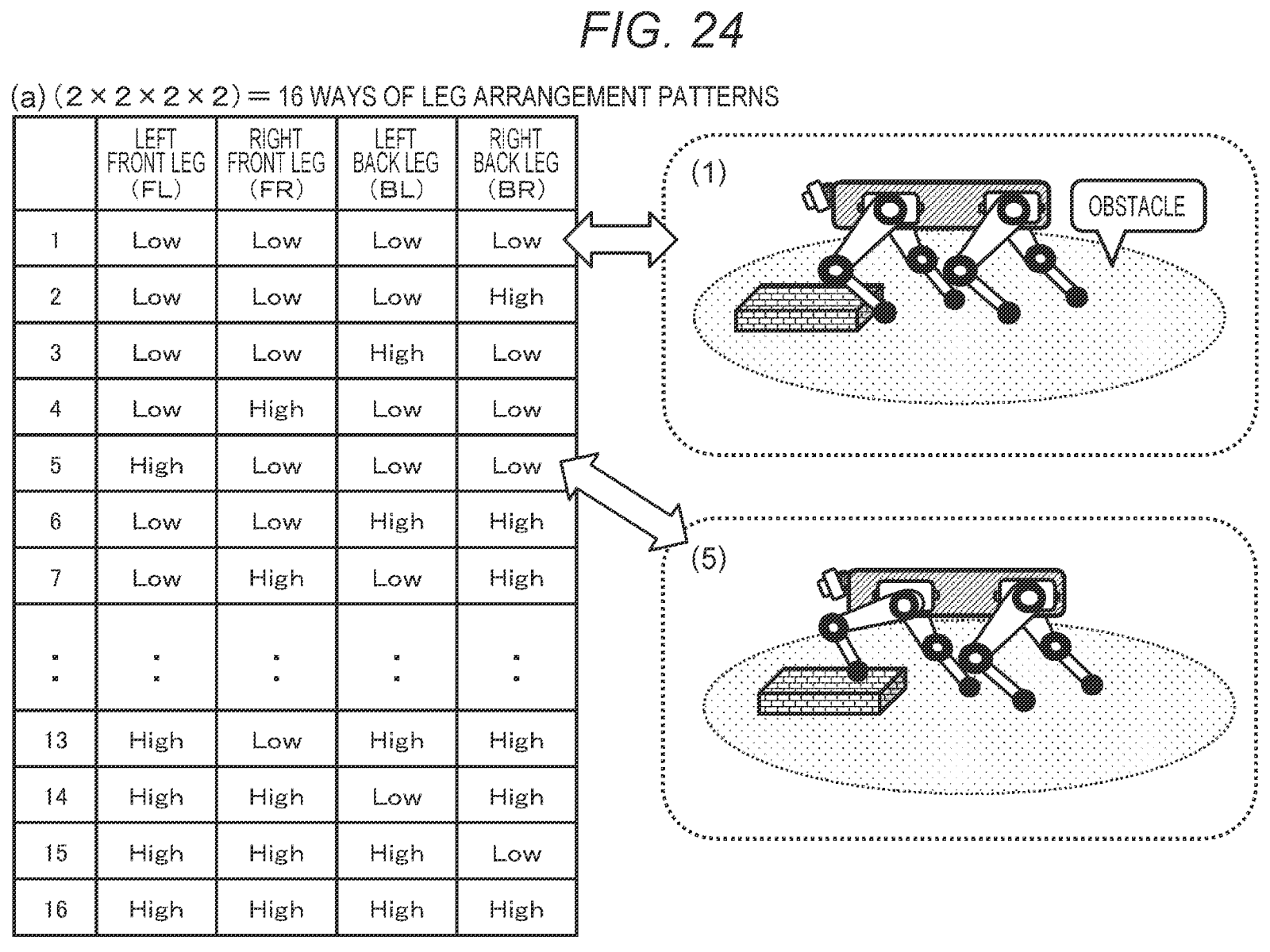

(a) (2 × 2 × 2 × 2) = 16 WAYS OF LEG ARRANGEMENT PATTERNS

| | LEFT FRONT LEG (FL) | RIGHT FRONT LEG (FR) | LEFT BACK LEG (BL) | RIGHT BACK LEG (BR) |
|---|---|---|---|---|
| 1 | Low | Low | Low | Low |
| 2 | Low | Low | Low | High |
| 3 | Low | Low | High | Low |
| 4 | Low | High | Low | Low |
| 5 | High | Low | Low | Low |
| 6 | Low | Low | High | High |
| 7 | Low | High | Low | High |
| ... | ... | ... | ... | ... |
| 13 | High | Low | High | High |
| 14 | High | High | Low | High |
| 15 | High | High | High | Low |
| 16 | High | High | High | High |

*FIG. 25*

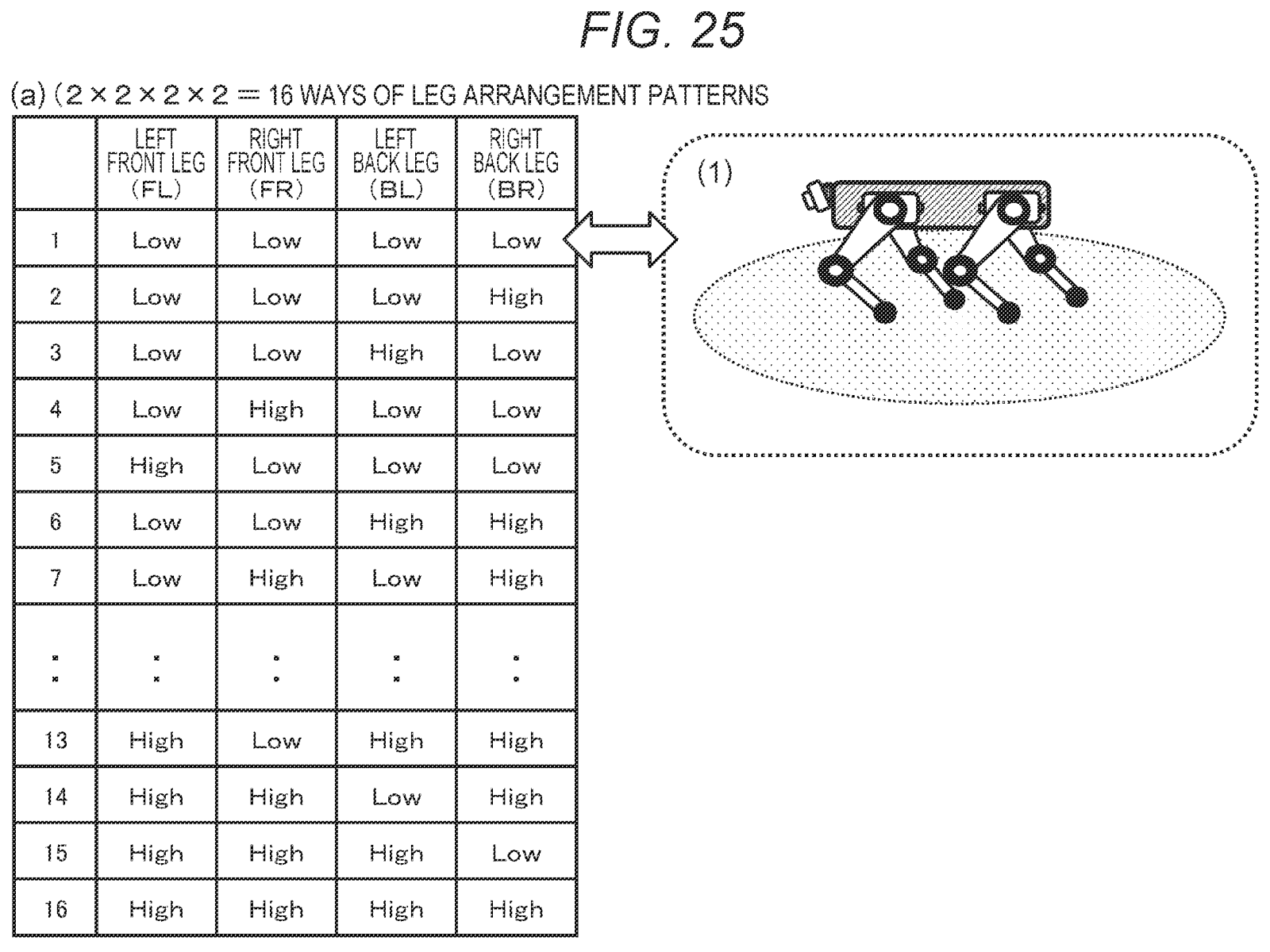

(a) (2 × 2 × 2 × 2 = 16 WAYS OF LEG ARRANGEMENT PATTERNS (1)

| | LEFT FRONT LEG (FL) | RIGHT FRONT LEG (FR) | LEFT BACK LEG (BL) | RIGHT BACK LEG (BR) |
|---|---|---|---|---|
| 1 | Low | Low | Low | Low |
| 2 | Low | Low | Low | High |
| 3 | Low | Low | High | Low |
| 4 | Low | High | Low | Low |
| 5 | High | Low | Low | Low |
| 6 | Low | Low | High | High |
| 7 | Low | High | Low | High |
| ·· | ·· | ·· | ·· | ·· |
| 13 | High | Low | High | High |
| 14 | High | High | Low | High |
| 15 | High | High | High | Low |
| 16 | High | High | High | High |

FIG. 27

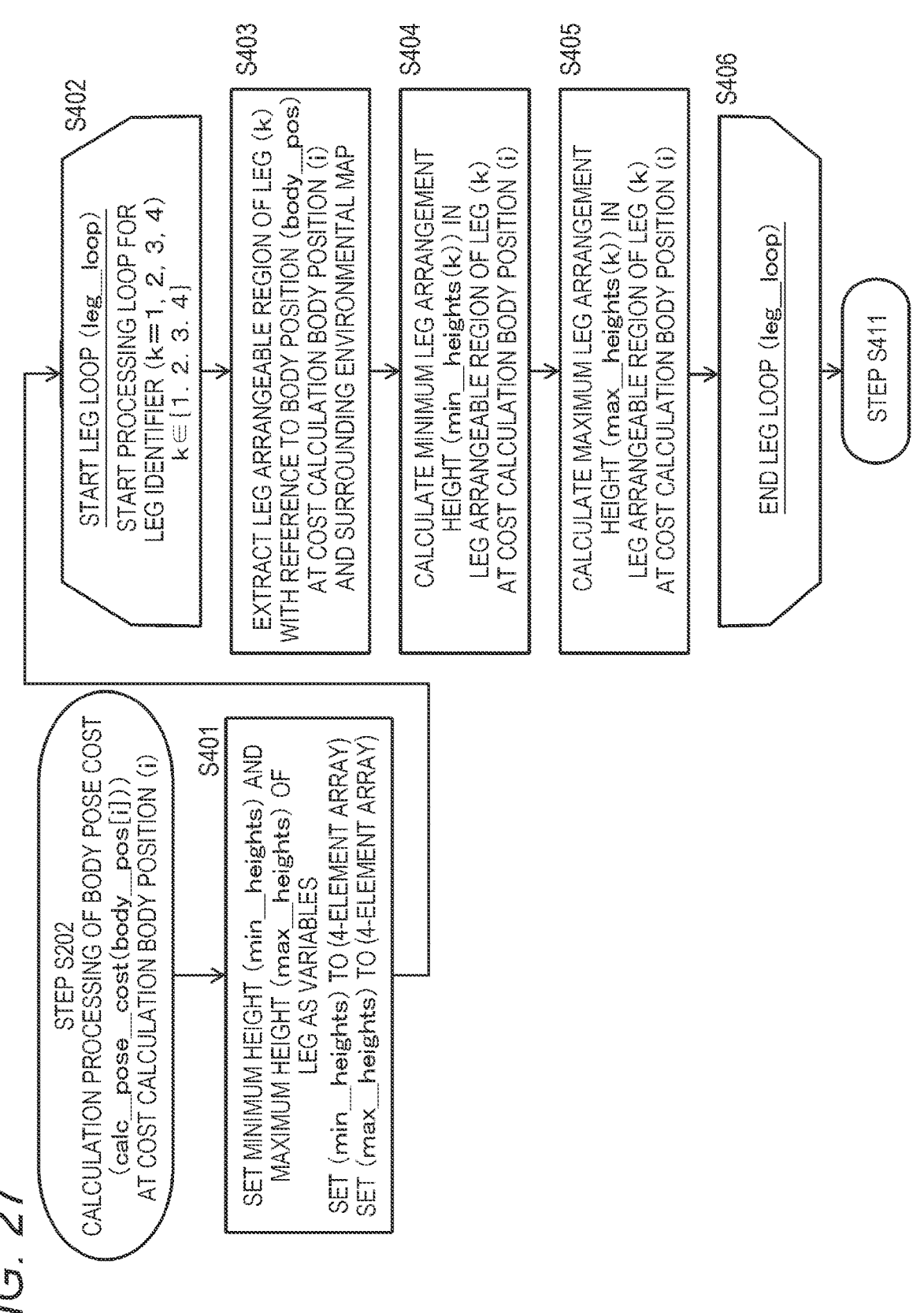

STEP S202
CALCULATION PROCESSING OF BODY POSE COST
(calc_pose_cost(body_pos[i]))
AT COST CALCULATION BODY POSITION (i)

S401
SET MINIMUM HEIGHT (min_heights) AND
MAXIMUM HEIGHT (max_heights) OF
LEG AS VARIABLES SET (min_heights) TO (4-ELEMENT ARRAY)
SET (max_heights) TO (4-ELEMENT ARRAY)

S402
START LEG LOOP (leg_loop)
START PROCESSING LOOP FOR
LEG IDENTIFIER (k=1, 2, 3, 4)
k∈{1, 2, 3, 4}

S403
EXTRACT LEG ARRANGEABLE REGION OF LEG (k)
WITH REFERENCE TO BODY POSITION (body_pos)
AT COST CALCULATION BODY POSITION (i)
AND SURROUNDING ENVIRONMENTAL MAP S404
CALCULATE MINIMUM LEG ARRANGEMENT
HEIGHT (min_heights(k)) IN
LEG ARRANGEABLE REGION OF LEG (k)
AT COST CALCULATION BODY POSITION (i)

S405
CALCULATE MAXIMUM LEG ARRANGEMENT
HEIGHT (max_heights(k)) IN
LEG ARRANGEABLE REGION OF LEG (k)
AT COST CALCULATION BODY POSITION (i)

S406
END LEG LOOP (leg_loop)

STEP S411

*FIG. 28*

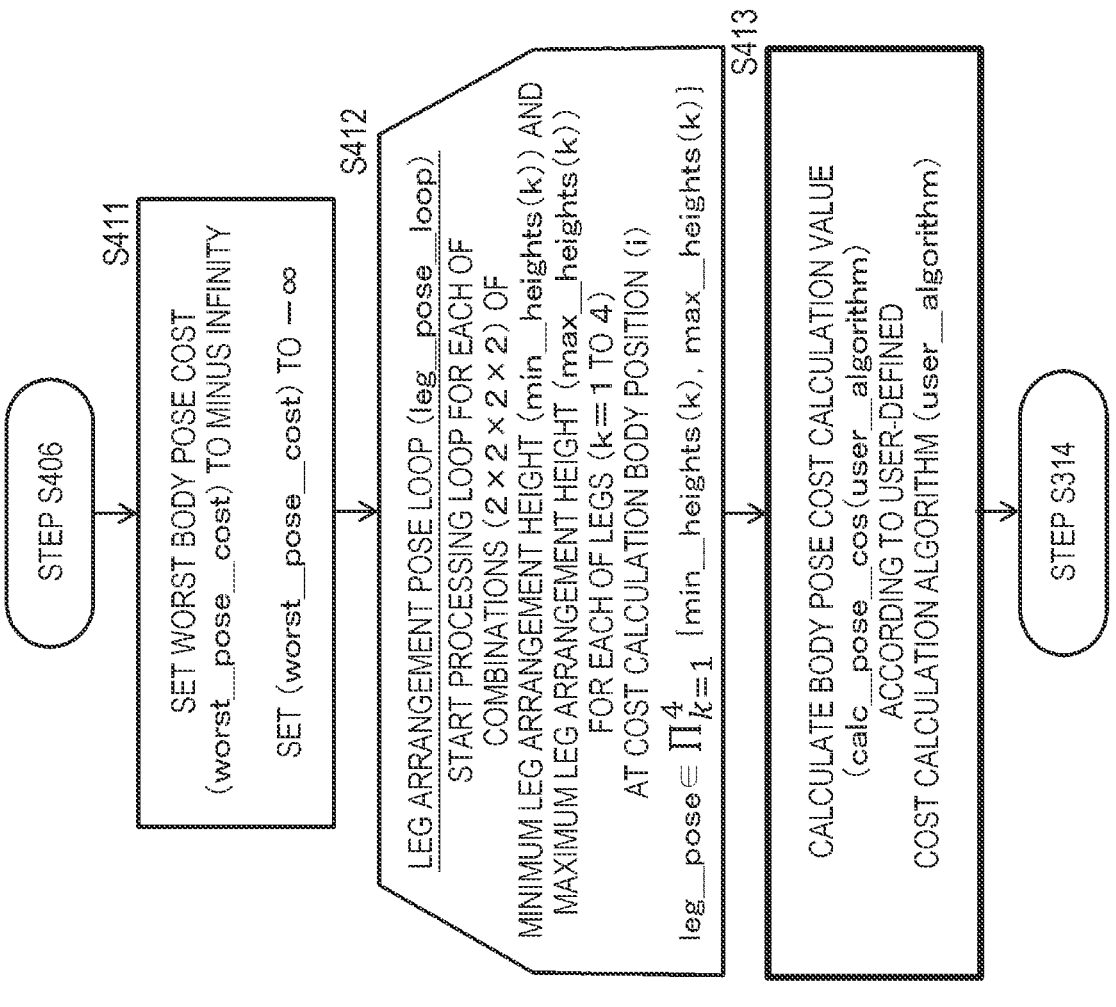

STEP S406

SET WORST BODY POSE COST
(worst_pose_cost) TO MINUS INFINITY

SET (worst_pose_cost) TO −∞

S411

LEG ARRANGEMENT POSE LOOP (leg_pose_loop)
START PROCESSING LOOP FOR EACH OF
COMBINATIONS (2×2×2×2) OF
MINIMUM LEG ARRANGEMENT HEIGHT (min_heights(k)) AND
MAXIMUM LEG ARRANGEMENT HEIGHT (max_heights(k))
FOR EACH OF LEGS (k=1 TO 4)
AT COST CALCULATION BODY POSITION (i)

$$\text{leg\_pose} \in \Pi^4_{k=1} \left[ \text{min\_heights}(k), \text{max\_heights}(k) \right]$$

S412

CALCULATE BODY POSE COST CALCULATION VALUE
(calc_pose_cos(user_algorithm))
ACCORDING TO USER-DEFINED
COST CALCULATION ALGORITHM (user_algorithm)

S413

STEP S314

*FIG. 29*

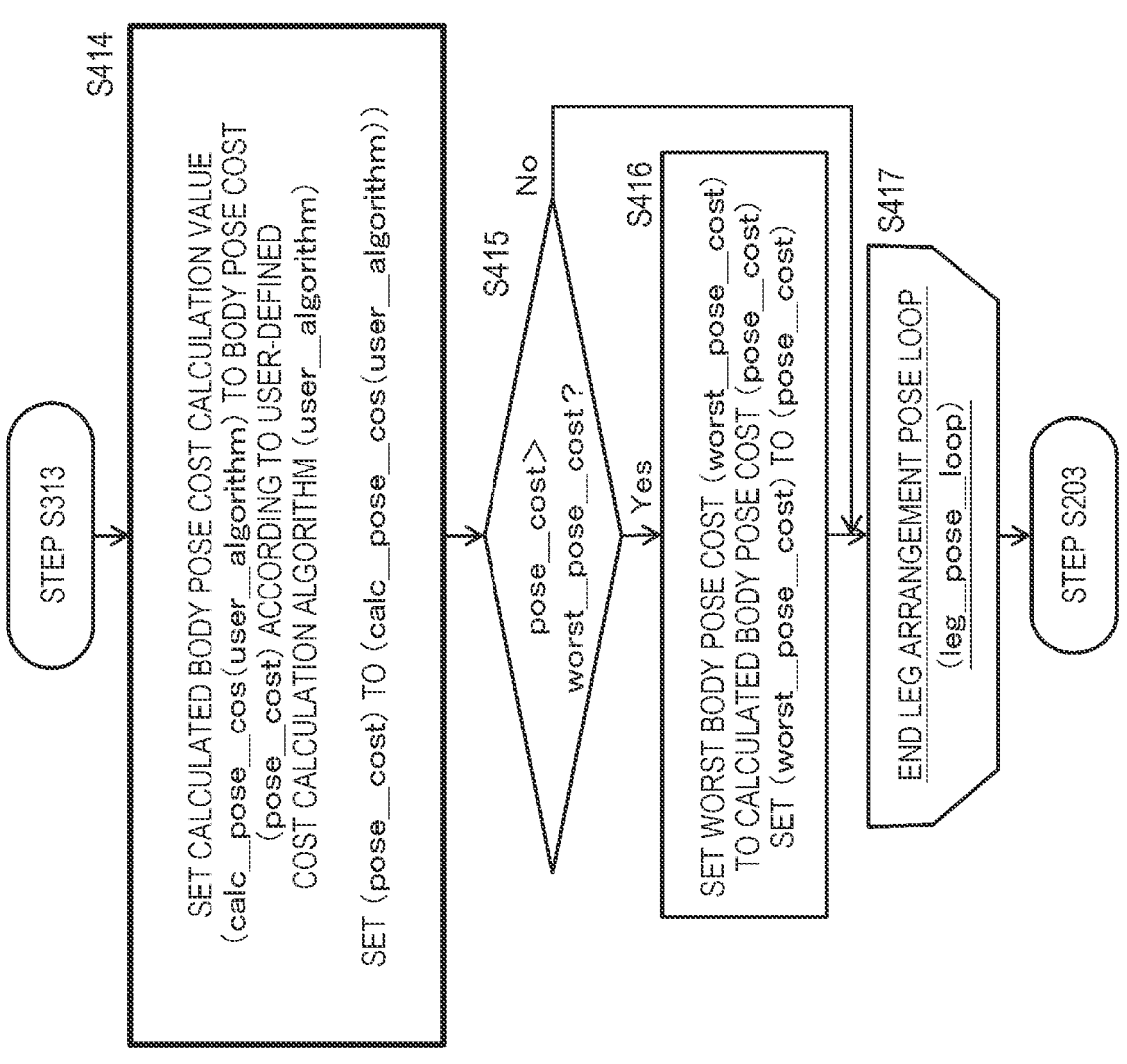

STEP S313

S414

SET CALCULATED BODY POSE COST CALCULATION VALUE
(calc_pose_cos(user_algorithm)) TO BODY POSE COST
(pose_cost) ACCORDING TO USER-DEFINED
COST CALCULATION ALGORITHM (user_algorithm)

SET (pose_cost) TO (calc_pose_cos(user_algorithm))

S415 pose_cost>
worst_pose_cost?

No

Yes

S416

SET WORST BODY POSE COST (worst_pose_cost)
TO CALCULATED BODY POSE COST (pose_cost)
SET (worst_pose_cost) TO (pose_cost)

S417

END LEG ARRANGEMENT POSE LOOP
(leg_pose_loop)

STEP S203

10 ROBOT (6 LEGS)

11 BODY PART (MAIN BODY PART)

21 JOINT PART

15 VISUAL SENSOR (CAMERA)

12 LEG PART

13 LANDING PART

22 JOINT PART

ADVANCING DIRECTION

FIG. 31

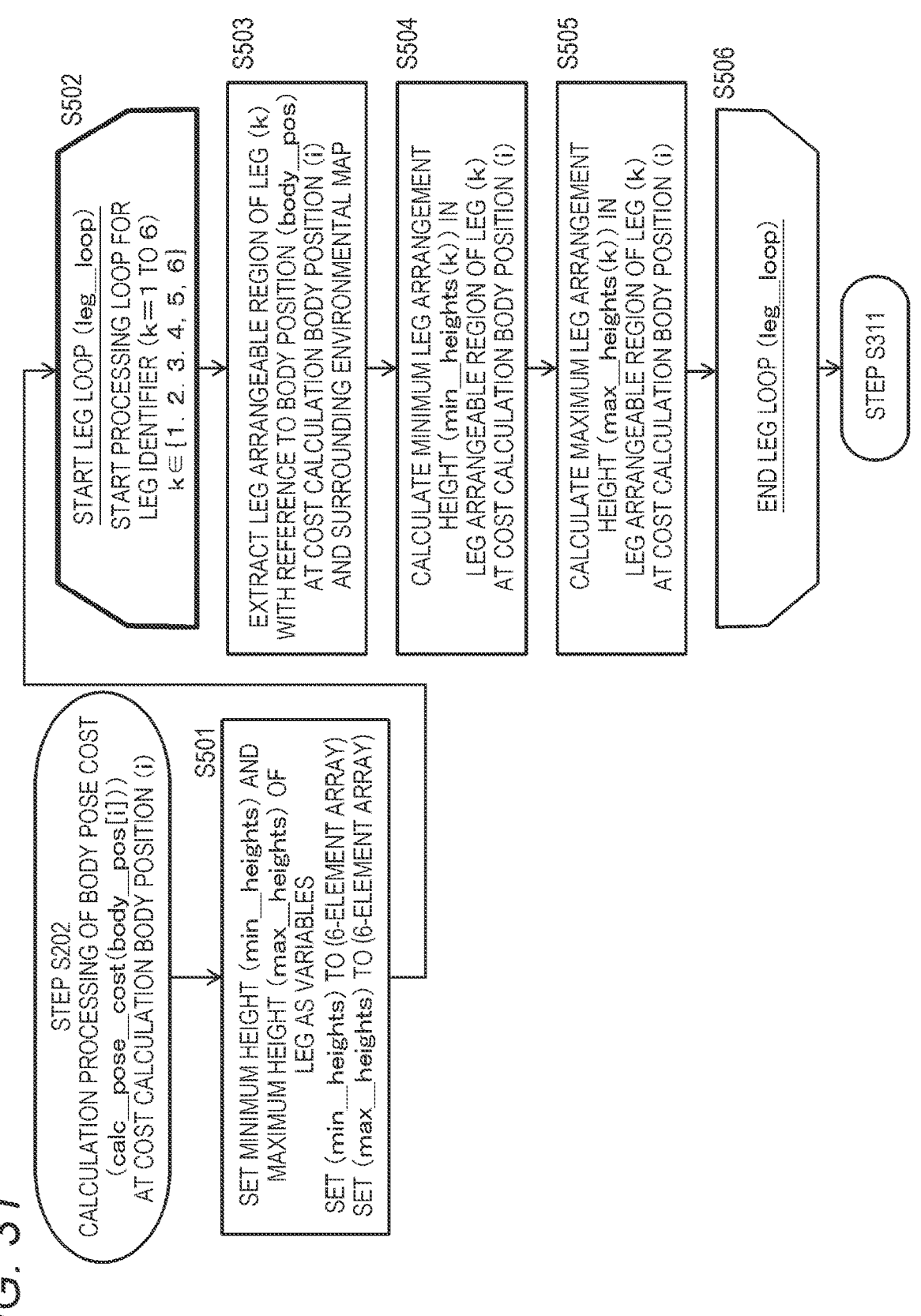

STEP S202
CALCULATION PROCESSING OF BODY POSE COST
(calc_pose_cost(body_pos[i]))
AT COST CALCULATION BODY POSITION (i)

S501
SET MINIMUM HEIGHT (min_heights) AND
MAXIMUM HEIGHT (max_heights) OF
LEG AS VARIABLES SET (min_heights) TO (6-ELEMENT ARRAY)
SET (max_heights) TO (6-ELEMENT ARRAY)

S502
START LEG LOOP (leg_loop)
START PROCESSING LOOP FOR
LEG IDENTIFIER (k=1 TO 6)
k∈{1, 2, 3, 4, 5, 6}

S503
EXTRACT LEG ARRANGEABLE REGION OF LEG (k)
WITH REFERENCE TO BODY POSITION (body_pos)
AT COST CALCULATION BODY POSITION (i)
AND SURROUNDING ENVIRONMENTAL MAP S504
CALCULATE MINIMUM LEG ARRANGEMENT
HEIGHT (min_heights(k)) IN
LEG ARRANGEABLE REGION OF LEG (k)
AT COST CALCULATION BODY POSITION (i)

S505
CALCULATE MAXIMUM LEG ARRANGEMENT
HEIGHT (max_heights(k)) IN
LEG ARRANGEABLE REGION OF LEG (k)
AT COST CALCULATION BODY POSITION (i)

S506
END LEG LOOP (leg_loop)

STEP S311

FIG. 32

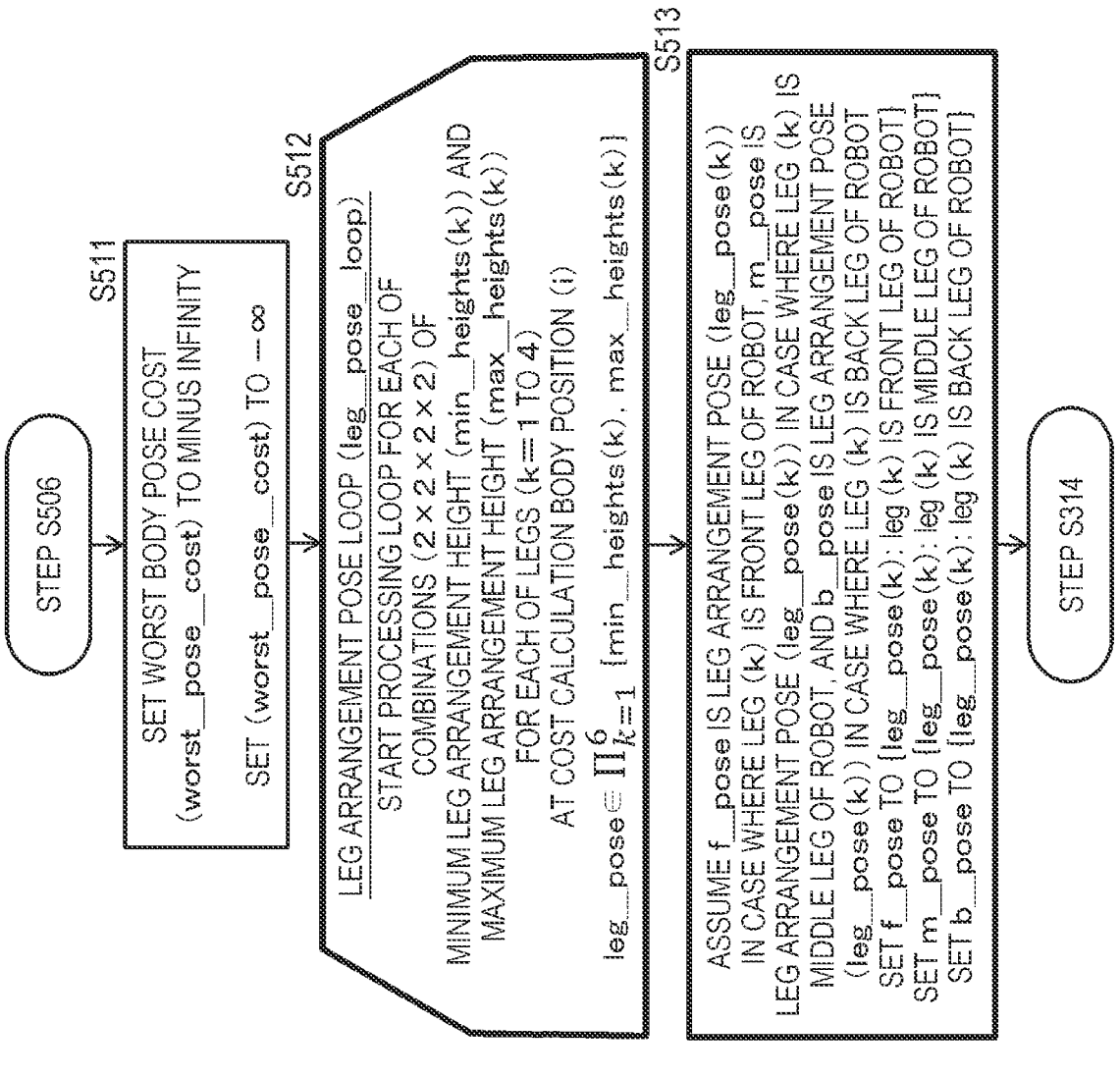

STEP S506

SET WORST BODY POSE COST
(worst_pose_cost) TO MINUS INFINITY

SET (worst_pose_cost) TO −∞

S511

LEG ARRANGEMENT POSE LOOP (leg_pose_loop)
START PROCESSING LOOP FOR EACH OF
COMBINATIONS (2×2×2×2) OF
MINIMUM LEG ARRANGEMENT HEIGHT (min_heights(k)) AND
MAXIMUM LEG ARRANGEMENT HEIGHT (max_heights(k))
FOR EACH OF LEGS (k=1 TO 4)
AT COST CALCULATION BODY POSITION (i)

leg_pose ∈ $\prod_{k=1}^{6}$ [min_heights(k), max_heights(k)]

S512

ASSUME f_pose IS LEG ARRANGEMENT POSE (leg_pose(k))
IN CASE WHERE LEG (k) IS FRONT LEG OF ROBOT, m_pose IS
LEG ARRANGEMENT POSE (leg_pose(k)) IN CASE WHERE LEG (k) IS
MIDDLE LEG OF ROBOT, AND b_pose IS LEG ARRANGEMENT POSE
(leg_pose(k)) IN CASE WHERE LEG (k) IS BACK LEG OF ROBOT
SET f_pose TO [leg_pose(k): leg (k) IS FRONT LEG OF ROBOT]
SET m_pose TO [leg_pose(k): leg (k) IS MIDDLE LEG OF ROBOT]
SET b_pose TO [leg_pose(k): leg (k) IS BACK LEG OF ROBOT]

S513

STEP S314

*FIG. 33*

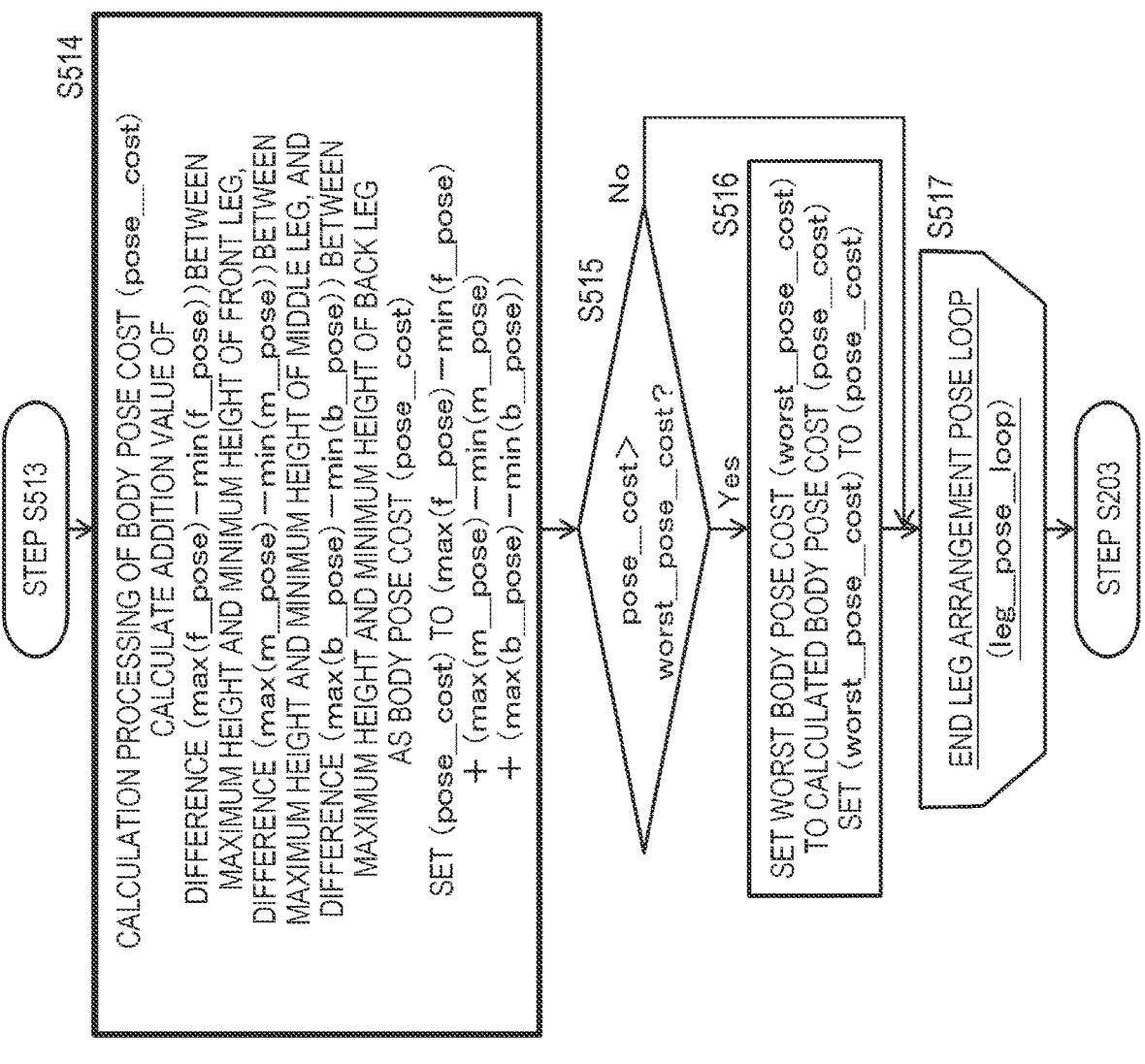

STEP S513

CALCULATION PROCESSING OF BODY POSE COST (pose_cost)
CALCULATE ADDITION VALUE OF
DIFFERENCE (max(f_pose)−min(f_pose))BETWEEN
MAXIMUM HEIGHT AND MINIMUM HEIGHT OF FRONT LEG,
DIFFERENCE (max(m_pose)−min(m_pose))BETWEEN
MAXIMUM HEIGHT AND MINIMUM HEIGHT OF MIDDLE LEG, AND
DIFFERENCE (max(b_pose)−min(b_pose)) BETWEEN
MAXIMUM HEIGHT AND MINIMUM HEIGHT OF BACK LEG
AS BODY POSE COST (pose_cost)

SET (pose_cost) TO (max(f_pose)−min(f_pose)
+ (max(m_pose)−min(m_pose)
+ (max(b_pose)−min(b_pose))

S514 pose_cost>
worst_pose_cost?    No

S515

Yes

SET WORST BODY POSE COST (worst_pose_cost)
TO CALCULATED BODY POSE COST (pose_cost)
SET (worst_pose_cost) TO (pose_cost)

S516

END LEG ARRANGEMENT POSE LOOP
(leg_pose_loop)

S517

STEP S203

FIG. 35A    FRONT VIEW

FIG. 35B    SIDE VIEW

FIG. 35C    REAR VIEW

FIG. 38

MOVING APPARATUS AND MOVING APPARATUS CONTROL METHOD

CROSS REFERENCE TO RELATED APPLICATIONS

This application is a U.S. National Phase of International Patent Application No. PCT/JP2022/006848 filed on Feb. 21, 2022, which claims priority benefit of Japanese Patent Application No. JP 2021-133417 filed in the Japan Patent Office on Aug. 18, 2021. Each of the above-referenced applications is hereby incorporated herein by reference in its entirety.

TECHNICAL FIELD

The present disclosure relates to a moving apparatus, a moving apparatus control method, and a program. Specifically, the present disclosure relates to a moving apparatus such as a walking robot that moves by controlling a plurality of legs, a moving apparatus control method, and a program.

BACKGROUND ART

Walking robots that move by driving a plurality of legs are used in various fields. The robots can perform various operations even in factories or at disaster sites or the like where people are difficult to enter.

However, in order for the walking robots to stably move, it is necessary to grasp obstacles in an advancing direction, unevenness and inclination on a traveling (walking) surface, and the like, identify a path on which stable traveling is possible, and moreover, perform landing of a leg according to a shape of the traveling surface.

For example, when a leg of a walking robot is placed on a surface with severe unevenness or a surface with large inclination, there is a possibility that the robot falls down and cannot move forward.

In order to prevent such a problem, many robots are mounted with sensors such as cameras for recognizing the environment around the robots, and execute control to select and move on a path for performing stable walking or traveling using sensor detection information.

For example, processing such as generating an environmental map including three-dimensional shape data of the surroundings using data obtained from the sensors and determining a movement path with reference to the generated environmental map is performed.

However, the walking robot needs to land a plurality of legs such as four legs and six legs to different positions, and the shape of each landing position of each leg needs to be analyzed in order to stably walk.

The amount of calculation for analyzing the landing surface shape of each leg is large, and as a result, a problem occurs that the traveling speed of the robot decreases.

Note that, for example, Patent Document 1 (Japanese Patent Application Laid-Open No. 2013-066996) discloses, as a conventional technique, a technique to analyze a landing position of a leg of a walking robot.

Patent Document 1 discloses a technique of performing stable traveling by repeatedly calculating a position at which each leg of the robot just comes into contact with a robot traveling surface without getting stuck in a robot traveling surface.

However, in Patent Document 1, in order to calculate the three-dimensional position where each leg and the landing surface are in contact with each other, repetitive calculation using three-dimensional point group data is performed. Therefore, in a case where the amount of calculation for calculating the landing position of one step of the robot is large and the travel path of the robot is long, the calculation needs to be executed repeatedly for many times, and as a result, a problem occurs that the travel speed of the robot decreases.

CITATION LIST

Patent Document

Patent Document 1: Japanese Patent Application Laid-Open No. 2013-066996

SUMMARY OF THE INVENTION

Problems to be Solved by the Invention

The present disclosure has been made in view of, for example, the above problems, and an object thereof is to provide a moving apparatus that enables safe traveling by analyzing a landing position of a leg that realizes a stable robot posture without greatly increasing a processing load and an amount of processing data of a walking robot, a moving apparatus control method, and a program.

Solutions to Problems

A first aspect of the present disclosure is a moving apparatus including
  a path planning unit that determines a travel path of the moving apparatus, in which
  the path planning unit is configured to:
  calculate a path cost for each of a plurality of path candidates by applying a cost calculation algorithm in which a path that enables more stable traveling has a lower cost; and
  determine the path candidate having the path cost that has been calculated to be the lowest cost as the travel path that is best.
  Moreover, a second aspect of the present disclosure is a moving apparatus control method that is executed in a moving apparatus, in which
  the moving apparatus includes a path planning unit that determines a travel path of the moving apparatus, and
  the path planning unit is configured to:
  calculate a path cost for each of a plurality of path candidates by applying a cost calculation algorithm in which a path that enables more stable traveling has a lower cost; and
  determine the path candidate having the path cost that has been calculated to be the lowest cost as the travel path that is best.
  Moreover, a third aspect of the present disclosure is a program that executes moving apparatus control processing in a moving apparatus, in which
  the moving apparatus includes a path planning unit that determines a travel path of the moving apparatus, and
  the program causes the path planning unit to:
  calculate a path cost for each of a plurality of path candidates by applying a cost calculation algorithm in which a path that enables more stable traveling has a lower cost; and
  determine the path candidate having the path cost that has been calculated to be the lowest cost as the travel path that is best.

Note that the program of the present disclosure is, for example, a program that can be provided by a storage medium or a communication medium that provides a variety of program codes in a computer-readable format, to an information processing apparatus or a computer system that can execute the program codes. By providing such a program in a computer-readable format, processing corresponding to the program is implemented on the information processing apparatus or the computer system.

Other objects, features, and advantages of the present disclosure will become apparent from a more detailed description based on examples of the present disclosure described later and the accompanying drawings. Note that a system in the present description is a logical set configuration of a plurality of apparatuses, and is not limited to a system in which apparatuses with respective configurations are in the same housing.

According to a configuration of one embodiment of the present disclosure, an apparatus and a method for efficiently determining a best path on which a moving apparatus such as a walking robot can safely travel are realized.

Specifically, for example, the configuration includes a path planning unit that determines a travel path of the moving apparatus such as a walking robot, and the path planning unit is configured to calculate a path cost for each of a plurality of path candidates by applying a cost calculation algorithm in which a path that enables more stable traveling has a lower cost and to determine the path candidate having the path cost that has been calculated to be the lowest cost as the travel path that is best. The path planning unit sets a plurality of sampling points in a path, calculates a cost corresponding to each sampling point by applying the cost calculation algorithm in which the cost becomes higher as the difference between landing heights of the left and right legs at each sampling point becomes larger, and calculates an addition value of the costs of the sampling points as the path cost.

According to the present configuration, an apparatus and a method that efficiently determine a best path on which a moving apparatus such as a walking robot can safely travel are realized.

Note that the effects described in the present description are only examples and are not restrictive, and additional effects may also be provided.

BRIEF DESCRIPTION OF DRAWINGS

FIG. 6 is a diagram for explaining an example in which the robot selects a flat path and travels.

FIG. 7 is a diagram for explaining an example in which the robot selects a flat path and travels.

FIG. 9 is a diagram for explaining specific examples of a global path generated by a global path planning unit and a local path generated by a local path planning unit.

FIG. 16 is a flowchart for explaining a detailed sequence of the best local path determination processing executed by the best body path determination unit of the local path planning unit of the moving apparatus of the present disclosure.

FIG. 18 is a flowchart for explaining a detailed sequence of the best local path determination processing executed by the best body path determination unit of the local path planning unit of the moving apparatus of the present disclosure.

FIG. 19 is a flowchart for explaining a detailed sequence of the best local path determination processing executed by the best body path determination unit of the local path planning unit of the moving apparatus of the present disclosure.

FIG. 20 is a flowchart for explaining a detailed sequence of the best local path determination processing executed by the best body path determination unit of the local path planning unit of the moving apparatus of the present disclosure.

FIGS. 22A and 22B are diagrams for explaining a specific example of processing executed by the best body path determination unit.

FIG. 23 is a diagram for explaining a specific example of processing executed by the best body path determination unit.

FIG. 24 is a diagram for explaining a specific example of processing executed by the best body path determination unit.

FIG. 25 is a diagram for explaining a specific example of processing executed by the best body path determination unit.

FIG. 27 is a flowchart for explaining a detailed sequence of the best local path determination processing executed by the best body path determination unit of the local path planning unit of the moving apparatus of the present disclosure.

FIG. 28 is a flowchart for explaining a detailed sequence of the best local path determination processing executed by the best body path determination unit of the local path planning unit of the moving apparatus of the present disclosure.

FIG. 29 is a flowchart for explaining a detailed sequence of the best local path determination processing executed by the best body path determination unit of the local path planning unit of the moving apparatus of the present disclosure.

FIG. 31 is a flowchart for explaining a detailed sequence of the best local path determination processing executed by the best body path determination unit of the local path planning unit of the moving apparatus of the present disclosure.

FIG. 32 is a flowchart for explaining a detailed sequence of the best local path determination processing executed by the best body path determination unit of the local path planning unit of the moving apparatus of the present disclosure.

FIG. 33 is a flowchart for explaining a detailed sequence of the best local path determination processing executed by the best body path determination unit of the local path planning unit of the moving apparatus of the present disclosure.

FIG. 38 is a diagram for explaining a hardware configuration example of the moving apparatus of the present disclosure.

MODE FOR CARRYING OUT THE INVENTION

Figure 1:
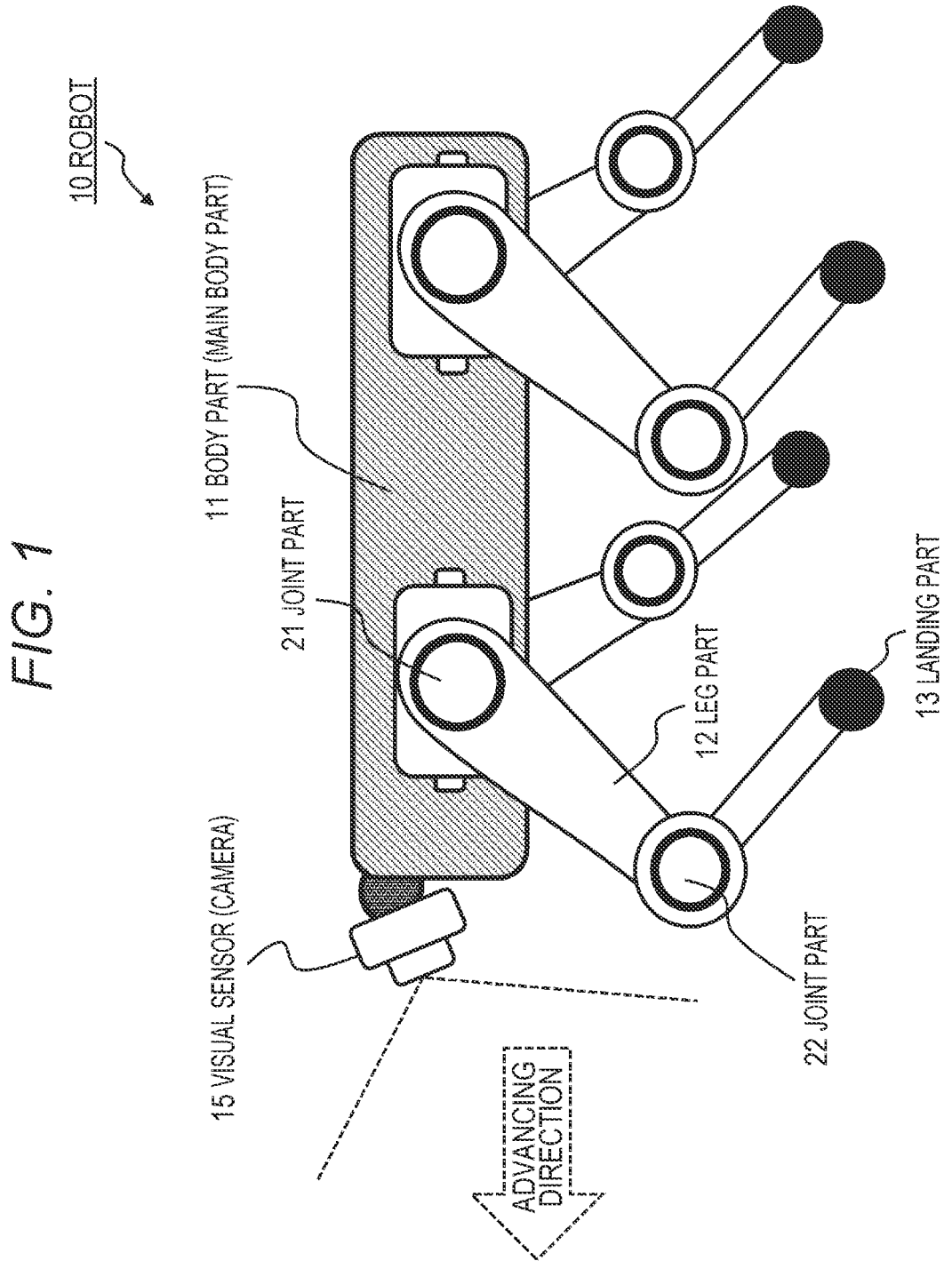
FIG. 1 is a diagram for explaining a configuration example of a four-legged robot which is an example of a moving apparatus of the present disclosure.

Hereinafter, details of a moving apparatus, a moving apparatus control method, and a program of the present disclosure are described with reference to the drawings. Note that the description is made in accordance with the following items.

1. Overview of moving apparatus of the present disclosure
2. Configuration example of moving apparatus of the present disclosure
3. Details of processing (Example 1) executed by moving apparatus of the present disclosure
4. (Example 2) Example to which user-defined cost calculation algorithm is applied
5. (Example 3) Example using six-legged robot
6. Other examples
7. Hardware configuration example of moving apparatus of the present disclosure
8. Summary of configuration of the present disclosure

1. Overview of Moving Apparatus of Present Disclosure

First, an overview of a moving apparatus of the present disclosure is described with reference to FIG. 1 and subsequent drawings.

FIG. 1 is a diagram illustrating a four-legged robot 10 which is an example of the moving apparatus of the present disclosure.

The robot 10 is a walking robot that moves by moving four legs while driving the legs individually.

Note that the four-legged robot illustrated in FIG. 1 is an example of the moving apparatus of the present disclosure, and processing of the present disclosure can be used in a walking robot having a plurality of two or more legs.

As illustrated in FIG. 1, the four-legged robot 10 includes a body part (main body part) 11, leg parts 12, landing parts 13, and a visual sensor (camera) 15 for recognizing the surrounding environment of the robot. Furthermore, each leg includes a joint part 21 and a joint part 22.

The robot 10 illustrated in FIG. 1 is a four-legged walking robot having two legs on the front and two legs on the back.

The robot can perform leg movement, that is, walking travel by individually lifting each of the four legs and moving the legs back and forth.

As illustrated in FIG. 1, the robot 10 includes the visual sensor 15. The visual sensor 15 is a sensor for acquiring environmental information such as obstacles around the robot 10 and a traveling surface shape. For example, the visual sensor is constituted of a camera.

Note that, as the visual sensor 15, for example, any one of a monocular camera, a stereo camera, an omnidirectional camera, an infrared camera, a light detection and ranging (LiDAR) sensor, a time of flight (TOF) sensor, or the like, or a combined configuration thereof can be used.

Note that both the LiDAR and TOF sensors are sensors that can measure an object distance.

A detailed configuration example of the robot 10 illustrated in FIG. 1 is described with reference to FIGS. 2A, 2B, and 2C.

FIGS. 2A, 2B, and 2C includes three diagrams illustrating

FIG. 2A a front view,

FIG. 2B a side view, and

FIG. 2C a rear view, of the robot 10 illustrated in FIG. 1.

As understood from FIG. 2A the front view and FIG. 2C the rear view, an upper end of each of the leg part 12 with respect to the body part (main body part) 11, that is, the joint part 21 of a leg attachment part is configured rotatable in the left-right direction when viewed from the front surface and the back surface of the robot.

Moreover, as understood from FIG. 2B the side view, the joint part 21 at an upper end of each of the leg part 12 is also configured rotatable in the front-back direction.

In such a manner, the joint part 21 at the upper end of each of the leg parts 12 is configured rotatable with respect to the body part (main body part) 11 in both the front-back direction and the left-right direction.

Moreover, as understood from FIG. 2B the side view, the joint part 22 corresponding to a so-called knee joint is provided in a middle part of each leg. The joint part 22 can rotate the lower half of the leg part 12 in the front-back direction with respect to the upper part of the leg.

Figure 3:
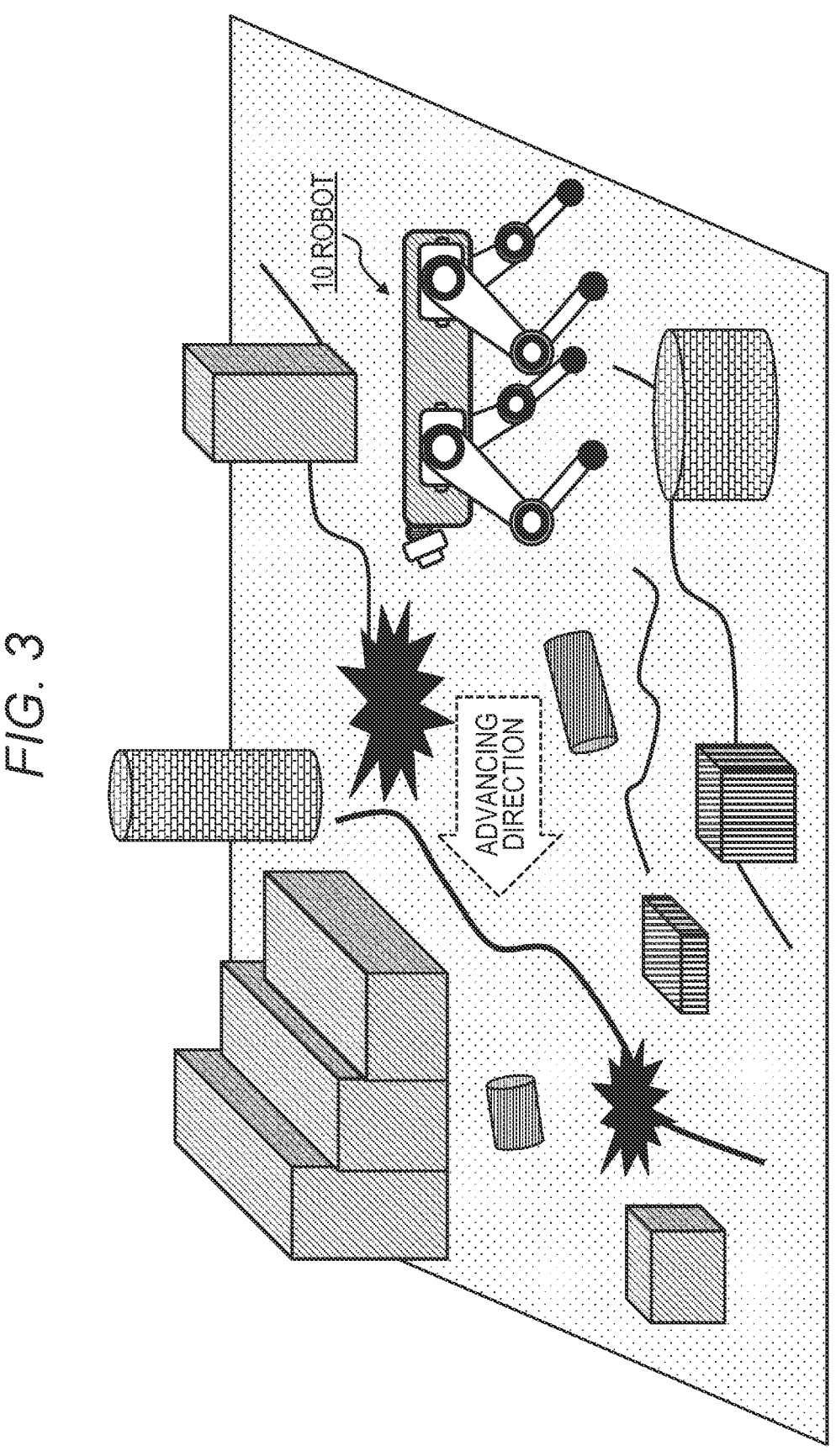
FIG. 3 is a diagram for explaining an example of a travel environment of the moving apparatus.

FIG. 3 is a diagram illustrating an example of an environment in which the robot 10 illustrated in FIG. 1 travels.

As an environment in which the robot 10 moves, for example, there are various obstacles as illustrated in FIG. 3.

Furthermore, the traveling surface is not limited to a flat surface, and there are various kinds of traveling surfaces such as a rough surface, a stepped surface, an inclined surface, and stairs.

For example, when the robot 10 collides with an obstacle, there is a possibility that the robot 10 falls down and damage or failure occurs.

Furthermore, even in a case where the leg is landed on a rough surface, a stepped surface, an inclined surface, or the like without considering an inclination angle or the like, there is a possibility that the robot 10 falls down and damage or failure occurs.

In order to prevent such a situation from occurring, processing of determining a travel path is performed by using a surrounding environmental map generated on the basis of sensor acquisition information acquired by the visual sensor 15 such as a camera, that is, an environmental map having three-dimensional shape information of objects including the traveling surface around the robot.

Basically, for example, the travel path is first generated as a path connecting the shortest distance to a goal point defined in advance, and in a case where there is a large obstacle on the path that the robot 10 cannot travel, the path is modified so as to avoid the obstacle.

However, for example, there is a case that, regarding an obstacle whose height is low, the walking robot 10 can ascend and advance on the obstacle by lifting the legs, and regarding an obstacle having only a small step, the walking robot can advance as it is without changing the travel path.

However, for example, in a case of the four-legged robot 10 as illustrated in FIG. 1, if the difference in height between the left leg and the right leg becomes larger, there is a possibility that the left and right balance of the robot 10 is lost and the robot 10 falls down.

A specific example of this is described with reference to FIG. 4.

Figure 4:
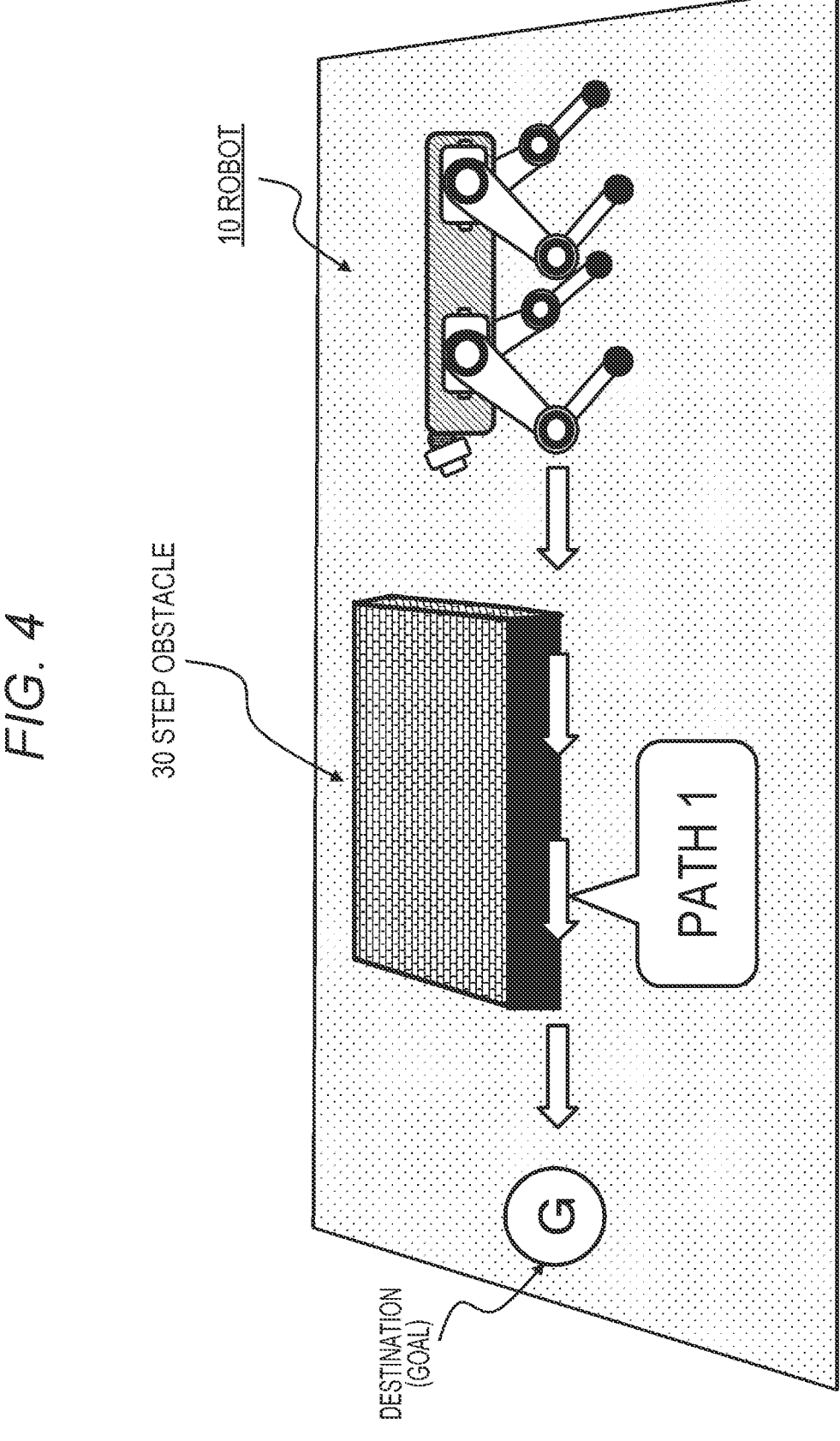
FIG. 4 is a diagram for explaining a travel example of the moving apparatus.

As shown in FIG. 4, in a case where the robot 10 heads for a destination (goal), the shortest path is a "path 1" indicated by an arrow in the drawing, that is, a path from the current position of the robot 10 toward the destination (goal) in a straight line.

A step obstacle 30 is present on the right side in the advancing direction of the robot 10 in the path 1. The step obstacle 30 has a height that allows the robot 10 to get on the obstacle by raising legs on one side of the robot 10 upward. Therefore, there is a possibility that the robot 10 travels along the path 1 on the basis of determination that the step obstacle 30 can be walked through.

However, when the right leg of the robot 10 is placed on the step obstacle 30, the robot 10 is in an extremely unstable state.

Figure 5:
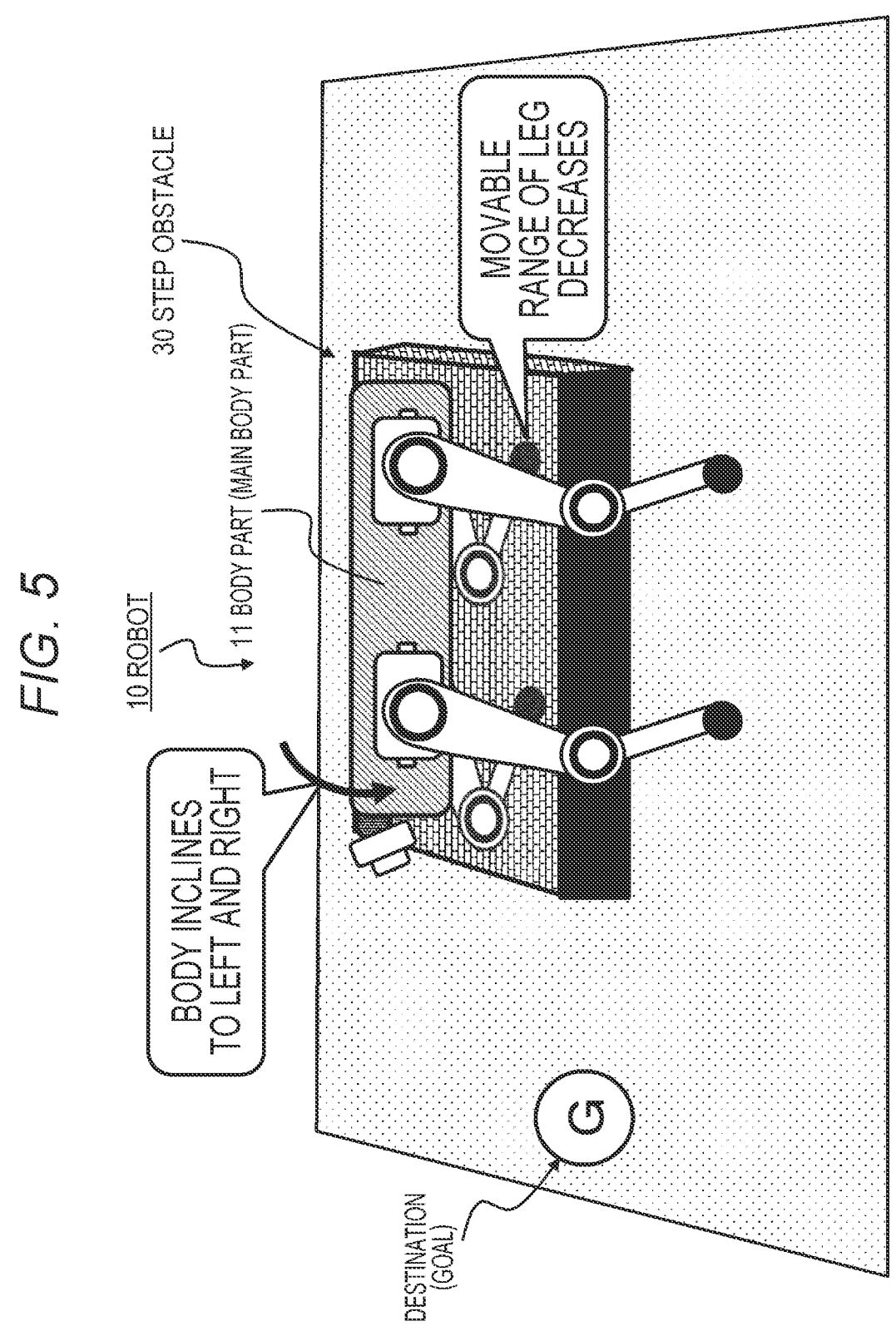
FIG. 5 is a diagram for explaining an unstable state when a leg of the robot is placed on a step obstacle.

A specific example is illustrated in FIG. 5.

FIG. 5 illustrates a state in which the right legs of the robot 10 are landed on the step obstacle 30 and the front and back legs on the left side of the robot 10 are landed on a low traveling surface.

As illustrated in FIG. 5, in the robot 10, when the landing heights of the left and right legs are greatly different from each other, the body part (main body part) 11 is inclined in the left-right direction and becomes unstable.

Moreover, a movable range of the right legs of the robot 10 landed on the step obstacle 30 becomes extremely small. That is, the legs cannot be largely moved back and forth. As a result, the traveling speed extremely decreases.

As described above, the walking robot 10 can travel on the traveling surface having a small level of steps, but an undesirable situation such as a decrease in stability or a decrease in traveling speed occurs.

Figure 6:
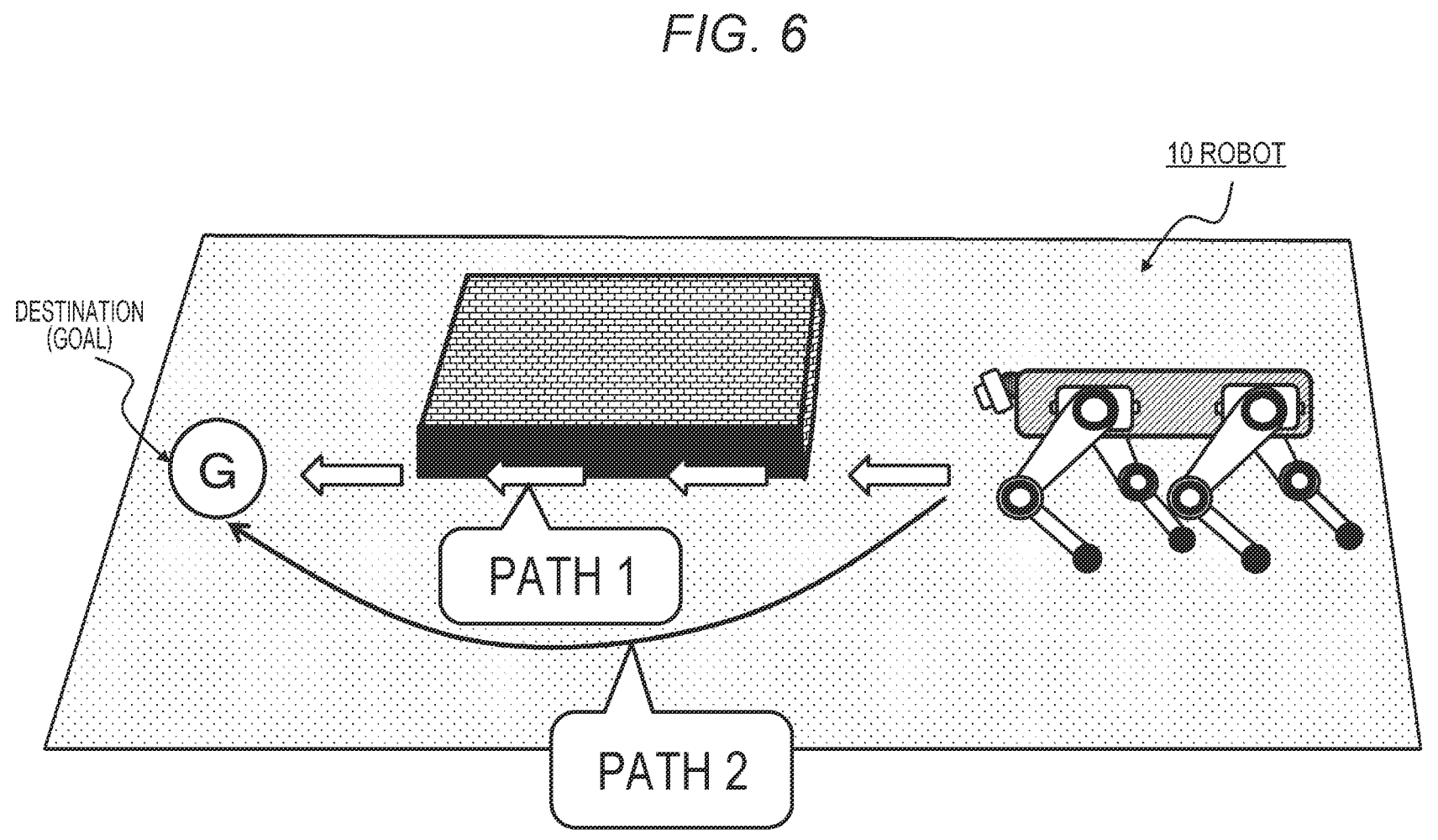

In such a case, for example, it is preferable to select a "path 2" as illustrated in FIG. 6, that is, a flat path to detour and travel.

Figure 7:
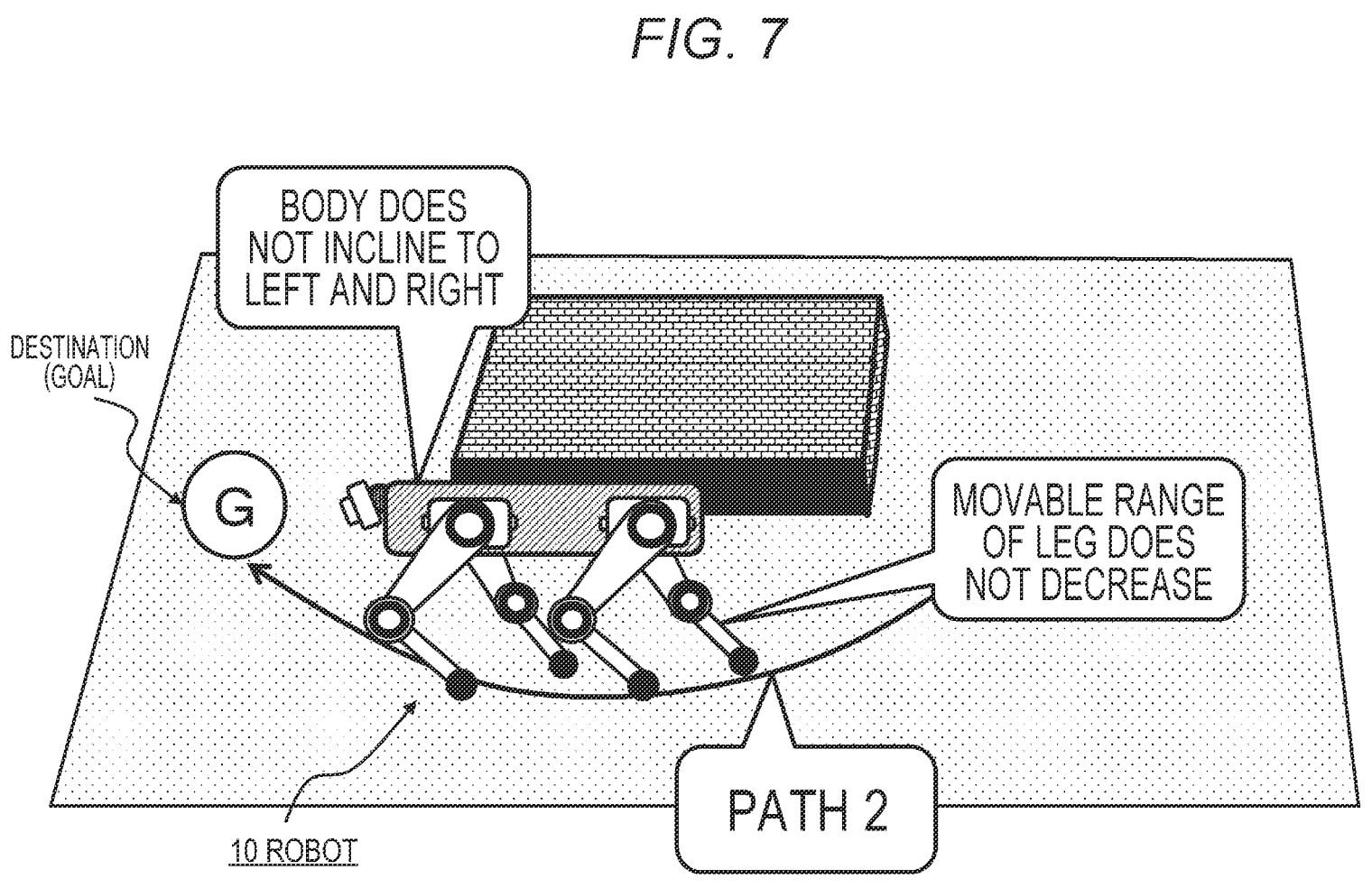

As shown in FIG. 7, by traveling on such a flat "path 2", the robot 10 can travel at a high speed without having the body part 11 inclined to the left and right and without reducing a movable range of the legs. As a result, the robot can safely arrive at the destination (goal) quickly.

The present disclosure calculates costs for a plurality of paths on which a robot as a moving apparatus can travel. The cost is a cost whose value becomes smaller as more stable traveling is possible and whose value becomes larger as traveling becomes more unstable. The processing in the present disclosure calculates costs for the plurality of paths on which the robot as the moving apparatus can travel and executes evaluation processing of each path.

Moreover, a path with the lowest cost, that is, a path that can exhibit stable traveling is selected on the basis of the result of the evaluation processing, and the robot travels on the selected path.

Hereinafter, specific examples of the present disclosure are described.

2. Configuration Example of Moving Apparatus of the Present Disclosure

First, a configuration example of the moving apparatus of the present disclosure is described.

Figure 8:
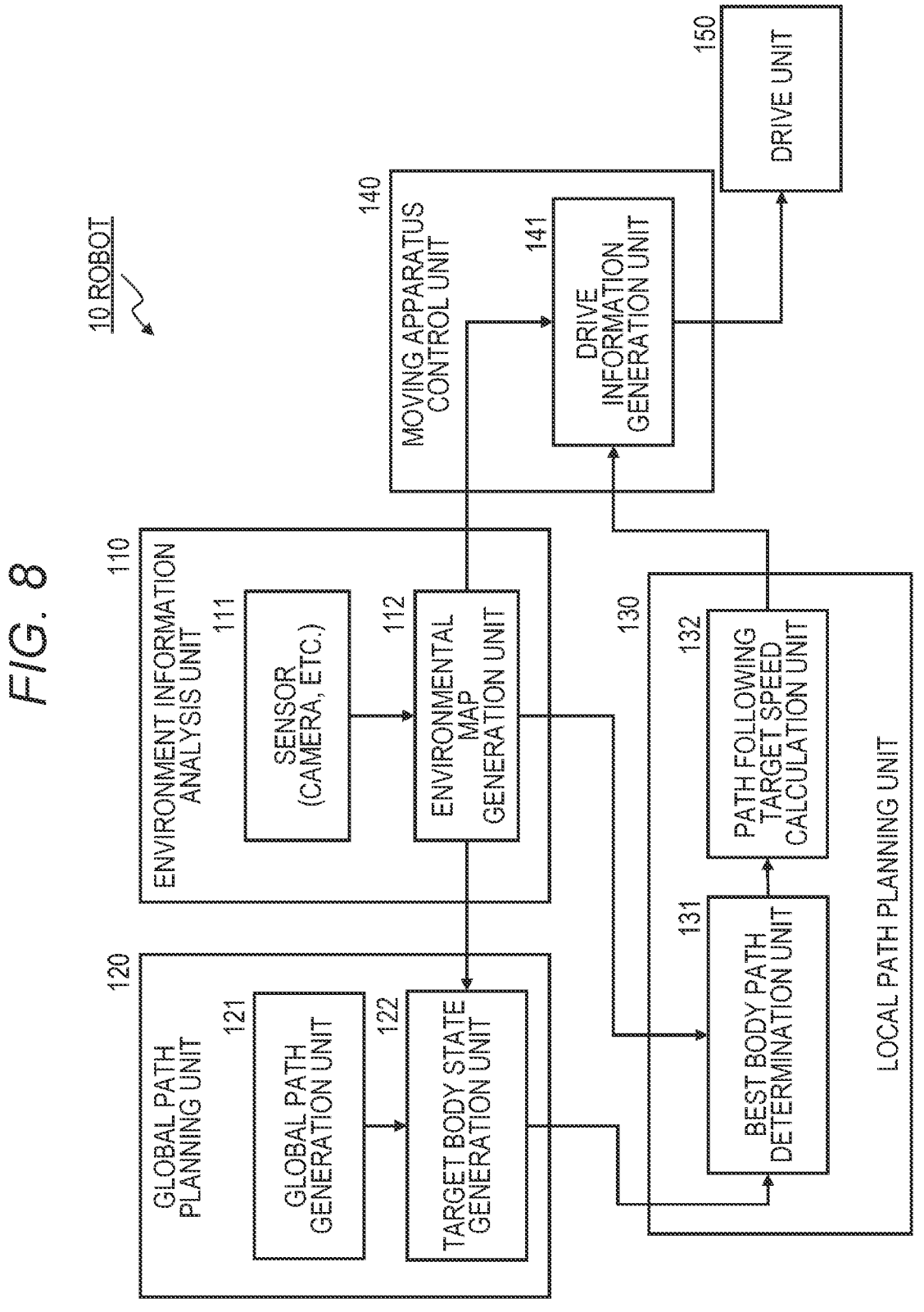
FIG. 8 is a diagram for explaining a configuration example of the robot which is the moving apparatus of the present disclosure.

FIG. 8 is a diagram illustrating a configuration example of the robot 10 which is the moving apparatus of the present disclosure.

As illustrated in FIG. 8, the robot 10 includes an environment information analysis unit 110, a global path planning unit 120, a local path planning unit 130, a moving apparatus control unit 140, and a drive unit 150.

The environment information analysis unit 110 includes a sensor 111 and an environmental map generation unit 112.

The global path planning unit 120 includes a global path generation unit 121 and a target body pose generation unit 122.

The local path planning unit 130 includes a best body path determination unit 131 and a path following target speed calculation unit 132.

The moving apparatus control unit 140 includes a drive information generation unit 141.

The environment information analysis unit 110 integrates a self-position of the robot 10 and recognition information to generate a peripheral map of the robot.

The sensor 111 corresponds to the visual sensor (camera) 15 described above with reference to FIG. 1, and is constituted of, for example, a camera, and acquires an image, distance information, and the like for identifying a position and a shape of an object around the robot 10, a shape of a traveling surface of the robot 10, and the like.

Note that as the sensor 111, for example, any of a monocular camera, a stereo camera, an omnidirectional camera, an infrared camera, a light detection and ranging (LiDAR) sensor, a time of flight (TOF) sensor, or the like, or a combined configuration thereof can be used.

Note that both the LiDAR and TOF sensors are sensors that can measure an object distance.

Detection information of the sensor 111 is input to the environmental map generation unit 112.

The environmental map generation unit 112 performs self-position calculation processing, environmental map creation processing, and the like by using the environmental information around the robot 10 by the sensor 111.

Note that, as representative processing of performing the environmental map creation processing and the self-position estimation processing, simultaneous localization and mapping (SLAM) is known.

SLAM is processing of executing the self-position estimation processing (localization) and the environmental map creation processing (mapping) in parallel using, for example, sensor acquisition information of a camera or the like, and, for example, a captured image of a robot travel environment.

For example, by analyzing a locus of feature points included in a camera-captured image of the robot, three-dimensional positions of the feature points can be estimated, creation (mapping) of a map, a so-called environmental map that enables grasping of an object position and the like around the robot, can be performed, and further, a self-position (robot position) can be estimated (localization).

Note that the SLAM is not limited to visual SLAM using the camera-captured image described above, and there are various methods. For example, there is a method using light detection and ranging (LiDAR) which is a sensor that measures a distance to an obstacle by laser light, which is LiDAR SLAM, and the like.

As described above, the environmental map generation unit 112 calculates the self-position of the robot 10 using the detection information of the sensor 111 and generates the environmental map which is the peripheral map of the robot.

The environmental map and the self-position information generated by the environmental map generation unit 112 are output to the target body pose generation unit 122 of the global path planning unit 120, the best body path determination unit 131 of the local path planning unit 130, and the drive information generation unit 141 of the moving apparatus control unit 140.

The global path planning unit 120 generates a global path from the start position to the final goal position of the robot 10. Note that the global path planning unit 120 also generates a scheduled robot passage time at each position on the global path from the start position to the final goal position of the robot 10.

On the other hand, the local path planning unit 130 generates a local path obtained by correcting the global path from the start position to the final goal position of the robot 10 generated by the global path planning unit 120 for each of a part of local paths.

For example, regarding a partial path within a range where obstacles and a traveling surface shape can be analyzed by the sensor 111 of the robot 10, the local path planning unit 130 sequentially generates local paths obtained by correcting a part of the path to a path that can be safely traveled while the obstacles and steps are avoided as much as possible.

Figure 9:
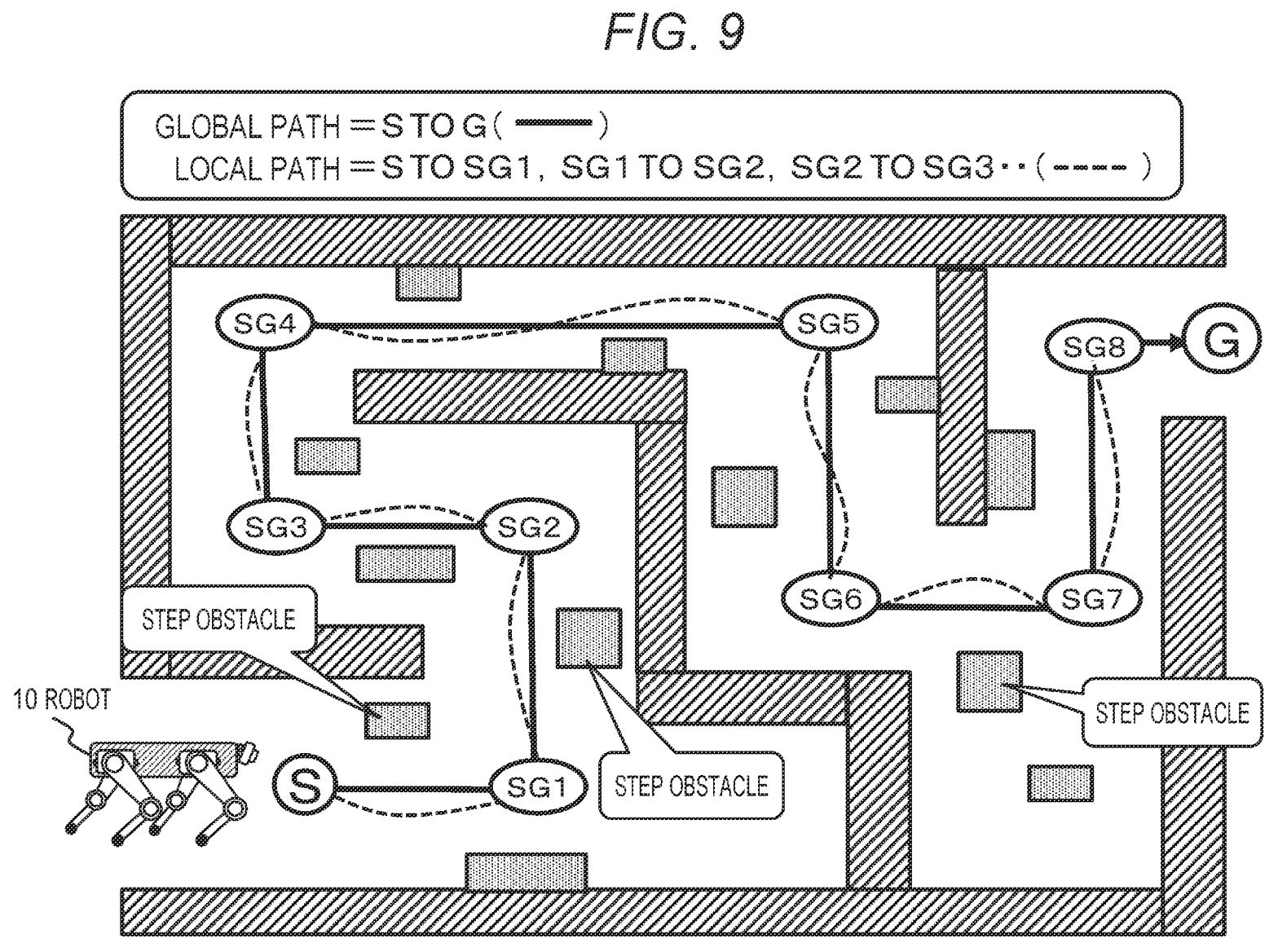

FIG. 9 is a diagram for explaining specific examples of a global path generated by the global path planning unit 120 and local paths generated by the local path planning unit 130.

FIG. 9 illustrates a path from a start position(S) to a goal position (G) of the robot 10.

A path indicated by a solid line in FIG. 9 is a global path. That is, the path indicates a global path from a start position(S) to a goal position (G) of the robot 10.

Meanwhile, paths indicated by dotted lines in FIG. 9 are local paths. These local paths are sequentially generated as the robot 10 moves.

For example, the global path planning unit 120 generates a global path from the start position(S) of the robot 10 to the final goal position (G) so as to obtain the shortest path.

Meanwhile, regarding the range where the obstacles and the traveling surface shape can be analyzed by the sensor 111, the local path planning unit 130 sequentially generates paths that can be safely traveled while the obstacles and steps are avoided as much as possible.

In a case where the robot 10 travels on the global path generated by the global path planning unit 120, there is a possibility that the robot runs on step obstacles illustrated in FIG. 9 and inclines to the left and right.

The local path planning unit 130 generates a local path for traveling while such a state is avoided.

In a case where the robot 10 is in the start position(S) illustrated in FIG. 9, the range in which the sensor 111 of the robot 10 can analyze the obstacles and the traveling surface shape is a range from the start position(S) to a sub-goal 1 (SG1) illustrated in FIG. 9. The local path planning unit 130 first generates, for a partial path (S to SG1), a local path indicated by a dotted line that is modified to a path that can be safely traveled while the obstacles and steps are avoided as much as possible.

The robot 10 travels along the local path indicated by the dotted line. By traveling along the path indicated by the dotted line, the robot 10 can stably travel without causing a state where the robot runs on the step obstacle and inclines to the left and right.

When the robot 10 stably travels from the start position(S) to the sub-goal 1 (SG1) along the local path indicated by the dotted line generated by the local path planning unit and arrives at the sub-goal 1 (SG1), the local path planning unit 130 next generates a local path (SG1 to SG2) indicated by the dotted line for the local path (SG1 to SG2) section where the sensor 111 of the robot 10 can analyze the obstacles and the traveling surface shape.

The local path (SG1 to SG2) is also a local path that can be safely traveled while the obstacles and steps are avoided as much as possible.

In this manner, the local path planning unit 130 sequentially generates local paths obtained by modifying the global path generated by the global path planning unit 120. That is, regarding the range where the obstacles and the traveling surface shape can be analyzed by the sensor 111, the local path planning unit 130 sequentially generates paths that can be safely traveled while the obstacles and steps are avoided as much as possible.

As described above, the global path planning unit 120 includes the global path generation unit 121 and the target body pose generation unit 122.

The local path planning unit 130 includes a best body path determination unit 131 and a path following target speed calculation unit 132.

Processing in each of the above components are described.

The global path generation unit 121 of the global path planning unit 120 generates a global path that allow the robot 10 to move from the start position to the goal position. Furthermore, the global path generation unit 121 generates the scheduled robot passage time at each position on the global path from the start position to the final goal position of the robot 10.

The global path generated by the global path generation unit 121 is output to the target body pose generation unit 122.

The target body pose generation unit 122 calculates a body pose of the robot at each position when the robot travels on the global path generated by the global path generation unit 121. The body pose is three-dimensional data including a position (x,y) of the robot 10 on the horizontal plane and an angle (θ) indicating an orientation of the robot 10, that is, (x,y,θ).

Note that the body of the robot 10 is a body part (main body part) 11 illustrated in FIG. 1. In the present example, as an example of a reference point at the time of determining the travel path of the robot 10, the body of the robot that can be defined by the user is used. The reference point is defined as a point of specific coordinates on one link coordinate system that can be designated by the user of the robot 10, and the reference point does not necessarily have to be a point on the body. Furthermore, the reference point may be a point in the air outside the robot.

The body pose is data indicating both the position and posture of the body part (main body part) 11 illustrated in FIG. 1.

Note that this body pose is, for example, a body pose at each position (x,y) on the global path indicated by the solid line in FIG. 9, and the target body pose generation unit 122 calculates a body pose (x,y,θ) that changes successively as the robot travels.

The body pose (x,y,θ) at each position (x,y) on the global path generated by the target body pose generation unit 122 is output to the best body path determination unit 131 of the local path planning unit 130 together with the global path information generated by the global path generation unit 121.

The best body path determination unit 131 of the local path planning unit 130 inputs each of the following pieces of information.

(a) The self-position of the robot 10 and the environmental map generated by the environment information analysis unit 110

(b) The global path information generated by the global path planning unit 120 and the body pose (x,y,θ) information at each position (x,y) on the global path Using these pieces of information, the best body path determination unit 131 sequentially generates local paths obtained by modifying the global path information generated by the global path planning unit 120, that is, paths (local paths) that can be safely traveled while the obstacles and steps are avoided as much as possible.

As described above with reference to FIG. 9, regarding the range where the obstacles and the traveling surface shape can be analyzed by the sensor 111, the best body path determination unit 131 sequentially generates the local paths (local paths indicated by the dotted lines in FIG. 9) that can be safely traveled while the obstacles and steps are avoided as much as possible.

The best body path determination unit 131 of the local path planning unit 130 sets a plurality of paths on which the robot 10 can travel within the determination section of the local path, and calculates the cost for each path. The cost is a cost whose value becomes smaller as more stable traveling is possible and whose value becomes larger as traveling becomes more unstable. The best body path determination unit 131 calculates the costs for the plurality of paths on which the robot 10 can travel and executes evaluation processing of each path.

Moreover, a path with the lowest cost, that is, a path that can exhibit stable traveling is selected on the basis of the result of the evaluation processing, and the robot travels on the selected path.

A detailed sequence of the processing will be described later.

Note that the best body path determination unit 131 determines a path of the body part (main body part) 11 of the robot 10. That is, the processing of determining a path of each leg is not performed, and a path (=body path) of one reference point (for example, the center of gravity position of the body part (main body part)) of the robot 10 is determined.

The best body path determination unit 131 of the local path planning unit 130 generates the local path so as to be in the body pose (x,y,θ) generated by the target body pose generation unit 122 at each end position of each local path, for example, at each sub-goal position illustrated in FIG. 9.

The local path generated by the best body path determination unit 131 is output to the path following target speed calculation unit 132.

The path following target speed calculation unit 132 generates a target speed at which the robot 10 travels on the local path generated by the best body path determination unit 131.

As described above, the global path generation unit 121 of the global path planning unit 120 generates the scheduled robot passage time at each position on the global path from the start position to the final goal position of the robot 10.

The path following target speed calculation unit 132 generates the traveling target speed of the robot 10 so that the passage time of the robot 10 at each sub-goal position coincides as much as possible with the scheduled robot passage time at each position of the global path calculated by the global path generation unit 121.

The local path generated by the best body path determination unit 131 of the local path planning unit 130 and the target speed information of the robot 10 calculated by the path following target speed calculation unit 132 are output to the drive information generation unit 141 of the moving apparatus control unit 140.

The drive information generation unit 141 of the moving apparatus control unit 140 inputs each of the following pieces of information.

(a) The self-position of the robot 10 and the environmental map generated by the environment information analysis unit 110

(b) The local path and the target speed information of the robot 10 generated by the local path planning unit 130

The drive information generation unit 141 of the moving apparatus control unit 140 generates drive information for causing the robot 10 to travel at the target speed according to the local path on the basis of the above pieces of input information and outputs the drive information to the drive unit 150.

The drive information is, for example, drive information of a motor of each joint part of the robot 10 and the like.

The drive information generation unit 141 of the moving apparatus control unit 140 calculates torque inputs of joints of the robot 10 and determines outputs to be applied to the actuators constituting the drive unit 150.

Note that the drive information generation unit 141 of the moving apparatus control unit 140 uses the environmental map around the robot 10 generated by the environment information analysis unit 110 in order to generate control information including the landing positions of the legs of the robot 10.

Note that the output from the drive information generation unit 141 of the moving apparatus control unit 140 to the drive unit 150 can take various modes, for example, torque, voltage, angular velocity, or position.

The drive unit 150 is, for example, a motor or the like of each joint part of the robot 10, and is driven by the drive information generated by the drive information generation unit 141 of the moving apparatus control unit 140.

3. Details of Processing (Example 1) Executed by Moving Apparatus of the Present Disclosure Next, details of the processing (Example 1) executed by the moving apparatus of the present disclosure is described.

As described above with reference to FIG. 8, in the moving apparatus of the present disclosure, that is, the robot 10, the local path planning unit 130 sequentially generates the local paths obtained by modifying the global path generated by the global path planning unit 120, and performs the travel processing according to the generated local paths.

That is, regarding the range where the obstacles and the traveling surface shape can be analyzed by the sensor 111, the local paths that can be safely traveled while the obstacles and steps are avoided as much as possible are sequentially generated, and by traveling according to the generated local paths, the robot can realize the stable travel.

As described above with reference to FIG. 9, the best body path determination unit 131 of the local path planning unit 130 performs the generation of the local paths indicated by the dotted lines in FIG. 9. That is, the local path planning unit generates the local paths obtained by modifying the global path to the path that can be safely traveled while the obstacles and steps are avoided as much as possible and indicated by the dotted lines.

The best body path determination unit 131 of the local path planning unit 130 sets the plurality of local path candidates on which the robot 10 can travel within the determination section of the local path, and calculates the cost for each path. The cost is a cost whose value becomes smaller as more stable traveling is possible and whose value becomes larger as traveling becomes more unstable.

The best body path determination unit 131 of the local path planning unit 130 calculates the costs for the plurality of local path candidates on which the robot 10 can travel and executes evaluation processing of each path.

Moreover, a path with the lowest cost, that is, a path that can exhibit stable traveling is selected on the basis of the result of the evaluation processing, and the robot travels on the selected path.

Note that various algorithms can be applied as a cost calculation algorithm.

First, as Example 1, an example in which cost calculation processing is performed by applying the cost calculation algorithm in which the cost becomes higher as the magnitude of the left and right inclination of the body part (main body part) 11 of the robot 10 becomes larger is described as Example 1.

The processing of Example 1 is described with reference to FIG. 10 and subsequent drawings.

A detailed sequence of best local path determination processing executed by the best body path determination unit 131 of the local path planning unit 130 is described with reference to FIG. 10 and subsequent drawings.

Figure 10:
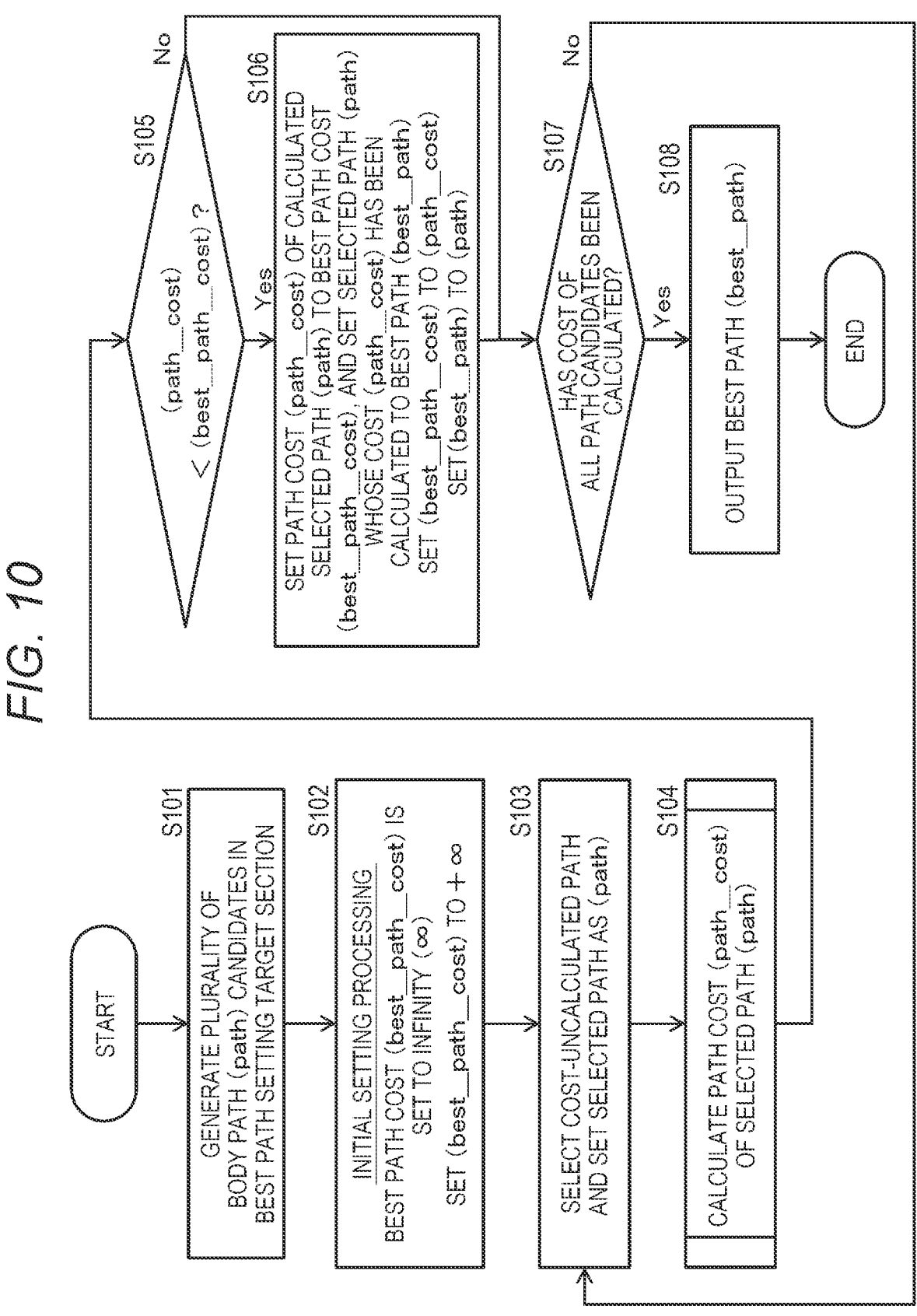
FIG. 10 is a flowchart for explaining a detailed sequence of best local path determination processing executed by a best body path determination unit of the local path planning unit of the moving apparatus of the present disclosure.

FIG. 10 is a flowchart for explaining a detailed sequence of the best local path determination processing executed by the best body path determination unit 131 of the local path planning unit 130.

Note that the processing according to this flow can be executed in accordance with a program stored in a storage unit of information processing apparatus, the information processing apparatus being provided in the robot 10 or being able to communicate with a moving body such as a robot. For example, the processing can be executed as program execution processing by a processor such as a CPU having a program execution function.

Hereinafter, processing of each step in the flow illustrated in FIG. 10 is described.
(Step S101)

First, the best body path determination unit 131 of the local path planning unit 130 generates a plurality of body path (path) candidates in a best path setting target section.

Note that, as described above, the best body path determination unit 131 determines a path of the body part (main body part) 11 of the robot 10. That is, the processing of determining a path of each leg is not performed, and a path (=body path) of one reference point (for example, the center of gravity position of the body part (main body part)) of the robot 10 is determined.

A specific example of the processing of step S101 is described with reference to FIG. 11.

Figure 11:
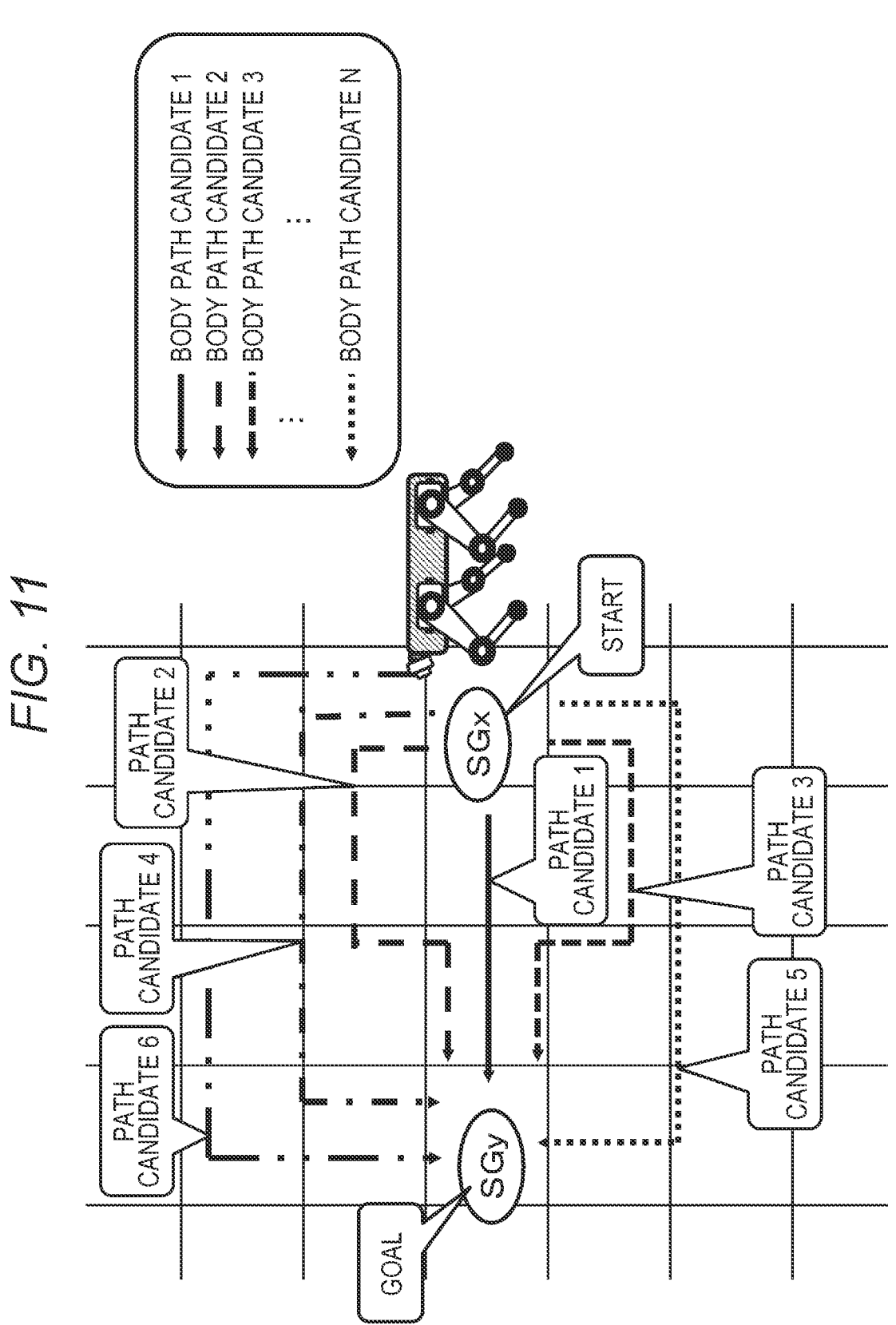
FIG. 11 is a diagram for explaining a specific example of processing executed by the best body path determination unit.

FIG. 11 illustrates the best path setting target sections (SGx to SGy).

As described above with reference to FIG. 9, regarding a partial section in the global path generated by the global path planning unit 120, that is, the range where the obstacles and the traveling surface shape can be analyzed by the sensor 111, the best body path determination unit 131 of the local path planning unit 130 sequentially generates the local paths that can be safely traveled while the obstacles and steps are avoided as much as possible.

For example, a best local path is generated for each range in which the obstacles and the traveling surface shape can be analyzed by the sensor 111, such as a section from the start position(S) to a sub-goal 1 (SG1) illustrated in FIG. 9.

The best path setting target sections (SGx to SGy) illustrated in FIG. 11 corresponds to, for example, a section from the start position(S) to the sub-goal 1 (SG1), a section from the sub-goal 1 (SG1) to a sub-goal 2 (SG2) illustrated in FIG. 9, or the like, and is a local section in which the sensor 111 of the robot 10 can analyze the obstacles and the traveling surface shape.

First, the best body path determination unit 131 of the local path planning unit 130 generates the plurality of body path (path) candidates in, for example, the best path setting target sections (SGx to SGy) illustrated in FIG. 11.

FIG. 11 illustrates an example in which six path candidates from a path candidate 1 to a path candidate 6 are set as body path (path) candidates.

The path candidate 1 is the shortest path of the best path setting target section (SGx to SGy), and the path candidates 2 to 6 illustrate examples in which a plurality of detour paths is set.

Note that the number of path candidates to be set can be defined in advance. Furthermore, the user may successively set the number. In addition, a configuration may be adopted in which a path of the path candidate to be set can also be set according to a predetermined algorithm and the path is successively set by the user.
(Step S102)

Next, in step S102, the following processing is executed as initial setting processing.

A best path cost (best_path_cost) is set to infinity (∞). That is, the initial setting of
  setting best path cost (best_path_cost) to +∞
  is performed.
(Step S103)

Next, in step S103, a cost-uncalculated path is selected and the selected path is set as (path).

For example, an unprocessed path candidate is selected as a processing target from among the six path candidates 1 to 6 set in the best path setting target sections (SGx to SGy) illustrated in FIG. 11. Initially, for example, the path candidate 1 is selected.

(Step S104)

Next, in step S104, a path cost (path_cost) of the selected path (path) selected as the processing target in step S103 is calculated.

The path cost is a cost whose value becomes smaller as more stable traveling is possible and whose value becomes larger as traveling becomes more unstable.

In Example 1, it is determined that the body pose in which the left and right inclination occurs in the body part (main body part) 11 of the robot 10 is unstable, and the cost having the higher cost as the left and right inclination of the body part (main body part) 11 becomes larger is calculated.

Figure 12:
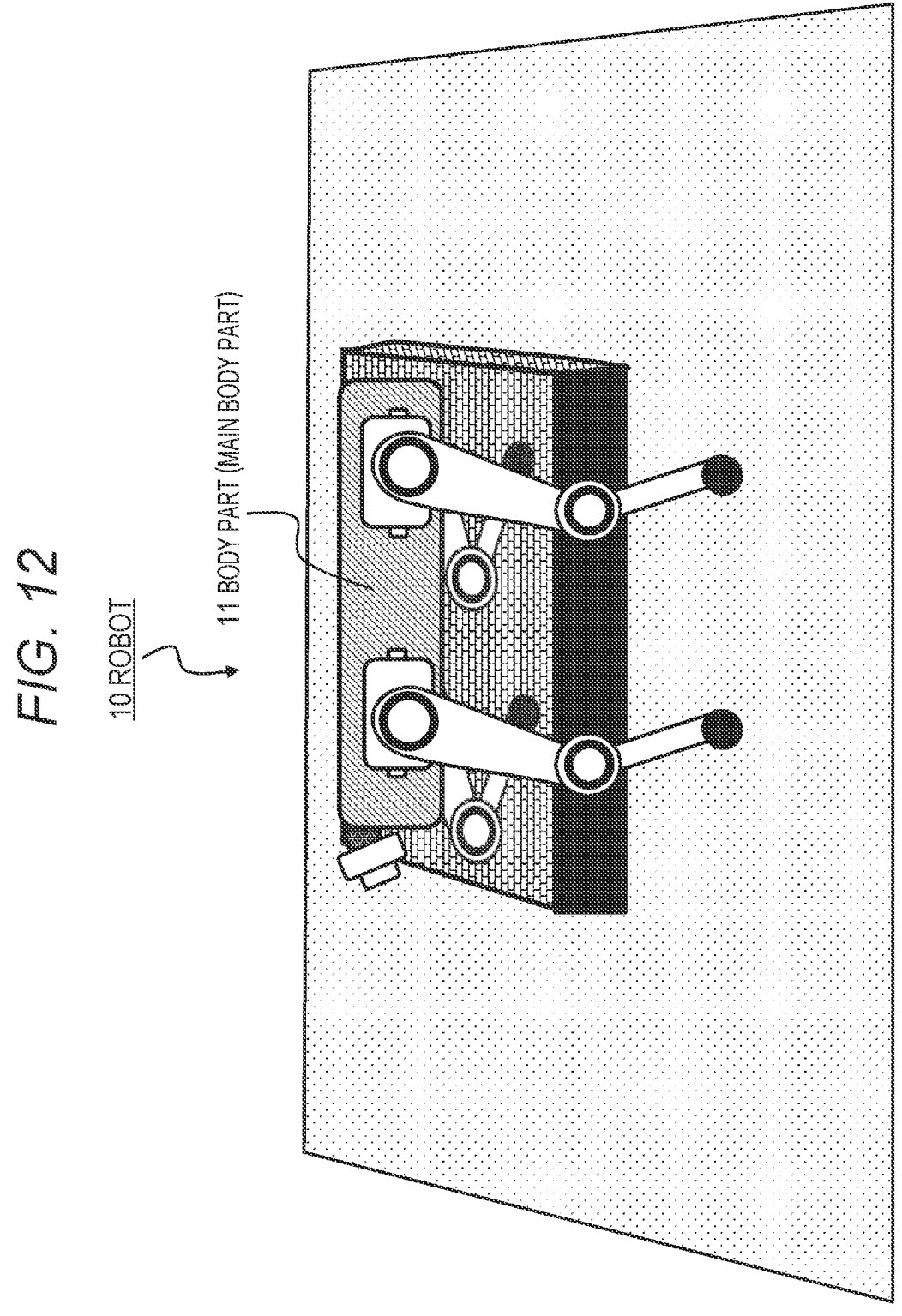
FIG. 12 is a diagram for explaining an example in which a higher cost is calculated as a left and right inclination of a body part (main body part) of the robot is larger.

For example, as illustrated in FIG. 12, it is determined that as the difference in height between the landing positions of the left leg and the right leg of the robot 10 becomes larger, the cost becomes higher.

As the difference between the heights of the landing positions of the left leg and the right leg of the robot 10 becomes larger, the left and right inclination of the body part (main body part) 11 of the robot 10 becomes larger, and the stability of the robot 10 decreases. Therefore, a cost value of such a state is calculated as a large value.

Note that the details of cost calculation processing will be described later.

In the example illustrated in FIG. 12, both the left front and back legs of the robot 10 are landed at positions higher than the landing positions of the right front and back legs, but there are various other states as states determined to be the high cost.

Figure 13:
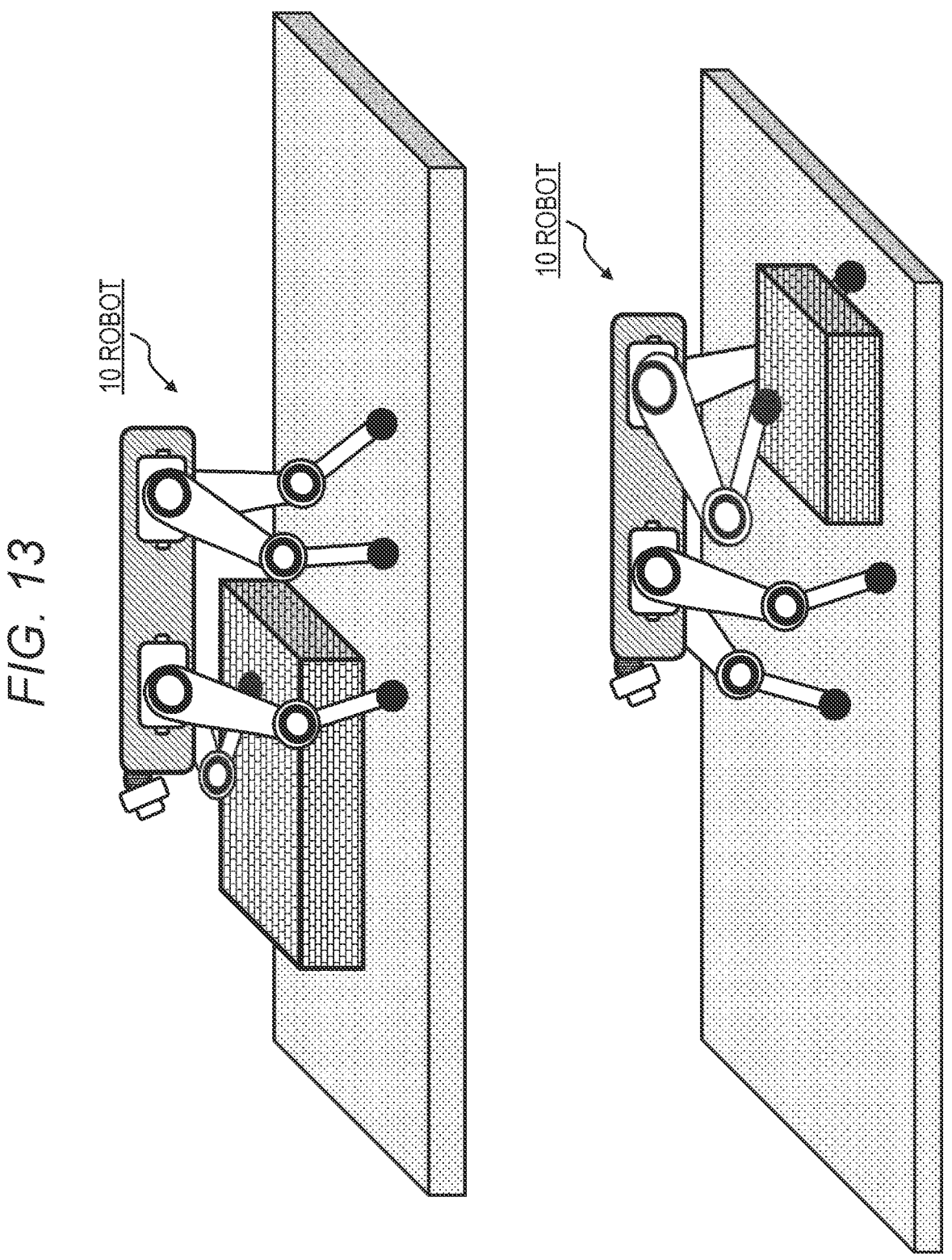
FIG. 13 is a diagram for explaining an example in which a higher cost is calculated as the left and right inclination of a body part (main body part) of the robot is larger.

FIG. 13 is a diagram illustrating another example in which the cost is determined to be high. The two examples illustrated in FIG. 13 are an example in which only one of the left and right front legs of the robot 10 is at a high landing position and an example in which only one of the left and right back legs of the robot 10 is at a high landing position.

Even in such a case, the left and right inclination of the body part (main body part) 11 of the robot 10 becomes larger and the stability of the robot 10 decreases. Therefore, the cost value of such a state is calculated as a large value.

Figure 14:
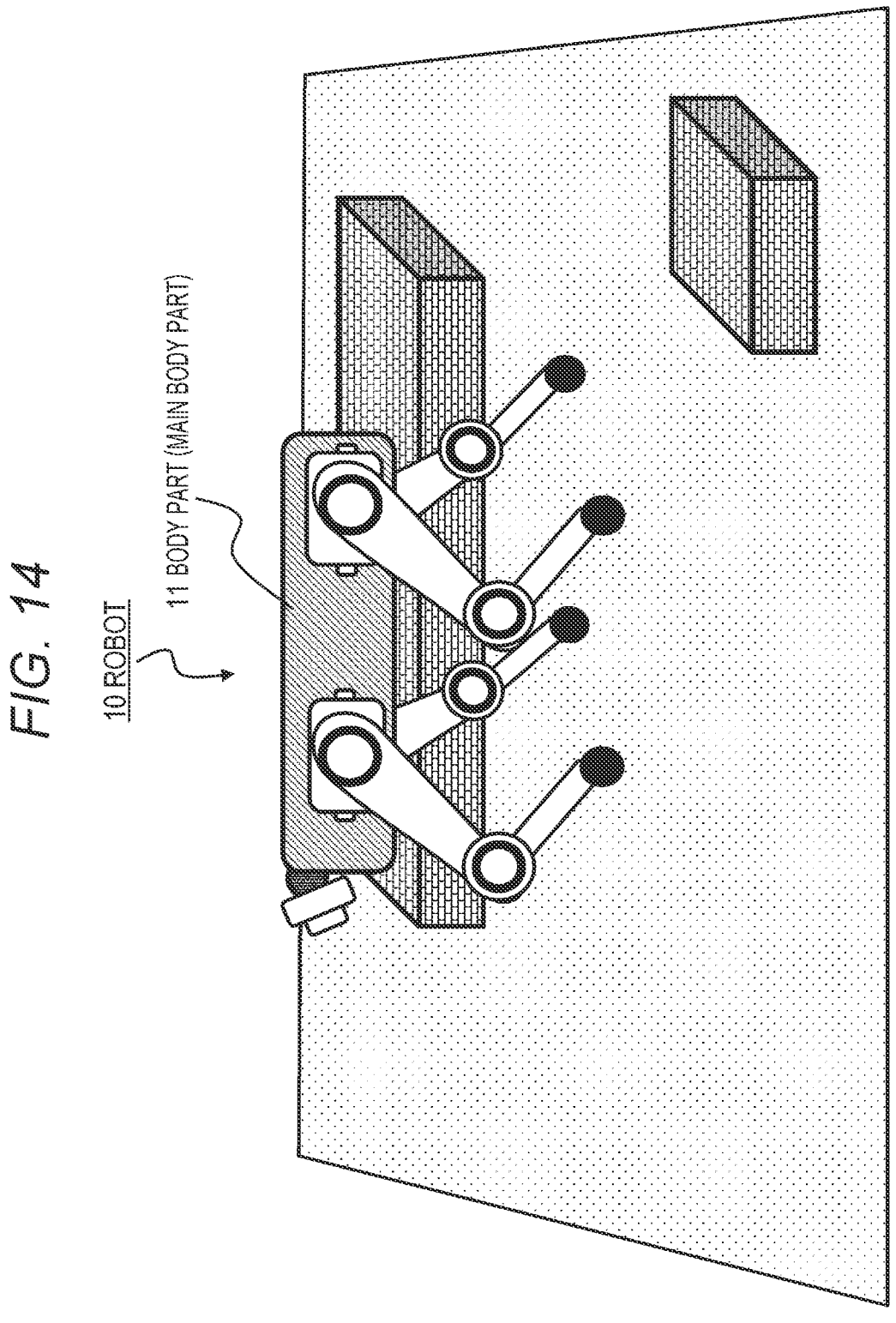
FIG. 14 is a diagram for explaining an example in which a higher cost is calculated as the left and right inclination of a body part (main body part) of the robot is larger.

Meanwhile, for example, as illustrated in FIG. 14, in a case where the robot 10 is located on a plane, that is, in a case where there is no difference in the heights of the landing positions of the four legs of the robot 10, the left and right inclination is not generated in the body part (main body part) 11 of the robot 10. Therefore, the calculated cost value in a case of such a state becomes low.

Figure 15:
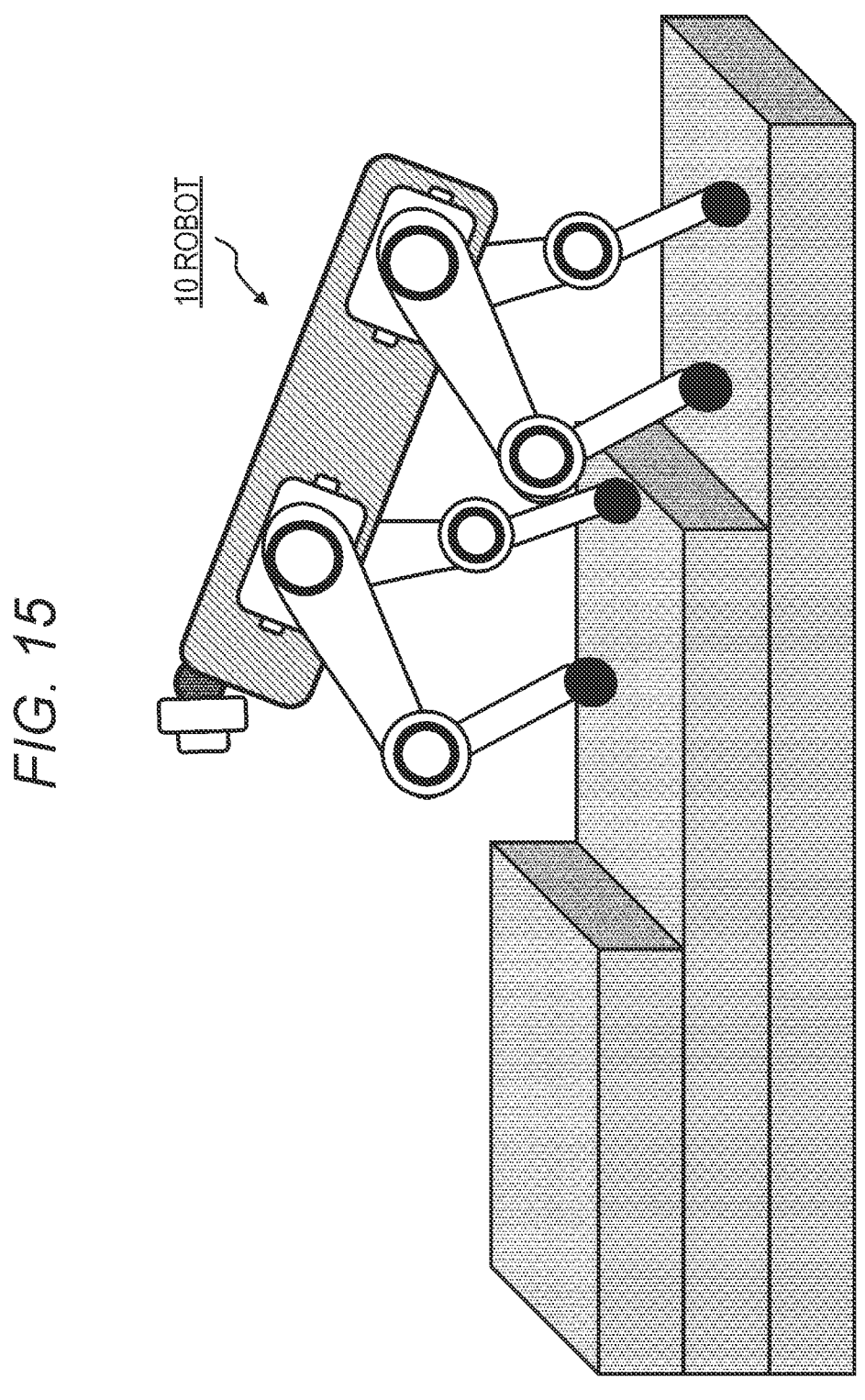
FIG. 15 is a diagram for explaining an example in which a higher cost is calculated as the left and right inclination of a body part (main body part) of the robot is larger.

Furthermore, for example, as illustrated in FIG. 15, in a case where the robot 10 ascends the stairs, both the left and right front legs of the robot 10 are landed on a surface having the same height. Furthermore, the back legs of the robot 10 on the left and right sides are also landed on a surface in the same height. In such a case, a front and back inclination occurs in the body part (main body part) 11 of the robot 10, but the left and right inclination does not occur. Therefore, the calculated cost value in a case of such a state also becomes low.

As described above, in the present example, the cost calculation processing is performed by applying the cost calculation algorithm in which the cost becomes higher as the magnitude of the left and right inclination of the body part (main body part) 11 of the robot 10 becomes larger.

Note that, although a specific example will be described later, the cost calculation algorithm can be set in various ways. If the cost calculation algorithm to be used is changed, the cost can be calculated with different values according to various robot poses.

As described above, in step S104, the path cost (path_cost) of the selected path (path) selected as the processing target in step S103 is calculated.

The details of the cost calculation processing of step S104 will be described later with reference to FIG. 16 and subsequent drawings.

(Step S105)

After completing the calculation processing of the cost (path_cost) of one selected path (path) in step S104, next, processing of step S105 is executed.

In step S105, the best body path determination unit 131 of the local path planning unit 130 performs processing of comparing the cost (path_cost) of the selected path (path) for which the cost (path_cost) has been calculated in step S104 with the best path cost (best_path_cost).

The best path cost (best_path_cost) to be a comparison target is the best path cost (best_path_cost) initially set in step S102 or the already calculated best path cost (best_path_cost) corresponding to the path candidate.

In a case where the value of the cost (path cost) of the selected path (path) for which the cost (path_cost) has been calculated in step S104 is smaller than the value of the best path cost (best_path_cost), that is, in a case where a comparison and determination formula $$(\text{path\_cost}) < (\text{best\_path\_cost})$$

is satisfied, the process proceeds to step S106.

On the other hand, in a case where the comparison and determination formula described above is not satisfied, the process proceeds to step S107.

(Step S106)

The processing of step S106 is executed in a case where the determination is Yes in step S105.

That is, in a case where the value of the cost (path_cost) of the selected path (path) for which the cost (path cost) has been calculated in step S104 is smaller than the value of the best path cost (best_path_cost), that is, in a case where the comparison and determination formula $$(\text{path\_cost}) < (\text{best\_path\_cost})$$

is satisfied, the processing of step S106 is executed.

In this case, the best body path determination unit 131 of the local path planning unit 130 executes the following processing of step S106.

The cost (path_cost) calculated in step S104 of the selected path (path) is set to the best path cost (best_path_cost), and the selected path (path) whose cost (path_cost) has been calculated is set to the best path (best_path).

That is, the following data replacement processing is executed.

Set best path cost (best_path_cost) to calculated path cost (path_cost)

Set best path (best_path) to selected path (path)

This processing is processing in which, in a case where the calculated cost (path_cost) of the selected path (path) is the lowest, the selected path (path) is set to the best path (best_path), and the calculated path cost (path_cost) of the selected path (path) is set to the best path cost (best_path_cost).

(Step S107)

The processing of step S107 is executed when the data replacement processing of step S106 is completed, or in a case where the following comparison and determination formula $$(path\_cost) < (best\_path\_cost)$$

is not established in step S105.

In this case, in step S107, the best body path determination unit 131 of the local path planning unit 130 determines whether or not the cost calculation processing for all the path candidates has been completed.

In a case where there is an unprocessed path candidate, the determination in step S107 is No, the process returns to step S103, the unprocessed path candidate is selected, and the processing of step S104 and subsequent steps is executed for the selected unprocessed candidate path.

In a case where it is determined in step S107 that the cost calculation processing for all the path candidates has been completed, the process proceeds to step S108.

(Step S108)

In a case where it is determined in step S107 that the cost calculation processing for all the path candidates has been completed, the processing of step S108 is executed.

In step S108, the best body path determination unit 131 of the local path planning unit 130 outputs the best path (best_path) determined at this time to the path following target speed calculation unit 132 of the next stage.

Note that the output best path (best_path) is the path (path) with the lowest cost. That is, the output best path is a path in which a degree of occurrence of the left and right inclination of the body part (main body part) 11 of the robot 10 is the smallest.

This selected path information is output to the drive information generation unit 141 of the moving apparatus control unit 140 via the path following target speed calculation unit 132 of the next stage.

The drive information generation unit 141 of the moving apparatus control unit 140 generates control information for causing the robot 10 to drive and travel along the best path (best_path) and controls the drive unit 150.

This control allows the robot 10 to travel along the best path (best_path). That is, the robot 10 can travel along the best path on which the robot can travel with the smallest left and right inclination of the body part (main body part) 11 among the plurality of path candidates.

Next, a detailed sequence of the processing of (step S104) described with reference to the flowchart in FIG. 10, that is, the calculation processing of the path cost (path_cost) of the selected path (path) selected in step S103 is described with reference to a flowchart illustrated in FIG. 16.

The calculation processing of the path cost (path_cost) of the selected path (path) is executed according to the processing of steps S201 to S205 of the flow illustrated in FIG. 16.

Hereinafter, the processing of each step is described in order.

(Step S201)

Step S201 is the initial setting processing.

The following initial setting is performed.

The initial value of the path cost (path_cost) of the selected path (path) selected as a cost calculation target is set to 0, and the initial value of a cost calculation body position (i (i=0 to N)) is set to 0.

That is, the initial setting of setting path cost (path_cost) to 0 setting cost calculation body position (i) to 0 is performed.

Details of the initial setting executed in step S201 is described with reference to FIG. 17.

Figure 17:
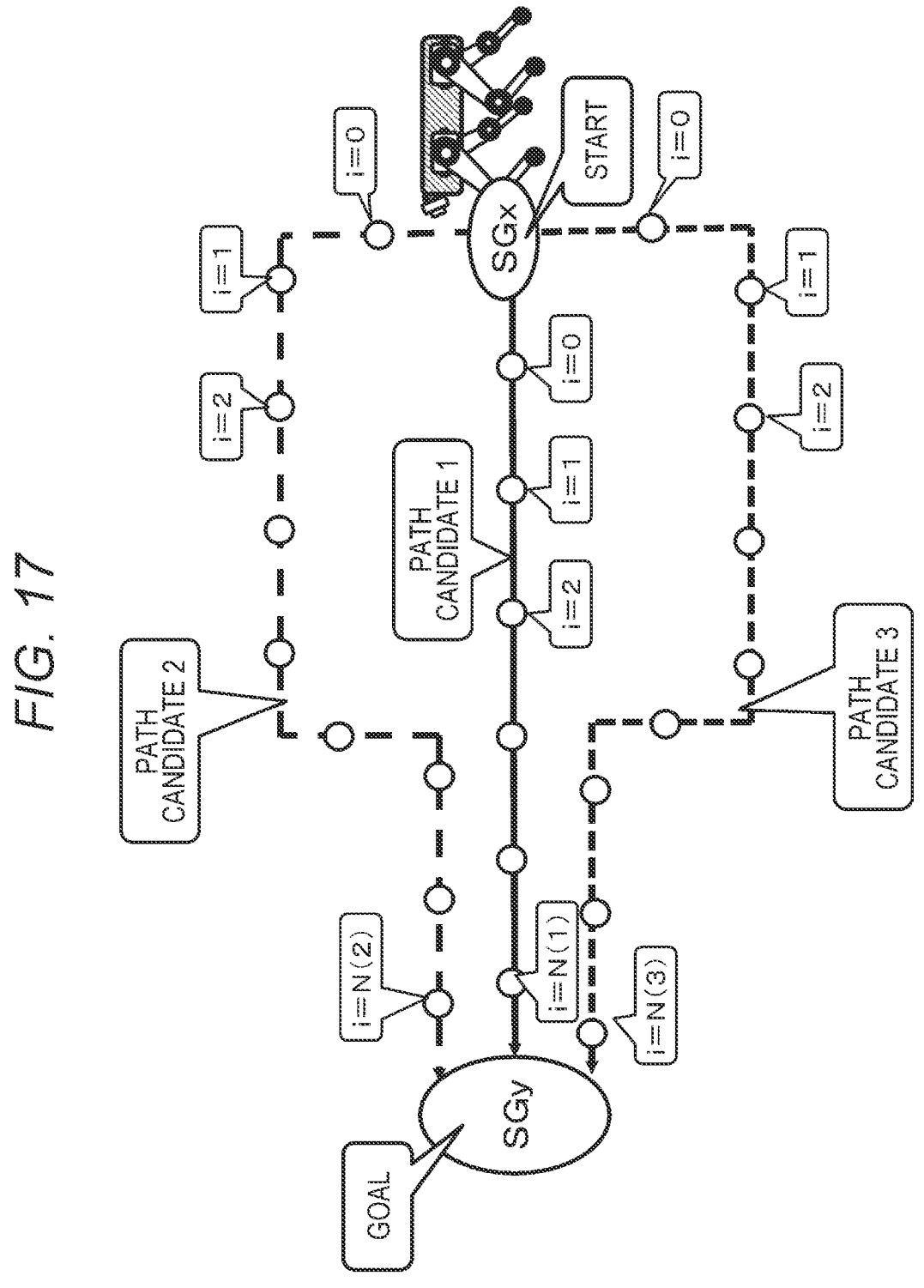
FIG. 17 is a diagram for explaining a specific example of processing executed by the best body path determination unit.

FIG. 17 illustrates the path candidates 1 to 6 described above with reference to FIG. 11, that is, the path candidates 1 to 3, which is a part of the six path candidates 1 to 6 set in the best path setting target section (SGx to SGy) in step S101 of the flow illustrated in FIG. 10.

In step S103 of the flow illustrated in FIG. 10, one path candidate is sequentially selected as the cost calculation target from the path candidates 1 to 6, and in step S104, that is, in the processing of step S201 to S205 illustrated in FIG. 16, the cost calculation processing of the selected path is executed.

The path candidate selected as the cost calculation target is set, for example, in the order of the path candidates 1, and the path candidates 2, 3, 4, 5, and 6.

First, in a case where the path candidate 1 is selected as the cost calculation target, in step S201, the processing of setting the initial value of the path cost 1 (path1_cost) of the selected path 1 (path1) selected as the cost calculation target to 0, and setting the initial value of the cost calculation body position (i (i=0 to N)) to 0 is performed.

The cost calculation body positions (i (i=0 to N)) are sampling points (i) set at equal intervals on each path candidate illustrated in FIG. 17, that is, the cost calculation body positions (i=0, 1, . . . . N).

These sampling points (i) are set at equal intervals on each candidate path. For example, the sampling points are set at intervals of 0.5 m.

These sampling points are sampling points indicating the cost calculation body positions (i=0, 1, . . . . N).

The cost is calculated at each sampling point, and a total (addition value) of the costs corresponding to all sampling points on one path is calculated as the path cost (path_cost).

Note that, as understood from FIG. 17, the path candidate 1, the path candidate 2, and the path candidate 3 are paths connecting the best path setting target sections (SGx to SGy), but have different lengths from each other. Therefore, the number of sampling points of each path candidate is also different from the others.

As the path is longer, the number of sampling points increases, and the value of the path cost calculated as a result also tends to become higher.

In step S201, the initial setting of setting path cost (path_cost) to 0 setting cost calculation body position (i) to 0 is performed.

With the initial value of the path cost set to 0, the initial value of the cost calculation body position (i) is set to 0, that is, as illustrated in FIG. 17, the processing of selecting the sampling point (i=0) closest to the start position (SGx) of the best path setting target sections (SGx to SGy) as the cost calculation position is performed.

(Step S202)

Step S202 is a body pose cost calculation processing step at one sampling point (cost calculation body position (i)) on the selected path (path).

That is, the processing of calculating a body pose cost calculation value (calc_pose_cost (body_pos [i])) at the cost calculation body position (i) of the selected path (path), and setting a body pose cost (pose_cost) as a calculation value (calc_pose_cost (body_pos [i])) is executed.

Set body pose cost (pose_cost) to body pose cost calculation value (calc_pose_cost (body_pos[i]))

The above body pose cost (pose_cost) calculation processing is executed.

Note that, as described above with reference to FIGS. 12 to 15, in the calculation processing of the cost (body pose cost) in the present example, the cost calculation algorithm is applied such that the larger the left and right inclination of the body part (main body part) 11, the higher the cost.

As described above, in step S202, the cost (body pose cost) calculation processing at one sampling point (i) on one selected path (path) is executed.

A detailed sequence of the cost calculation processing will be described later in the following stage with reference to flowcharts in FIG. 18 and subsequent drawings.

(Step S203)

When the cost (body pose cost) calculation processing at one sampling point (i) on one selected path (path) is completed in step S202, processing of step S203 is executed.

In step S203, update processing of the path cost (path_cost) of the selected path (path) is performed.

That is, processing of adding the body pose cost (pose_cost) calculated in step S202 to the path cost (path_cost) and updating the path cost (path_cost) is executed.

Set path cost(path_cost) to path cost(path_cost)+
body pose cost(pose_cost)

The above path cost (path_cost) update processing is executed.

(Step S204)

Next, in step S204, update processing of the sampling point (cost calculation body position (i)) is executed.

That is, the cost calculation body position (i (i=0 to N)) of the selected path (path) is updated.

Set i to i+1

The sampling point (cost calculation body position (i)) is advanced by one according to the above formula.

(Step S205)

In step S205, it is determined whether or not the value of the sampling point (cost calculation body position (i)) updated by the update processing of the sampling point (cost calculation body position (i)) in step S204 is a value smaller than the number of sampling points (N) set in the selected path (path).

That is, it is determined whether or not the following determination formula is satisfied.

$$i < N?$$

In a case where the above determination formula is satisfied, it means that there is a sampling point (cost calculation body position (i)) for which the cost calculation processing is not yet performed.

In this case, the process returns to step S202, and the calculation processing of the body pose cost (pose_cost) for the updated sampling point (cost calculation body position (i)) is executed. That is, the processing of step S202 and subsequent steps is executed.

On the other hand, in a case where the above determination formula is not satisfied, it means that there is no sampling point (cost calculation body position (i)) for which the cost calculation processing is unprocessed, and the calculation processing of the body pose cost (pose_cost) for all the sampling points (cost calculation body positions (i=0 to N)) on the selected path (path) is completed.

In this case, the process proceeds to step S105 of the flow illustrated in FIG. 10.

Next, a detailed sequence of the processing of step S202 in the flowchart in FIG. 16, that is, the calculation processing of the body pose cost (pose_cost) in the sampling point (cost calculation body position (i)) is described with reference to FIG. 18 and subsequent drawings.

FIGS. 18 to 20 are flowcharts describing a detailed sequence of the processing of step S202 in the flowchart in FIG. 16.

The calculation processing of the body pose cost (pose_cost) at one sampling point (cost calculation body position (i)) of one selected path selected as the cost calculation target is executed according to processing of steps S301 to S317 illustrated in FIGS. 18 to 20.

Hereinafter, the processing of each step is described in order.

(Step S301)

Step S301 is preparation processing before the start of the processing loop of steps S302 to S306.

In step S301, first, a minimum height (min_heights) and a maximum height (max_heights) of one leg of the robot are set as variables.

That is, the minimum height (min_heights) and the maximum height (max_heights) of one leg of the robot 10 are set as variables as follows.

Set (min_heights) to (4-element array)
Set (max_heights) to (4-element array)

(Step S302)

Steps S302 to S306 constitute a processing loop of processing for each leg of the robot 10.

In the present example, the robot 10 has four legs. While setting a leg identifier as k (k=1, 2, 3, and 4), a processing target leg (k) is sequentially selected, and the processing of steps S303 to S305 is executed for the selected processing target leg (k).

(Step S303)

In step S303, the following processing is executed for the selected processing target leg (k).

The leg arrangeable region of the leg (k) is extracted with reference to the body position (body_pos) at the cost calculation body position (i) and the surrounding environmental map.

A specific example of the processing of step S303 is described with reference to FIG. 21.

Figure 21:
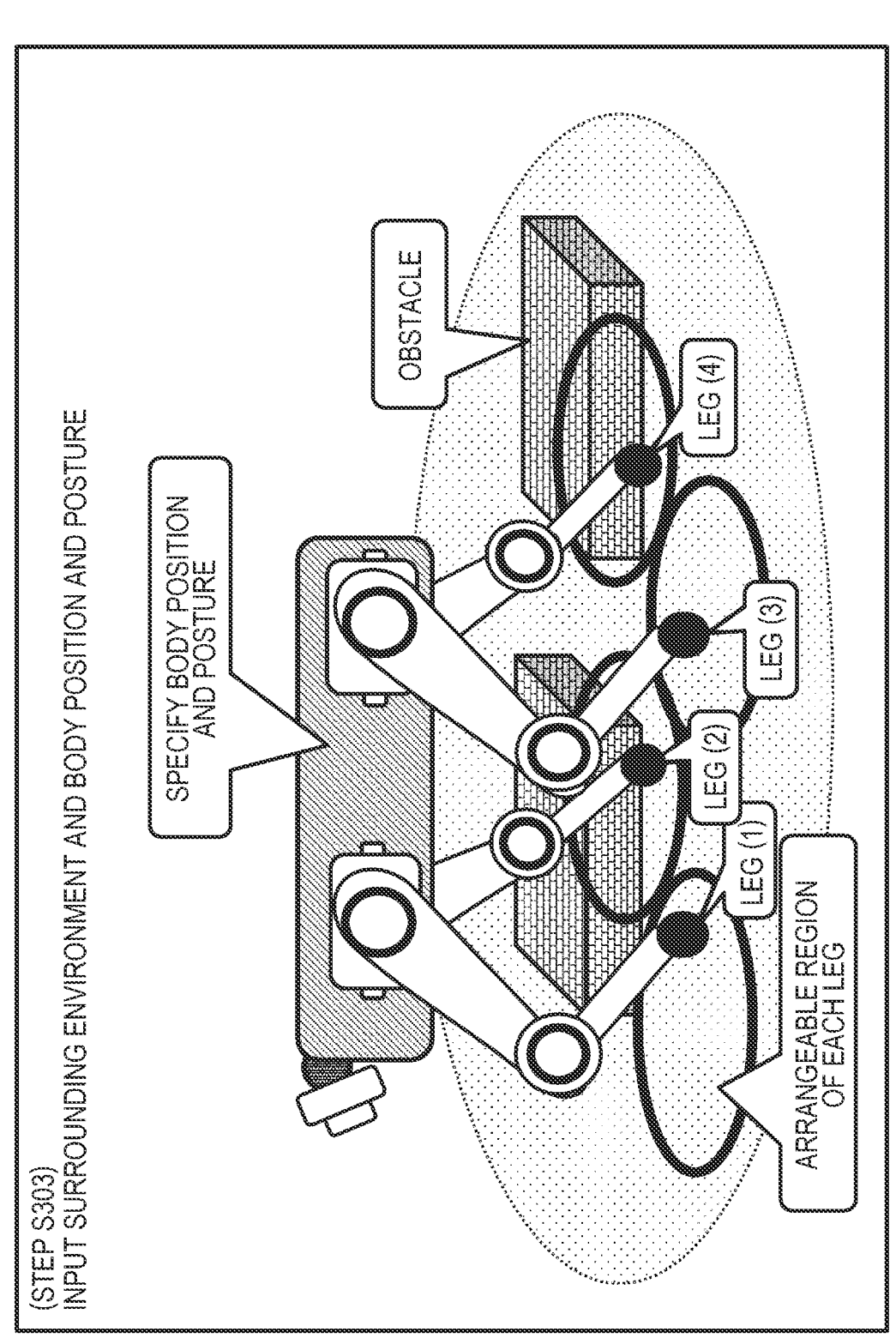
FIG. 21 is a diagram for explaining a specific example of processing executed by the best body path determination unit.

FIG. 21 illustrates the robot 10. It is assumed that the robot 10 is at the cost calculation body position (i).

In this position, the robot 10 can move each leg within the movable range of each leg to land the leg.

In the drawing, the movable range of each leg, that is, a landable region is indicated by a circular solid line.

The robot 10 can freely move each leg in the landable region to land the leg.

For example, in a case where the left front leg is a leg (1), the right front leg is a leg (2), the left back leg is a leg (3), and the left back leg is a leg (4), the left front leg (leg (1)) can freely move within the landable region around the leg (1) illustrated in the drawing to be landed.

The right front leg (leg (2)) can freely move within the landable region around the leg (2) illustrated in the drawing to be landed.

Each of the left back leg (leg (3)) and the left back leg (leg (4)) can freely move within the landable region around each of the legs to be landed.

In step S303, the leg arrangeable region at the cost calculation body position (i) is extracted for the selected processing target leg (k). That is, for one leg (k) selected from the four legs illustrated in FIG. 21, the leg arrangeable region indicated by the circular solid line around the leg (k) is extracted.

(Steps S304 to S305)

Next, in steps S304 and S305, the following processing is executed for the leg (k) selected as the processing target.

In step S304, the minimum leg arrangement height (min_heights (k)) in the leg arrangeable region of the leg (k) at the cost calculation body position (i) is calculated.

In step S305, the maximum leg arrangement height (max_heights (k)) in the leg arrangeable region of the leg (k) at the cost calculation body position (i) is calculated.

Hereinafter, a specific example of this processing is described with reference to FIGS. 22A and 22B.

FIGS. 22A and 22B illustrate a processing example in a case where the leg (k) selected as the processing target is the right front leg (leg (2)).

The leg arrangeable region indicated by the circular solid line is illustrated around the right front leg (leg (2)).

Each of the drawings in the upper left part FIG. 22A and the lower right part FIG. 22B illustrated in FIGS. 22A and 22B are diagrams illustrating different landing states of the right front leg (leg (2)).

FIG. 22A illustrates a state in which the right front leg (leg (2)) does not get on the step obstacle in the leg arrangeable region but is landed on a low plane.

FIG. 22B illustrates a state in which the right front leg (leg (2)) gets on the step obstacle in the leg arrangeable region and is landed on an upper surface of the step obstacle.

In the leg arrangeable region indicated by the circular solid line around the right front leg (leg (2)), there are traveling surfaces having different landing heights of the leg.

Step S304 is processing of calculating the minimum leg arrangement height (min_heights (k)) in the leg arrangeable region of the leg (k), and in the case of the right front leg (leg (2)) illustrated in FIGS. 22A and 22B, the processing of calculating the landing height of the leg (2) not on the step obstacle as illustrated in FIG. 22A, as the minimum leg arrangement height (min_heights (k)) is performed.

Furthermore, step S305 is processing of calculating the maximum leg arrangement height (max_heights (k)) in the leg arrangeable region of the leg (k), and in the case of the right front leg (leg (2)) illustrated in FIGS. 22A and 22B, the processing of calculating the landing height of the leg (2) on the step obstacle as illustrated in (b) in FIG. 22B, as the maximum leg arrangement height (min_heights (k)) is performed.

In this manner, in steps S304 to S305, the minimum leg arrangement height (min_heights (k)) and the maximum leg arrangement height (max_heights (k)) in the leg arrangeable region of the leg (k) at the cost calculation body position (i) are calculated.

As described above, steps S302 to S306 constitute the processing loop of processing for each leg of the robot 10.

In the present example, the robot 10 has four legs, and when the processing loop of steps S302 to S306 is completed, each of the following pieces of data (1) to (4) is calculated.

(1) The minimum leg arrangement height (min_heights (1)) and the maximum leg arrangement height (max_heights (1)) of the left front leg (leg (1)), (2) The minimum leg arrangement height (min_heights (2)) and the maximum leg arrangement height (max_heights (2)) of the right front leg (leg (2)), (3) The minimum leg arrangement height (min_heights (3)) and the maximum leg arrangement height (max_heights (3)) of the left back leg (leg (3)), (4) The minimum leg arrangement height (min_heights (4)) and the maximum leg arrangement height (max_heights (4)) of the right back leg (leg (4)), at the cost calculation body position (i).

When the processing loop of steps S302 to S306 is completed, the process proceeds to step S311 of the flow illustrated in FIG. 19.

(Step S311)

Step S311 is preparation processing before the execution of the processing loop of steps S312 to S317.

In step S311, the worst body pose cost (worst_pose_cost) is set to minus infinity ($-\infty$).

Set worst body pose cost (worst_pose_cost) to $-\infty$

Before the processing loop of steps S312 to S317 is executed, the above cost initial setting processing is performed.

(Step S312)

Steps S312 to S317 constitute a processing loop of processing for each leg arrangement pose of the robot 10.

Steps S312 to S317 are the processing loop for each of $(2\times2\times2\times2)=16$ ways of combination of "minimum leg arrangement height (min_heights (k))" and "maximum leg arrangement height (max_heights (k))"

for each of the legs (k=1 to 4) at the cost calculation body position (i).

In the present example, the robot 10 has four legs, and in steps S302 to S306 constituting the processing loop for each leg described above, the following pieces of data have been calculated.

(1) The minimum leg arrangement height (min_heights (1)) and the maximum leg arrangement height (max_heights (1)) of the left front leg (leg (1)), (2) The minimum leg arrangement height (min_heights (2)) and the maximum leg arrangement height (max_heights (2)) of the right front leg (leg (2)), (3) The minimum leg arrangement height (min_heights (3)) and the maximum leg arrangement height (max_heights (3)) of the left back leg (leg (3)), (4) The minimum leg arrangement height (min_heights (4)) and the maximum leg arrangement height (max_heights (4)) of the right back leg (leg (4)), at the cost calculation body position (i).

Steps S312 to S317 are the processing loop for each of $(2\times2\times2\times2)=16$ ways of combination of "minimum leg arrangement height (min_heights (k))" and "maximum leg arrangement height (max_heights (k))"

for each of the legs (k=1 to 4).

A setting example of $(2\times2\times2\times2)=16$ ways of each of the legs (k=1 to 4) executed in the processing loop of steps S312 to S317 is described with reference to FIG. 23.

In the processing loop of steps S312 to S317, the processing is sequentially performed for each of 16 ways of combination patterns of the landing heights of the four legs of the robot 10.

FIG. 23 illustrates these 16 examples.

A table shown in FIG. 23 indicates 16 uncombined patterns of landing positions (Low, High) of the left front leg (FL), the right front leg (FR), the left back leg (BL), and the right back leg (FL).

Note that Low and High correspond to the "minimum leg arrangement height (min_heights (k))" and the "maximum leg arrangement height (max_heights (k))" calculated in the processing loop of steps S302 to S307. That is, Low is the "minimum leg arrangement height (min_heights (k))", and High is the "maximum leg arrangement height (max_heights (k))".

As illustrated in FIG. (1) on the right side in FIG. 23, the first Entry 1 (Low, Low, Low, Low) illustrated in the table in FIG. 23 corresponds to a state in which all four legs of the robot 10 are landed on the low traveling surface without getting on the step obstacle.

Figure 2:
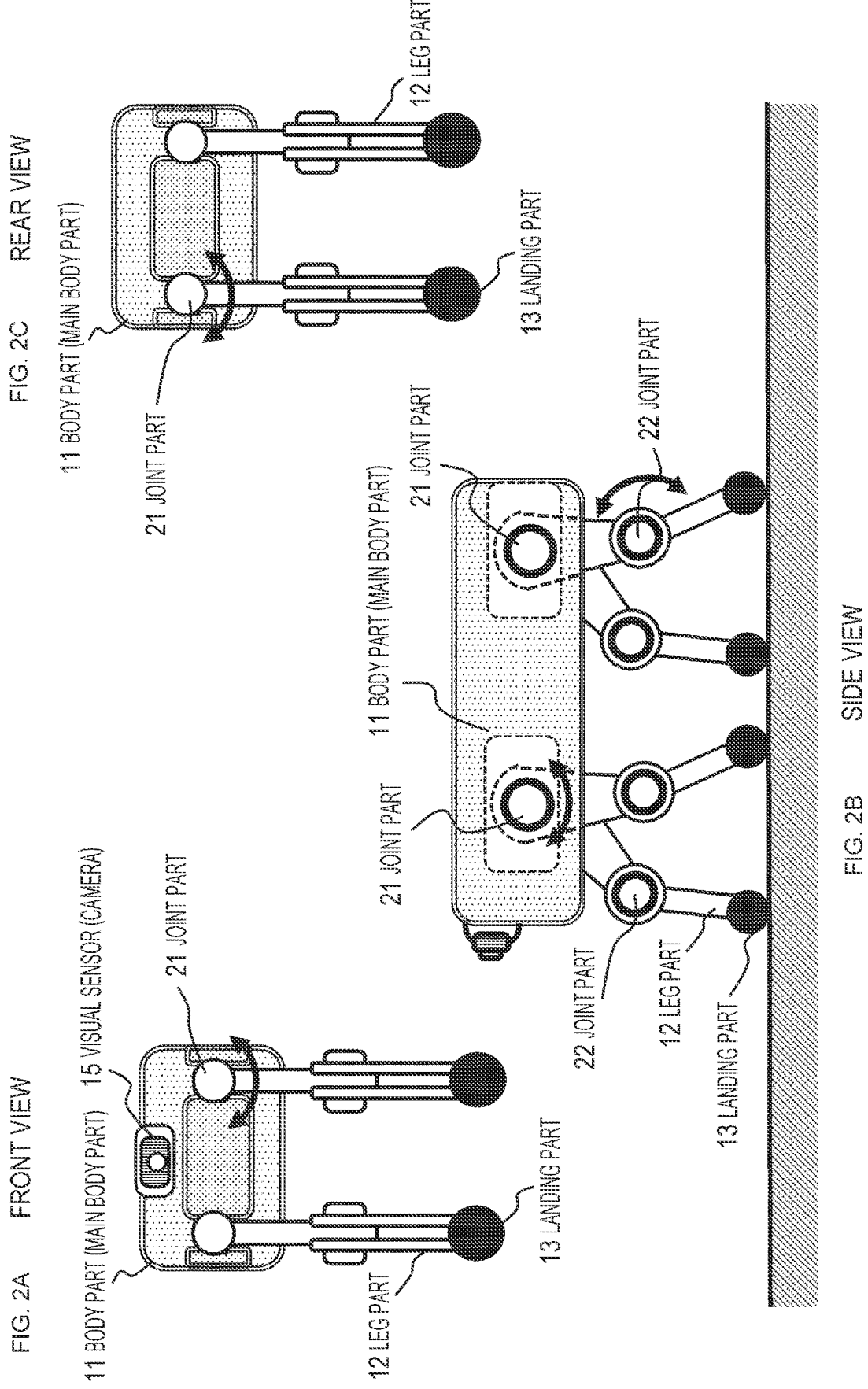
FIGS. 2A, 2B, and 2C are diagrams for explaining a configuration example of the four-legged robot which is an example of the moving apparatus of the present disclosure.

Furthermore, as illustrated in FIG. 2) on the right side in FIG. 23, Entry 4 (Low, High, Low, Low) illustrated in the table in FIG. 23 corresponds to a state in which only the right front leg of the robot 10 is landed on the high traveling surface on the step obstacle, and the remaining three legs are landed on the low traveling surface without getting on the step obstacle.

As described above, there are 16 ways of combination patterns of the landing heights of the four legs of the robot 10, and in the processing loop of steps S312 to S317, the processing is sequentially performed for each of these 16 ways of combination patterns.

However, at the cost calculation body position (i), it is not always possible that the all four legs of the robot 10 each have leg arrangements with two different heights of Low and High, that is, each leg have the two types of leg arrangements of "minimum leg arrangement height (min_heights (k))" and "maximum leg arrangement height (max_heights (k))".

In some cases, there is no step at all at the cost calculation body position (i), or only some legs can be put on the step.

A specific example is described with reference to FIG. 24.

In the example illustrated on the right side in FIG. 24, only the left front leg of the robot 10 can be landed at the two different height positions, which are above and below the step, and the three legs other than the left front leg are in the planar region having no step in the leg arrangeable region.

In such a case, there are only two ways of the combination patterns of the landing heights of the four legs of the robot 10, and not 16 ways.

As illustrated in FIG. 1) on the right side in FIG. 24, a state in which all four legs of the robot 10 are landed on the low traveling surface without getting on the step obstacle corresponds to the first Entry 1 (Low, Low, Low, Low) illustrated in the table in FIG. 24.

Furthermore, a state illustrated in FIG. 2) on the right side in FIG. 24, that is, a state in which only the left front leg of the robot 10 is landed on the high traveling surface on the step obstacle, and the remaining three legs are landed on the low traveling surface without getting on the step obstacle corresponds to Entry 5 (High, Low, Low, Low) illustrated in the table in FIG. 24.

In a case where the sampling point (cost calculation body position (i)) is set such that only the left front leg can be put on the step as illustrated on the right side in FIG. 24, there are only the above two ways of leg arrangement patterns. In such a case, the processing loop of steps S312 to S317 is only required to be executed only for the two ways of leg arrangement patterns instead of the 16 ways.

In addition, for example, in a case where the sampling point (cost calculation body position (i)) is on a plane where the leg arrangeable regions of all the legs are the same height as illustrated on the right side in FIG. 25, there is only the leg arrangement pattern of only the first Entry 1 (Low, Low, Low, Low) illustrated in the table in FIG. 25.

In such a case, the processing loop of steps S312 to S317 is only required to be executed only for this one way of leg arrangement patterns instead of the 16 ways.

(Step S313)

Steps S313 to S316 are processing steps sequentially executed for any one of the above 16 ways of leg arrangement patterns.

First, in step S313, the following processing is executed for one leg arrangement pattern set as the processing target.

It is assumed that f_pose is a leg arrangement pose (leg_pose (k)) in a case where the leg (k) is the front leg of the robot, and b_pose is a leg arrangement pose (leg_pose (k)) in a case where the leg (k) is the back leg of the robot.

That is, the following data definition is executed.

Set f_pose to {leg_pose (k): leg (k) is the front leg of the robot}

Set b_pose to {leg_pose (k): leg (k) is the back leg of the robot}

(Step S314)

Next, in step S314, the calculation processing of the body pose cost (pose_cost) for one leg arrangement pattern at one sampling point (cost calculation body position (i)) is executed.

Specifically, the following body pose cost (pose_cost) calculation processing is executed.

An addition value of a difference (max (f_pose)−min (f_pose)) between the maximum height and the minimum height of the front leg and a difference (max (b_pose)−min (b_pose)) between the maximum height and the minimum height of the back leg is calculated as the body pose cost (pose_cost).

That is, the calculation processing of the body pose cost (pose_cost) is executed according to the following formula.

$$\text{Set body pose cost(pose\_cost) to } (\max(f\_pose) - \min(f\_pose)) + (\max(b\_pose) - \min(b\_pose))$$

The body pose cost (pose_cost) calculated in step S314 becomes higher as the difference in landing heights between the left front leg and the right front leg becomes larger, and becomes higher as the difference in landing heights between the left back leg and the right back leg becomes larger.

Furthermore, the body pose cost (pose_cost) decreases as the difference in landing height between the left front leg and the right front leg decreases, and decreases as the difference in landing height between the left back leg and the right back leg decreases.

As described above with reference to FIGS. 12 to 15, this cost calculation algorithm is the cost calculation algorithm in which the cost becomes higher as the left and right inclination of the body part (main body part) 11 becomes larger.

(Step S315)

When the body pose cost (pose_cost) calculation processing corresponding to one leg arrangement pattern at one sampling point (cost calculation body position (i)) is completed in step S314, comparison processing between the calculated body pose cost (pose_cost) and the worst body pose cost (worst_pose_cost) is executed in step S315.

That is, it is determined whether or not the following determination formula is satisfied.

$$\text{body pose cost(pose\_cost)} > \text{worst body pose cost (worst\_pose\_cost)?}$$

The above determination formula is a determination formula for determining whether or not the body pose cost (pose_cost) corresponding to one leg arrangement pattern calculated in step S314 is a value larger than the initial setting value or the already calculated worst body pose cost (worst_pose_cost).

In a case where it is determined that the body pose cost (pose_cost) corresponding to one leg arrangement pattern calculated in step S314 is a value larger than the initial setting value or the already calculated worst body pose cost (worst_pose_cost), the determination in step S315 is Yes, and the process proceeds to step S316.

On the other hand, in a case where it is determined that the body pose cost (pose_cost) corresponding to one leg arrangement pattern calculated in step S314 is a value not larger than the initial setting value or the already calculated worst body pose cost (worst_pose_cost), the determination in step S315 is No, and the process proceeds to step S317.

(Step S316)

The processing of step S316 is executed in a case where the determination result in step S315 is Yes, that is, in a case where it is determined that the body pose cost (pose_cost) corresponding to one leg arrangement pattern calculated in step S314 is a value larger than the initial setting value or the already calculated worst body pose cost (worst_pose_cost).

In this case, in step S316, processing of setting the worst body pose cost (worst_pose_cost) to the body pose cost (pose_cost) calculated in step S314 is executed.

That is, the processing of setting the worst body pose cost (worst_pose_cost) to the body pose cost (pose_cost) calculated in step S314 is executed according to the following formula.

> Set worst body pose cost(worst_pose_cost) to body pose cost(pose_cost)

Figure 26:
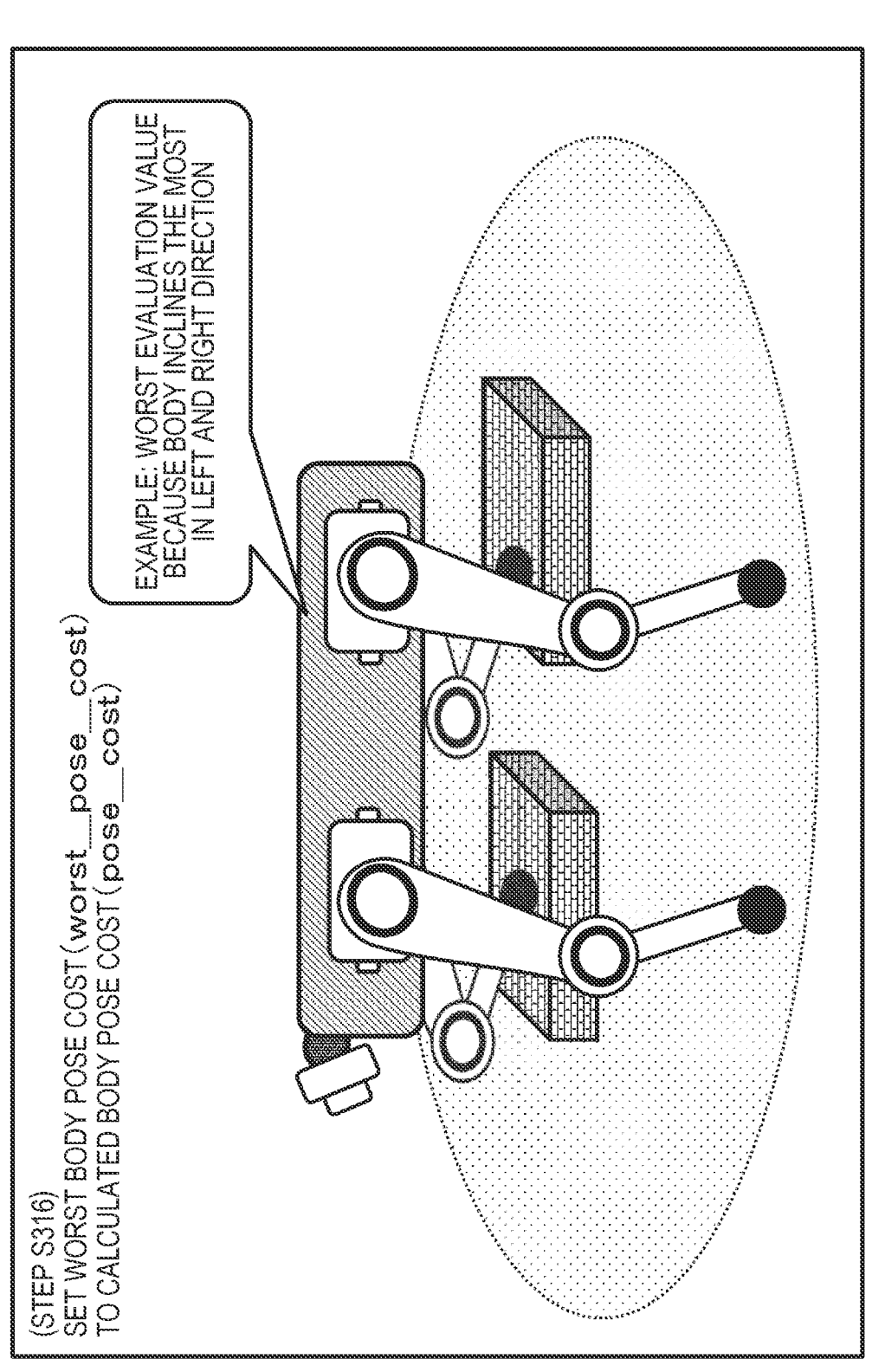
FIG. 26 is a diagram for explaining a specific example of processing executed by the best body path determination unit.

FIG. 26 illustrates an example of the leg arrangement pattern that is the worst body pose cost (worst_pose_cost).

The example illustrated in FIG. 26 is the leg arrangement pattern in which the left front and back legs of the robot 10 are landed at positions higher than the landing positions of the right front and back legs. In the case of such a leg arrangement pattern, the value of the body pose cost (pose_cost) becomes larger, and it is highly possible that the cost will correspond to the worst body pose cost (worst_pose_cost).

(Step S317)

Step S317 is an end step of the processing loop from steps S312 to S317.

The processing of steps S313 to S316 is executed for the combination patterns of landing heights of the four legs of the robot 10 in one sampling point (cost calculation body position (i)), the patterns including 16 ways at maximum, the body pose cost (pose_cost) corresponding to each of the patterns is calculated, and the worst body pose cost (worst_pose_cost) having the highest cost among the calculated costs is calculated as the body pose cost (pose_cost).

After the processing is completed, the process proceeds to step S203 of the flow illustrated in FIG. 16.

Next, the processing of step S203 and subsequent steps are described.

In step S203, update processing of the path cost (path_cost) of the selected path (path) is performed.

That is, the processing of updating the path cost (path_cost) is executed by adding the body pose cost (pose_cost) calculated in step S202, that is, the body pose cost (pose_cost) corresponding to the worst body pose cost (worst_pose_cost) having the highest cost at one sampling point (cost calculation body position (i)) to the path cost (path_cost) being the cost calculation target.

> Set path cost(path_cost) to path cost(path_cost)+ body pose cost(pose_cost)

The above path cost (path_cost) update processing is executed.

In steps S201 to S205 illustrated in FIG. 16, a path cost (path_cost) of one selected path is calculated by adding all body pose costs (pose_cost) corresponding to the worst body pose cost (worst_pose_cost) having the highest cost of all sampling points (cost calculation body positions (i)) set to the one selected path.

The processing of steps S201 to S205 illustrated in FIG. 16 is the processing of step S104 of the flow illustrated in FIG. 10, and when the path cost (path_cost) calculation processing of one selected path is completed in step S104, the processing proceeds to step S105 of the flow illustrated in FIG. 10.

Next, the processing of step S105 and subsequent steps are described again.

(Step S105)

In step S105, the processing of comparing the cost (path_cost) of the selected path (path) for which the cost (path_cost) has been calculated in step S104 (=steps S201 to S205 illustrated in FIG. 16) with the best path cost (best_path_cost) is performed.

The best path cost (best_path_cost) to be a comparison target is the best path cost (best_path_cost) initially set in step S102 or the already calculated best path cost (best_path_cost) corresponding to the path candidate.

In a case where the value of the cost (path_cost) of the selected path (path) for which the cost (path_cost) has been calculated in step S104 is smaller than the value of the best path cost (best_path_cost), that is, in a case where a comparison and determination formula > (path_cost)<(best_path_cost)

is satisfied, the process proceeds to step S106.

On the other hand, in a case where the comparison and determination formula described above is not satisfied, the process proceeds to step S107.

(Step S106)

The processing of step S106 is executed in a case where the determination is Yes in step S105.

That is, in a case where the value of the cost (path_cost) of the selected path (path) for which the cost (path_cost) has been calculated in step S104 is smaller than the value of the best path cost (best_path_cost), that is, in a case where the comparison and determination formula > (path_cost)<(best_path_cost)

is satisfied, the processing of step S106 is executed.

In this case, the best body path determination unit 131 of the local path planning unit 130 executes the following processing of step S106.

The cost (path_cost) calculated in step S104 of the selected path (path) is set to the best path cost (best_path_cost), and the selected path (path) whose cost (path_cost) has been calculated is set to the best path (best_path).

That is, the following data replacement processing is executed.

> Set best path cost(best_path_cost) to calculated path cost (path_cost)
>
> Set best path(best_path) to selected path(path)

This processing is processing in which, in a case where the calculated cost (path_cost) of the selected path (path) is the lowest, the selected path (path) is set to the best path (best_path), and the calculated path cost (path_cost) of the selected path (path) is set to the best path cost (best_path_cost).

(Step S107)

The processing of step S107 is executed when the data replacement processing of step S106 is completed, or in a case where the following comparison and determination formula > (path_cost)<(best_path_cost)

is not established in step S105.

In this case, in step S107, the best body path determination unit 131 of the local path planning unit 130 determines whether or not the cost calculation processing for all the path candidates has been completed.

In a case where there is an unprocessed path candidate, the determination in step S107 is No, the process returns to step S103, the unprocessed path candidate is selected, and the processing of step S104 and subsequent steps is executed for the selected unprocessed candidate path.

In a case where it is determined in step S107 that the cost calculation processing for all the path candidates has been completed, the process proceeds to step S108.

(Step S108)

In a case where it is determined in step S107 that the cost calculation processing for all the path candidates has been completed, the processing of step S108 is executed.

In step S108, the best body path determination unit 131 of the local path planning unit 130 outputs the best path (best_path) determined at this time to the path following target speed calculation unit 132 of the next stage.

Note that the output best path (best_path) is the path (path) with the lowest cost. That is, the output best path is a path in which a degree of occurrence of the left and right inclination of the body part (main body part) 11 of the robot 10 is the smallest.

This selected path information is output to the drive information generation unit 141 of the moving apparatus control unit 140 via the path following target speed calculation unit 132 of the next stage.

The drive information generation unit 141 of the moving apparatus control unit 140 generates control information for causing the robot 10 to drive and travel along the best path (best_path) and controls the drive unit 150.

This control allows the robot 10 to travel along the best path (best_path). That is, the robot 10 can travel along the best path on which the robot can travel with the smallest left and right inclination of the body part (main body part) 11 among the plurality of path candidates.

The processing executed by the best body path determination unit 131 of the local path planning unit 130 is collectively described as follows.

The best body path determination unit 131 of the local path planning unit 130 first generates the plurality of path candidates in the local path generation section, for example, each section of the local path generation sections (SGx to SGy) described above with reference to FIG. 9, and further sets the plurality of sampling points (cost calculation body positions (i)) to each path candidate.

Next, the cost corresponding to the leg arrangement pattern with the highest cost among the plurality of possible leg arrangement patterns for each of the plurality of sampling points (cost calculation body positions (i)) is calculated as the body pose cost (pose_cost).

Next, the addition value (total) of the body pose costs (pose_cost) of all the sampling points (cost calculation body positions (i)) in the path candidates is calculated as the path cost (pqth_cost).

Finally, the path having the smallest cost value among the path costs (pqth_cost) of each of the plurality of path candidates is selected as the best path (best_path).

The best body path determination unit 131 of the local path planning unit 130 executes such processing and generates the path having the smallest cost value as the best path (best path) for each of the local path generation sections.

The generated best path (best_path) is the path with the lowest cost and is a path on which the robot 10 can travel with the degree of occurrence of left and right inclination of the body part (main body part) 11 of the robot being minimized.

This control allows the robot 10 to travel along the best path (best_path). That is, the robot 10 can travel along the best path on which the robot can travel with the smallest left and right inclination of the body part (main body part) 11 among the plurality of path candidates.

4. (Example 2) Example to which User-Defined Cost Calculation Algorithm is Applied Next, as Example 2, an example to which a user-defined cost calculation algorithm is applied is described.

Example 1 described with reference to FIGS. 10, 11, 12, 13, 14, 15, 16, 17, 18, 19, 20, 21, 22A, 22B, 23, 24, 25, and 26 are examples in which the cost calculation processing is performed by applying the cost calculation algorithm in which the cost becomes higher as the magnitude of the left and right inclination of the body part (main body part) 11 of the robot 10 becomes larger.

However, as described above, various algorithms can be applied as the cost calculation algorithm. If the cost calculation algorithm to be used is changed, the cost can be calculated with different values according to various robot poses.

Hereinafter, as Example 2, an example to which the user-defined cost calculation algorithm is applied is described.

A configuration of a robot 10 in Example 2 is similar to the configuration described above with reference to FIG. 8.

In Example 2, the processing executed in the best body path determination unit 131 of the local path planning unit 130, that is, the processing of generating the path (local path) on which the robot can safely travel while the obstacles and steps are avoided as much as possible is different.

As described above with reference to FIG. 9, regarding the range where the obstacles and the traveling surface shape can be analyzed by the sensor 111, the best body path determination unit 131 sequentially generates the local paths (local paths indicated by the dotted lines in FIG. 9) that can be safely traveled while the obstacles and steps are avoided as much as possible.

The best body path determination unit 131 of the local path planning unit 130 sets a plurality of paths on which the robot 10 can travel within the determination section of the local path, and calculates the cost for each path. The cost is a cost whose value becomes smaller as more stable traveling is possible and whose value becomes larger as traveling becomes more unstable. The best body path determination unit 131 calculates the costs for the plurality of paths on which the robot 10 can travel and executes evaluation processing of each path.

Moreover, a path with the lowest cost, that is, a path that can exhibit stable traveling is selected on the basis of the result of the evaluation processing, and the robot travels on the selected path.

In Example 1 described above with reference to FIGS. 10, 11, 12, 13, 14, 15, 16, 17, 18, 19, 20, 21, 22A, 22B, 23, 24, 25, and 26, as the cost calculation processing of the path, the processing is performed by applying the cost calculation algorithm in which the cost becomes higher as the magnitude of the left and right inclination of the body part (main body part) 11 of the robot 10 becomes larger.

On the other hand, in Example 2, the user-defined cost calculation algorithm is applied.

That is, the path cost is calculated using a user-defined cost calculation function.

A sequence of best local path determination processing of Example 2 executed by a best body path determination unit 131 of a local path planning unit 130 is described.

The basic sequence of the best local path determination processing sequence of Example 2 is a sequence similar to the processing according to the flowchart illustrated in FIG. 10 described above as the basic sequence of Example 1.

Furthermore, the processing of step S104 in the flow illustrated in FIG. 10, that is, the calculation processing sequence of the path cost (path_cost) of the selected path (path) is also the processing according to the flowchart in FIG. 16 described above in Example 1.

In Example 2, the cost calculation algorithm applied in the processing of step S202 in the flowchart in FIG. 16, that is, the calculation processing of the body pose cost (pose_cost) at the sampling point (cost calculation body position (i)) is different.

That is, the processing of steps S313 to S314, which is the cost calculation processing of the body pose cost (pose_cost) at the sampling point (cost calculation body position (i)) described with reference to FIGS. 18 to 20 in Example 1 is different.

Next, a detailed sequence of the processing of the calculation processing of the body pose cost (pose_cost) at the sampling point (cost calculation body position (i)) in Example 2 is described with reference to FIGS. 27 to 29.

The flowcharts illustrated in FIGS. 27 to 29 correspond to a detailed sequence of the processing of step S202 in the flow illustrated in FIG. 16 described in Example 1 above.

In Example 2, the calculation processing of the body pose cost (pose_cost) at one sampling point (cost calculation body position (i)) of one selected path (path) selected as the cost calculation target is executed according to processing of steps S401 to S417 illustrated in FIGS. 27 to 29.

Hereinafter, the processing of each step is described in order.

(Steps S401 to S406)

The processing of steps S401 to S406 is similar to the processing of steps S301 to S306 described above with reference to the flowchart illustrated in FIG. 16 in Example 1 described above.

In step S401, the minimum height (min_heights) and the maximum height (max_heights) of one leg of the robot 10 are set as variables as follows.

Set (min_heights) to (4-element array)

Set (max_heights) to (4-element array)

Steps S402 to S406 constitute a processing loop of processing for each leg of the robot 10.

Each of the following pieces of data (1) to (4) is calculated by executing the processing loop of steps S402 to S406.

(1) The minimum leg arrangement height (min_heights (1)) and the maximum leg arrangement height (max_heights (1)) of the left front leg (leg (1)), (2) The minimum leg arrangement height (min_heights (2)) and the maximum leg arrangement height (max_heights (2)) of the right front leg (leg (2)), (3) The minimum leg arrangement height (min_heights (3)) and the maximum leg arrangement height (max_heights (3)) of the left back leg (leg (3)), (4) The minimum leg arrangement height (min_heights (4)) and the maximum leg arrangement height (max_heights (4)) of the right back leg (leg (4)), at the cost calculation body position (i).

When the processing loop of steps S402 to S406 is completed, the process proceeds to step S411 of the flow illustrated in FIG. 28.

(Step S411)

The processing of step S411 is similar to the processing of steps S311 described above with reference to the flowchart illustrated in FIG. 17 in the above Example 1, and is preparation processing before the execution of the processing loop of steps S412 to S417.

In step S411, the worst body pose cost (worst_pose_cost) is set to minus infinity ($-\infty$).

Set worst body pose cost (worst_pose_cost) to $-\infty$

Before the processing loop of steps S412 to S417 is executed, the above cost initial setting processing is performed.

(Step S412)

Steps S412 to S417 constitute a processing loop of processing for each leg arrangement pose of the robot 10.

That is, as described with reference to FIG. 23 above, the steps are the processing loop for each of ($2 \times 2 \times 2 \times 2$)=16 ways of combination of "minimum leg arrangement height (min_heights (k))" and "maximum leg arrangement height (max_heights (k))"

for each of the legs (k=1 to 4) at the cost calculation body position (i).

Note that, as described above with reference to FIGS. 24 and 25, in a case where the sampling point (the cost calculation body position (i)) is on a plane where the leg arrangeable region of each of the legs are on the same height as illustrated above in FIGS. 24 and 25, the processing loop is only required to be executed only for the possible leg arrangement pattern.

(Step S413)

Steps S413 to S416 are processing steps sequentially executed for any one of the above 16 ways of leg arrangement patterns.

First, in step S413, the following processing is executed for one leg arrangement pattern set as the processing target.

The body pose cost calculation value (calc_pose_cos (user_algorithm) is calculated according to a cost calculation algorithm (user_algorithm) defined by a user.

Note that algorithms with various different settings can be applied as the cost calculation algorithm (user_algorithm) defined by the user. Specifically, for example, it is possible to generate and use a cost calculation algorithm that increases the calculated cost value corresponding to a robot use environment or a robot pose undesirable for the user.

As specific examples of the user-defined cost calculation algorithm, for example, the following algorithms can be considered.

(Algorithm 1) A cost calculation algorithm in which the calculation cost changes according to a magnitude of a margin to the full extension of the leg in the landing state of each leg of the robot For example, in a case where the leg is landed near the center of the arrangeable region, the leg can be freely moved in each direction in the arrangeable region, but when the leg is landed near the end of the arrangeable region, the leg can be moved only in the inward direction of the arrangeable region, and the movement of the robot 10 is limited.

The algorithm 1 is an algorithm considering such a state, and is an algorithm for calculating a low cost value in a case where the leg is landed near the center of the arrangeable region, and calculates a high cost value in a case where the leg is landed near the end of the arrangeable region.

(Algorithm 2) A cost calculation algorithm in which the calculation cost changes according to a magnitude of a roll angle of the body part in a state where all the legs of the robot are landed This is an algorithm for calculating a higher cost value as the inclination of the robot body in the roll direction becomes larger in a state where all four legs of the robot are landed.

(Algorithm 3) A cost calculation algorithm in which the calculation cost changes according to a magnitude of a pitch angle of the body part in a state where all the legs of the robot are landed This is an algorithm for calculating a higher cost value as the inclination of the robot body in the pitch direction becomes larger in a state where all four legs of the robot are landed.

(Algorithm 4) A cost calculation algorithm in which the calculation cost changes according to a height of the center of gravity of the body part in a state where all the legs of the robot are landed This is an algorithm for calculating a higher cost value as the position of the center of gravity of the robot body becomes higher or lower than a reference height in a state where all four legs of the robot are landed.

(Algorithm 5) A cost calculation algorithm in which the calculation cost changes according to a magnitude of a height difference between landing positions of all legs in a state where all the legs of the robot are landed This is an algorithm for calculating a higher cost value as the height difference between the landing positions of all the legs becomes larger in a state where all four legs of the robot are landed.

(Algorithm 6) A cost calculation algorithm in which the calculation cost changes according to a state of the traveling surface on which the legs of the robot are landed This is an algorithm for calculating a higher cost value as the state of the traveling surface on which the legs of the robot are landed becomes more difficult to be landed stably, for example, a state in which the landing surface has many irregularities, is slippery, or the like.

(Algorithm 7) A cost calculation algorithm in which the calculation cost changes according to a distance between the robot and the obstacle This is an algorithm for calculating a higher cost value as the distance between the robot and the obstacle becomes shorter.

(Algorithm 8) A cost calculation algorithm in which the calculation cost changes according to a distance between a landing position of the leg of the robot and a traveling surface step position that is the closest to the landing position This is an algorithm for calculating a higher cost value as the distance between a landing position of the leg of the robot and a traveling surface step position closest to the landing position becomes shorter.

(Algorithm 9) A cost calculation algorithm in which the calculation cost changes according to the size of a support polygon formed in a state where all the legs of the robot are landed and having a vertex at a leg landing point This is an algorithm for calculating a higher cost value as the size of a support polygon becomes smaller, the support polygon being formed in a state where all the legs of the robot are landed and having a vertex at a leg landing point.

As described above, as the cost calculation algorithm (user_algorithm) defined by the user, algorithms with various different settings, for example, any one of (Algorithm 1) to (Algorithm 9) described above, or a combination thereof, can be applied.

In step S413, the body pose cost calculation value (calc_pose_cos (user_algorithm) is calculated according to such a user-defined cost calculation algorithm (user_algorithm).

(Step S414)

Next, in step S414, the calculation processing of the body pose cost (pose_cost) for one leg arrangement pattern at one sampling point (cost calculation body position (i)) is executed.

Specifically, the following body pose cost (pose_cost) calculation processing is executed.

The calculated body pose cost calculation value (calc_pose_cos (user_algorithm) is set to body pose cost (pose_cost) according to the user-defined cost calculation algorithm (user_algorithm).

Set body pose cost (pose_cost) to body pose cost calculation value (calc_pose_cos (user_algorithm))

The body pose cost (pose_cost) calculation processing is executed according to the above formula.

The body pose cost (pose_cost) calculated in step S414 is a cost calculated by applying the cost calculation algorithm defined in the user-defined cost calculation algorithm (user_algorithm).

(Step S415)

When the body pose cost (pose_cost) calculation processing corresponding to one leg arrangement pattern at one sampling point (cost calculation body position (i)) is completed in step S414, comparison processing between the calculated body pose cost (pose_cost) and the worst body pose cost (worst_pose_cost) is executed in step S415.

That is, it is determined whether or not the following determination formula is satisfied.

body pose cost(pose_cost)>worst body pose cost (worst_pose_cost)?

The above determination formula is a determination formula for determining whether or not the body pose cost (pose_cost) corresponding to one leg arrangement pattern calculated in step S414 is a value larger than the initial setting value or the already calculated worst body pose cost (worst_pose_cost).

In a case where it is determined that the body pose cost (pose_cost) corresponding to one leg arrangement pattern calculated in step S414 is a value larger than the initial setting value or the already calculated worst body pose cost (worst_pose_cost), the determination in step S415 is Yes, and the process proceeds to step S416.

On the other hand, in a case where it is determined that the body pose cost (pose_cost) corresponding to one leg arrangement pattern calculated in step S414 is a value not larger than the initial setting value or the already calculated worst body pose cost (worst_pose_cost), the determination in step S315 is No, and the process proceeds to step S417.

(Step S416)

The processing of step S416 is executed in a case where the determination result in step S415 is Yes, that is, in a case where it is determined that the body pose cost (pose_cost) corresponding to one leg arrangement pattern calculated in step S414 is a value larger than the initial setting value or the already calculated worst body pose cost (worst_pose_cost).

In this case, in step S416, processing of setting the worst body pose cost (worst_pose_cost) to the body pose cost (pose_cost) calculated in step S414 is executed.

That is, the processing of setting the worst body pose cost (worst_pose_cost) to the body pose cost (pose_cost) calculated in step S414 is executed according to the following formula.

$$\text{Set worst body pose cost}(worst\_pose\_cost) \text{ to body pose cost}(pose\_cost)$$

(Step S417)

Step S417 is an end step of the processing loop from steps S412 to S417.

The processing of steps S413 to S416 is executed for the combination patterns of landing heights of the four legs of the robot 10 in one sampling point (cost calculation body position (i)), the patterns including 16 ways at maximum, the body pose cost (pose_cost) corresponding to each of the patterns is calculated, and the worst body pose cost (worst_pose_cost) having the highest cost among the calculated costs is calculated as the body pose cost (pose_cost).

After the processing is completed, the process proceeds to step S203 of the flow illustrated in FIG. 16.

As described above, Example 2 is an example in which the cost calculation processing is performed by applying the user-defined cost calculation algorithm (user_algorithm).

That is, in calculating the body pose cost (pose_cost) at one sampling point (cost calculation body position (i)) of one selected path selected as a cost calculation target, the body pose cost calculation value (calc_pose_cos (user_algorithm) to which the user-defined cost calculation algorithm (user_algorithm) is applied is calculated.

The user-defined cost calculation algorithm (user_algorithm) can be an algorithm that increases the calculated cost value corresponding to a robot use environment or a robot pose undesirable for the user.

Therefore, by applying Example 2, it is possible to control the robot to travel by selecting the best travel path that allows the best robot pose to be maintained according to the use environment and the desire of the user.

5. (Example 3) Example Using Six-Legged Robot

Next, as Example 3, an example using a six-legged robot is described.

Example 1 described above is an example using a four-legged robot.

As described above, the four-legged robot is only an example of the moving apparatus of the present disclosure, and processing of the present disclosure can be used in a walking robot having the optional number, which is two or more, of legs.

Hereinafter, as Example 3, an example using a six-legged robot is described.

Figure 30:
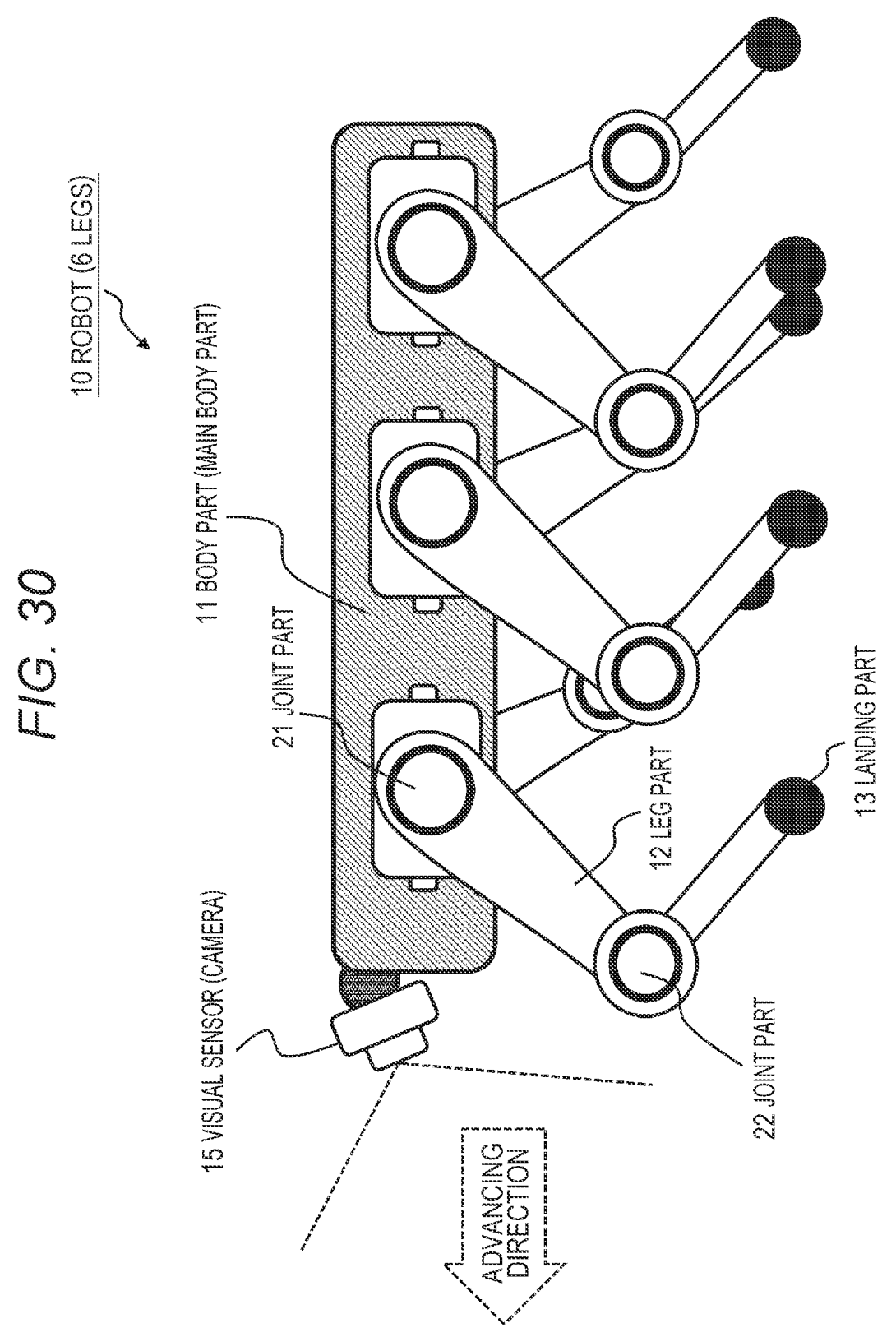
FIG. 30 is a diagram for explaining a configuration example of a six-legged robot.

FIG. 30 is a diagram illustrating a configuration example of a six-legged robot 10.

As illustrated in FIG. 30, the six-legged robot 10 includes a body part (main body part) 11, leg parts 12, landing parts 13, and a visual sensor 15 for recognizing the surrounding environment of the robot. Furthermore, each leg includes a joint part 21 and a joint part 22.

The robot 10 illustrated in FIG. 30 is a six-legged walking robot having two legs on the front, two legs on the back, and further, two legs in the middle part.

It is possible to perform leg movement, that is, walking travel by individually lifting each of the six legs and moving the legs back and forth.

As illustrated in FIG. 30, the robot 10 includes the visual sensor 15. The visual sensor 15 is a sensor for acquiring environmental information such as obstacles around the robot 10 and a traveling surface shape. For example, the visual sensor is constituted of a camera.

Note that, as the visual sensor 15, for example, any one of a monocular camera, a stereo camera, an omnidirectional camera, an infrared camera, a light detection and ranging (LiDAR) sensor, a time of flight (TOF) sensor, or the like, or a combined configuration thereof can be used.

Note that both the LiDAR and TOF sensors are sensors that can measure an object distance.

A movable configuration of each of the joint parts 21 and 22 of the six leg parts 12 is similar to the movable configuration of the joint parts of the four-legged robot described above with reference to FIGS. 2A, 2B, and 2C.

That is, the joint part 21 of the upper end of each of the six leg parts 12 is configured rotatable with respect to the body part (main body part) 11 in both the front-back direction and the left-right direction.

Moreover, the joint part 22 corresponding to the so-called knee joint, which is provided in the middle part of each of the six legs, can rotate the lower half of the leg part 12 in the front-back direction with respect to the upper part of the leg.

The configuration of the robot 10 of Example 3 to which such a six-legged robot 10 is applied is basically similar to the configuration described above with reference to FIG. 8 although the number of legs is different.

In Example 3, the processing executed in the best body path determination unit 131 of the local path planning unit 130, that is, the processing of generating the path (local path) on which the robot can safely travel while the obstacles and steps are avoided as much as possible, is the processing performed in consideration of six legs.

As described above with reference to FIG. 9, regarding the range where the obstacles and the traveling surface shape can be analyzed by the sensor 111, the best body path determination unit 131 sequentially generates the local paths (local paths indicated by the dotted lines in FIG. 9) that can be safely traveled while the obstacles and steps are avoided as much as possible.

The best body path determination unit 131 of the local path planning unit 130 sets a plurality of paths on which the robot 10 can travel within the determination section of the local path, and calculates the cost for each path. The cost is a cost whose value becomes smaller as more stable traveling is possible and whose value becomes larger as traveling becomes more unstable. The best body path determination unit 131 calculates the costs for the plurality of paths on which the robot 10 can travel and executes evaluation processing of each path.

Moreover, a path with the lowest cost, that is, a path that can exhibit stable traveling is selected on the basis of the result of the evaluation processing, and the robot travels on the selected path.

In Example 1 described above with reference to FIGS. 10, 11, 12, 13, 14, 15, 16, 17, 18, 19, 20, 21, 22A, 22B, 23, 24, 25, and 26, as the cost calculation processing of the path, the cost calculation processing is performed in which the magnitude of left and right inclination of the body part (main body part) 11 is calculated and the cost becomes higher as the magnitude of the left and right inclination becomes larger, for each of the landing patterns of the four legs of the robot 10.

In contrast, in Example 3, the cost calculation processing is performed in which the magnitude of left and right inclination of the body part (main body part) 11 is calculated and the cost becomes higher as the magnitude of the inclination becomes larger, for each of the landing patterns of the six legs of the robot 10.

A sequence of best local path determination processing of Example 3 executed by a best body path determination unit 131 of a local path planning unit 130 is described.

The basic sequence of the best local path determination processing sequence of Example 3 is a sequence similar to the processing according to the flowchart illustrated in FIG. 10 described above as the basic sequence of Example 1.

Furthermore, the processing of step S104 in the flow illustrated in FIG. 10, that is, the calculation processing sequence of the path cost (path_cost) of the selected path (path) is also the processing according to the flowchart in FIG. 16 described above in Example 1.

In Example 3, the processing of step S202 in the flow illustrated in FIG. 16, that is, a sequence of the calculation processing of the body pose cost (pose_cost) at the sampling point (cost calculation body position (i)) is different.

A detailed sequence of the calculation processing of the body pose cost (pose_cost) at the sampling point (cost calculation body position (i)) in Example 3 is described with reference to FIGS. 31 to 33.

The flowcharts illustrated in FIGS. 31 to 33 correspond to a detailed sequence of the processing of step S202 in the flow illustrated in FIG. 16 described in Example 1 above.

In Example 3, the calculation processing of the body pose cost (pose_cost) at one sampling point (cost calculation body position (i)) of one selected path (path) selected as the cost calculation target is executed according to processing of steps S501 to S517 illustrated in FIGS. 31 to 33.

Hereinafter, the processing of each step is described in order.

(Step S501)

The processing of step S501 is similar to the processing of step S301 described above with reference to the flowchart illustrated in FIG. 16 in Example 1 described above.

In step S501, the minimum height (min_heights) and the maximum height (max_heights) of one leg of the robot 10 are set as variables as follows.

Set (min_heights) to (6-element array)

Set (max_heights) to (6-element array)

(Steps S502 to S506)

Steps S502 to S506 constitute a processing loop of processing for each leg of the robot 10.

In Example 3, the robot 10 has 64 legs. While setting a leg identifier as k (k=1, 2, 3, 4, 5, and 6), a processing target leg (k) is sequentially selected, and the processing of steps S503 to S505 is executed for the selected processing target leg (k).

Each of the following pieces of data (1) to (6) is calculated by executing the processing loop of steps S502 to S506.

(1) The minimum leg arrangement height (min_heights (1)) and the maximum leg arrangement height (max_heights (1)) of the left front leg (leg (1)), (2) The minimum leg arrangement height (min_heights (2)) and the maximum leg arrangement height (max_heights (2)) of the right front leg (leg (2)), (3) The minimum leg arrangement height (min_heights (3)) and the maximum leg arrangement height (max_heights (3)) of the left middle leg (leg (3)), (4) The minimum leg arrangement height (min_heights (4)) and the maximum leg arrangement height (max_heights (4)) of the right middle leg (leg (4)), (5) The minimum leg arrangement height (min_heights (5)) and the maximum leg arrangement height (max_heights (5)) of the left back leg (leg (5)), (6) The minimum leg arrangement height (min_heights (6)) and the maximum leg arrangement height (max_heights (6)) of the right back leg (leg (6)), at the cost calculation body position (i).

When the processing loop of steps S502 to S506 is completed, the process proceeds to step S511 of the flow illustrated in FIG. 32.

(Step S511)

The processing of step S511 is similar to the processing of steps S311 described above with reference to the flowchart illustrated in FIG. 17 in Example 1, and is preparation processing before the execution of the processing loop of steps S512 to S517.

In step S511, the worst body pose cost (worst_pose_cost) is set to minus infinity $(-\infty)$.

$$\text{Set worst body pose cost(worst\_pose\_cost) to } -\infty$$

Before the processing loop of steps S512 to S517 is executed, the above cost initial setting processing is performed.

(Step S512)

Steps S512 to S517 constitute a processing loop of processing for each leg arrangement pose of the robot 10.

That is, the steps constitute the processing loop for each of (2×2×2×2×2×2)=64 ways of combination of "minimum leg arrangement height (min_heights (k))" and "maximum leg arrangement height (max_heights (k))"

for each of the legs (k=1 to 6) at the cost calculation body position (i).

However, also in the present example, as described above with reference to FIGS. 24 and 25, in a case where the sampling point (the cost calculation body position (i)) is on a plane where the leg arrangeable region of each of the legs are on the same height as illustrated above in FIGS. 24 and 25, the processing loop is only required to be executed only for the possible leg arrangement pattern.

(Step S513)

Steps S513 to S516 are processing steps sequentially executed for any one of the above 64 ways of leg arrangement patterns.

First, in step S513, the following processing is executed for one leg arrangement pattern set as the processing target.

It is assumed that f_pose is the leg arrangement pose (leg_pose (k)) in a case where the leg (k) is the front leg of the robot, m_pose is the leg arrangement pose (leg_pose (k)) in a case where the leg (k) is the middle leg of the robot, and b_pose is a leg arrangement pose (leg_pose (k)) in a case where the leg (k) is the back leg of the robot.

That is, the following data definition is executed.

Set f_pose to {leg_pose (k): leg (k) is the front leg of the robot}

Set m_pose to {leg_pose (k): leg (k) is the middle leg of the robot}

Set b_pose to {leg_pose (k): leg (k) is the back leg of the robot}

(Step S514)

Next, in step S514, the calculation processing of the body pose cost (pose_cost) corresponding to one leg arrangement pattern at one sampling point (cost calculation body position (i)) is executed.

Specifically, the following body pose cost (pose_cost) calculation processing is executed.

An addition value of a difference (max (f_pose)−min (f_pose)) between the maximum height and the minimum height of the front leg, a difference (max (m_pose)−min (m_pose)) between the maximum height and the minimum height of the middle leg, and a difference (max (b_pose)−min (b_pose)) between the maximum height and the minimum height of the back leg is calculated as the body pose cost (pose_cost).

That is, the calculation processing of the body pose cost (pose_cost) is executed according to the following formula.

$$\text{Set body pose cost(pose\_cost) to (max}(f\_\text{pose})−\text{min} \\ (f\_\text{pose}))+(\text{max}(m\_\text{pose})−\text{min}(m\_\text{pose}))+(\text{max} \\ (b\_\text{pose})−\text{min}(b\_\text{pose}))$$

The body pose cost (pose_cost) calculated in step S514 becomes higher as the difference in landing heights between the left front leg and the right front leg becomes larger, becomes higher as the difference in landing heights between the left middle leg and the right middle leg becomes larger, and moreover, becomes higher as the difference in landing heights between the left back leg and the right back leg becomes larger.

Furthermore, the body pose cost (pose_cost) becomes lower as the difference in landing heights between the left front leg and the right front leg becomes smaller, becomes lower as the difference in landing heights between the left middle leg and the right middle leg becomes smaller, and becomes lower as the difference in landing heights between the left back leg and the right back leg becomes smaller.

As described above with reference to FIGS. 12 to 15, this cost calculation algorithm is the cost calculation algorithm in which the cost becomes higher as the left and right inclination of the body part (main body part) 11 becomes larger.

(Step S515)

When the body pose cost (pose_cost) calculation processing corresponding to one leg arrangement pattern at one sampling point (cost calculation body position (i)) is completed in step S514, comparison processing between the calculated body pose cost (pose_cost) and the worst body pose cost (worst_pose_cost) is executed in step S515.

That is, it is determined whether or not the following determination formula is satisfied.

$$\text{body pose cost(pose\_cost)>worst body pose cost} \\ \text{(worst\_pose\_cost)?}$$

The above determination formula is a determination formula for determining whether or not the body pose cost (pose_cost) corresponding to one leg arrangement pattern calculated in step S514 is a value larger than the initial setting value or the already calculated worst body pose cost (worst_pose_cost).

In a case where it is determined that the body pose cost (pose_cost) corresponding to one leg arrangement pattern calculated in step S514 is a value larger than the initial setting value or the already calculated worst body pose cost (worst_pose_cost), the determination in step S515 is Yes, and the process proceeds to step S516.

On the other hand, in a case where it is determined that the body pose cost (pose_cost) corresponding to one leg arrangement pattern calculated in step S514 is a value not larger than the initial setting value or the already calculated worst body pose cost (worst_pose_cost), the determination in step S315 is No, and the process proceeds to step S517.

(Step S516)

The processing of step S516 is executed in a case where the determination result in step S515 is Yes, that is, in a case where it is determined that the body pose cost (pose_cost) corresponding to one leg arrangement pattern calculated in step S514 is a value larger than the initial setting value or the already calculated worst body pose cost (worst_pose_cost).

In this case, in step S516, processing of setting the worst body pose cost (worst_pose_cost) to the body pose cost (pose_cost) calculated in step S514 is executed.

That is, the processing of setting the worst body pose cost (worst_pose_cost) to the body pose cost (pose_cost) calculated in step S514 is executed according to the following formula.

$$\text{Set worst body pose cost(worst\_pose\_cost) to body} \\ \text{pose cost(pose\_cost)}$$

(Step S517)

Step S517 is an end step of the processing loop from steps S512 to S517.

The processing of steps S513 to S516 is executed for the combination patterns of landing heights of the six legs of the robot 10 in one sampling point (cost calculation body position (i)), the patterns including 64 ways at maximum, the body pose cost (pose_cost) corresponding to each of the patterns is calculated, and the worst body pose cost (worst_pose_cost) having the highest cost among the calculated costs is calculated as the body pose cost (pose_cost).

After the processing is completed, the process proceeds to step S203 of the flow illustrated in FIG. 16.

As described above, Example 3 is an example using the six-legged robot as illustrated in FIG. 30.

Therefore, the processing in Example 3 executed in the best body path determination unit 131 of the local path planning unit 130, that is, the processing of generating the path (local path) on which the robot can safely travel while the obstacles and steps are avoided as much as possible, is the processing performed in consideration of six legs as described with reference to the flow illustrated in FIGS. 31 to 33.

In Example 3, the best body path determination unit 131 of the local path planning unit 130 of the robot 10 executes the processing described with reference to the flow illustrated in FIGS. 31 to 33 and generates the path having the smallest cost value as the best path (best_path) for each of the local path generation sections.

The generated best path (best_path) is the path with the lowest cost and is a path on which the robot 10 can travel with the degree of occurrence of left and right inclination of the body part (main body part) 11 of the robot being minimized.

This control allows the robot 10 to travel along the best path (best_path). That is, the robot 10 can travel along the best path on which the robot can travel with the smallest left and right inclination of the body part (main body part) 11 among the plurality of path candidates.

Note that, even in a robot having the number of legs other than four and six, such as eight legs and ten legs, by performing the cost calculation processing in consideration of the arrangement pattern of the legs according to the number of legs, it is possible to generate the best travel path on which the left and right inclination of the robot can be reduced, similarly to Example 1 and Example 3.

6. Other Examples

Next, examples different from the above-described examples are described.

The following three examples are described.

(Example 4) Example using six-dimensional data (x,y,z, roll,pitch,yaw) as body pose (Example 5) Example of setting in which degrees of freedom of joint parts of legs of robot are different (Example 6) Example of robot that operates by receiving command from user terminal (Example 4) Example Using Six-Dimensional Data (x,y,z,Roll,Pitch,Yaw) as Body Pose First, as (Example 4), an example using six-dimensional data (x,y,z,roll,pitch,yaw) as the body pose is described.

In Example 1 and the like described above, three-dimensional data (x,y,θ) including the position (x,y) on the horizontal plane of the robot 10 and the angle (θ) indicating the orientation of the robot 10 is used as the body pose of the robot 10.

That is, the target body pose generation unit 122 of the global path planning unit 120 of the robot 10 illustrated in FIG. 8 generates three-dimensional data including the position (x,y) on the horizontal plane of the robot 10 and the angle (θ) indicating the orientation of the robot 10, that is, (x,y,θ) as the body pose of the robot at each position when the robot travels on the global path generated by the global path generation unit 121.

Furthermore, the best body path determination unit 131 of the local path planning unit 130 generates the local path so as to be in the body pose (x,y,θ) generated by the target body pose generation unit 122 at each end position of each local path, for example, at each sub-goal position illustrated in FIG. 9.

As described in the above examples, the three-dimensional data (x,y,θ) including the position (x,y) on the horizontal plane of the robot 10 and the angle (θ) indicating the orientation of the robot 10 is used as the body pose of the robot 10.

The body pose of the robot 10 is not limited to such three-dimensional data (x,y,θ), but other data can be used.

For example, a configuration may be adopted, the configuration using 6-dimensional data (x,y,z,roll,pitch,yaw) including a position (x,y,z) of the robot 10 in a three-dimensional space and (roll, pitch, yaw) which is a rotation angle around the three xyz axes as the body pose.

In this case, the target body pose generation unit 122 of the global path planning unit 120 of the robot 10 illustrated in FIG. 8 generates, as the body pose of the robot at each position when traveling on the global path generated by the global path generation unit 121, six-dimensional data (x,y,z,roll,pitch,yaw) including the position (x,y,z) of the robot 10 in a three-dimensional space and (roll, pitch, yaw) which is a rotation angle around the three xyz axes.

Furthermore, the best body path determination unit 131 of the local path planning unit 130 generates the local path so as to be in the body pose (x,y,z,roll,pitch,yaw) generated by the target body pose generation unit 122 at each end position of each local path, for example, at each sub-goal position illustrated in FIG. 9.

(Example 5) Example of Setting in which Degrees of Freedom of Joint Parts of Legs of Robot are Different Next, as (Example 5), an example of setting in which degrees of freedom of joint parts of legs of a robot are different is described.

In the example described above, for example, in Example 1, the leg of the robot 10 is configured such that, as described above with reference to FIGS. 2A, 2B, and 2C, the joint part 21 at the upper end of each of the leg parts 12 is rotatable with respect to the body part (main body part) 11 in both the front-back direction and the left-right direction.

Moreover, the joint part 22 corresponding to the so-called knee joint, which is provided in the middle part of each of the legs, can rotate the lower half of the leg part 12 in the front-back direction with respect to the upper part of the leg.

The configuration of the leg described with reference to FIGS. 2A, 2B, and 2C are examples of a walking robot, but the movable configuration of the leg varies depending on the robot.

For example, as described with reference to FIGS. 2A, 2B, and 2C, the leg of the robot 10 of Example 1 has a configuration in which the joint part 21 at the upper end of each of the leg parts 12 is rotatable in both the front-back direction and the left-right direction with respect to the body part (main body part) 11, but there is also a robot having a configuration in which the joint part 21 at the upper end of each of the leg parts 12 is rotatable only in the front-back direction with respect to the body part (main body part) 11.

Such a robot configuration is described with reference to FIGS. 34, 35A, 35B, and 35C.

Figure 34:
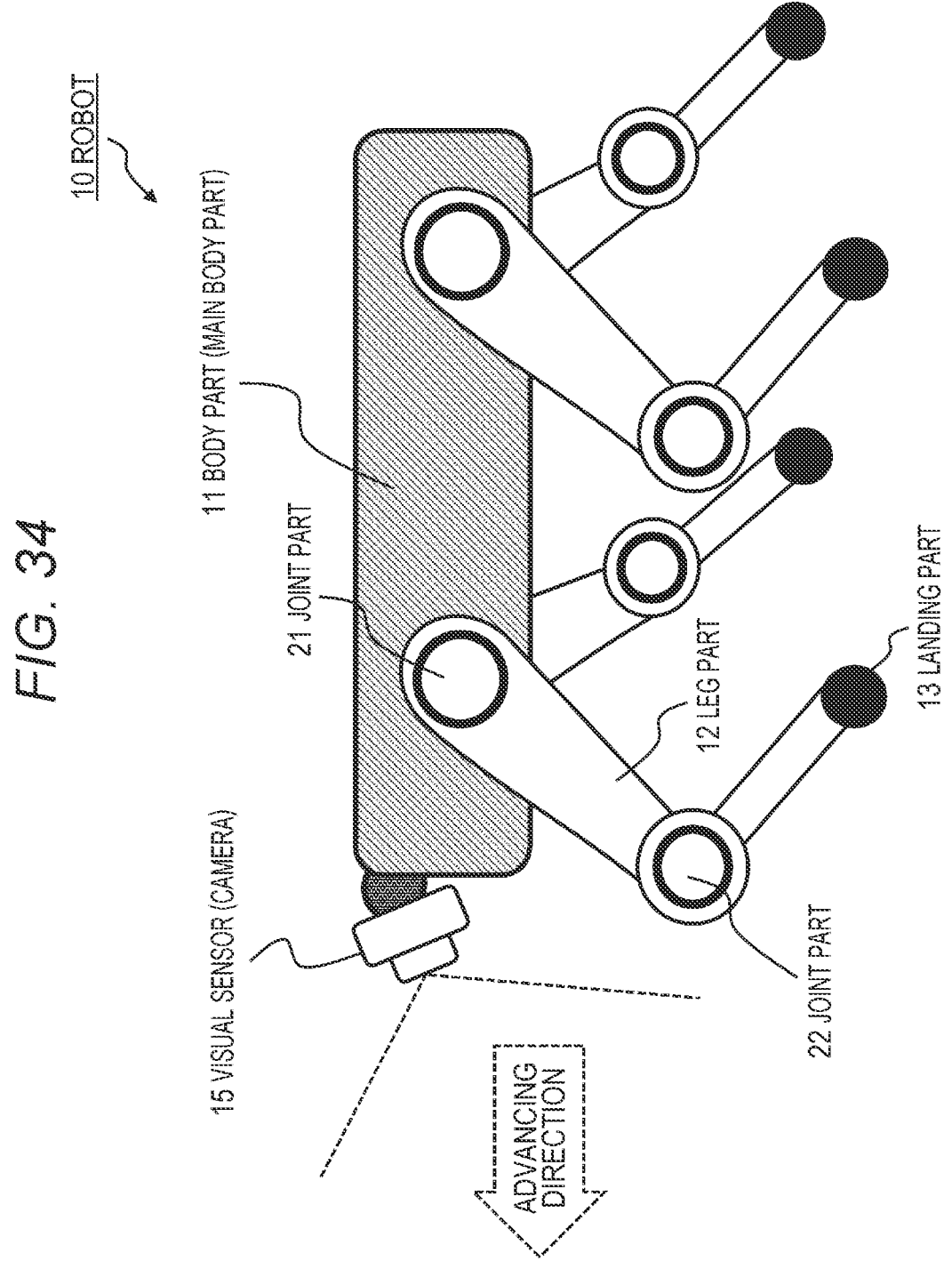
FIG. 34 is a diagram for explaining a configuration example of a four-legged robot.

FIG. 34 illustrates an example of a robot 10 having a configuration in which joint part 21 at the upper end of each of leg parts 12 is rotatable with respect to a body part (main body part) 11 only in the front-back direction.

The robot 10 illustrated in FIG. 34 includes the body part (main body part) 11, the leg parts 12, landing parts 13, and a visual sensor 15 for recognizing the surrounding environment of the robot. Furthermore, each leg includes a joint part 21 and a joint part 22.

The robot 10 illustrated in FIG. 34 is a four-legged walking robot having two legs on the front and two legs on the back.

The robot can perform leg movement, that is, walking travel by individually lifting each of the four legs and moving the legs back and forth.

A detailed configuration example of the robot 10 illustrated in FIG. 34 is described with reference to FIGS. 35A, 35B, and 35C.

Figure 35:
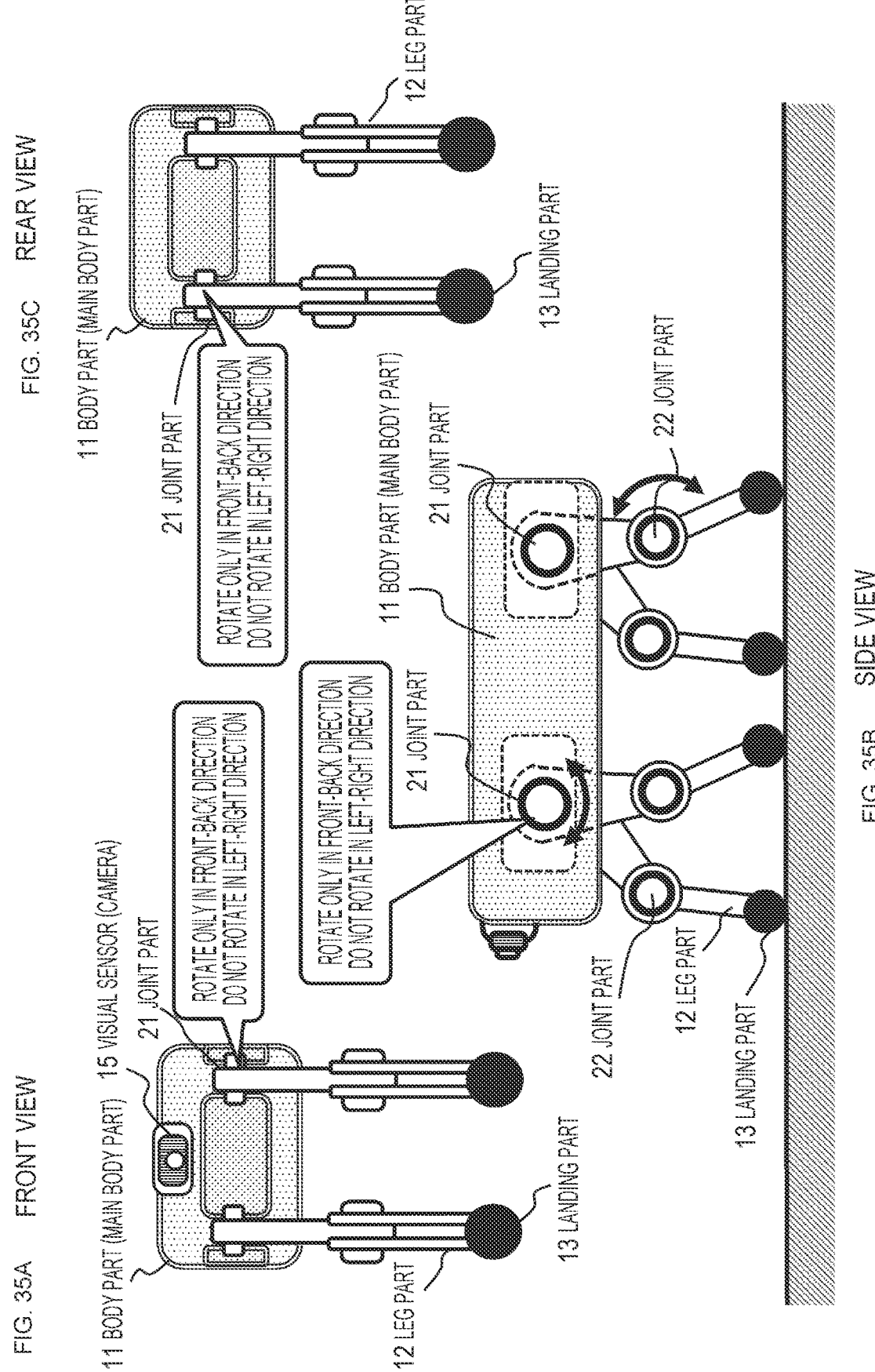
FIGS. 35A, 35B, and 35C are diagrams for explaining a configuration example of the four-legged robot.

FIGS. 35A, 35B, and 35C include three diagrams illustrating

FIG. 35A a front view,

FIG. 35B a side view, and

FIG. 35C a rear view, of the robot 10 illustrated in FIG. 34

As understood from FIG. 35A the front view and FIG. 35C the rear view, the robot 10 of Example 5 is different from the robot 10 in Example 1 in that the upper end of each of the leg parts 12 with respect to the body part (main body part) 11, that is, the joint part 21 of the leg attachment part is not configured rotatable in the left-right direction when viewed from the front surface and the back surface of the robot.

Furthermore, as understood from FIG. 35B the side view, the joint part 21 at the upper end of each of the leg parts 12 is also configured rotatable only in the front-back direction.

As described above, the joint part 21 at the upper end of each of leg parts 12 of the robot 10 of Example 5 is configured rotatable with respect to the body part (main body part) 11 only in the front-back direction.

Note that, as understood from FIG. 35B the side view, the joint part 22 corresponding to a so-called knee joint is provided in the middle part of each leg. The joint part 22 can rotate the lower half of the leg part 12 in the front-back direction with respect to the upper part of the leg.

Even in a case where such a robot having a different movable direction of the legs are used, the processing of the present disclosure, that is, the best path setting processing by cost calculation can be performed.

However, in a case where the movable range of the leg part 12 of the robot 10 is only in the front-back direction as described above, the leg arrangeable region is different from the setting of Example 1 described above.

That is, in Example 1 described above, in steps S303 to S305 of the flowchart in FIG. 18, the leg arrangeable region indicated by the circular solid line illustrated in FIG. 21 is calculated, and the minimum leg arrangement height (min_heights (k)) and the maximum leg arrangement height (max_heights (k)) in this circular leg arrangeable region are calculated.

Figure 36:
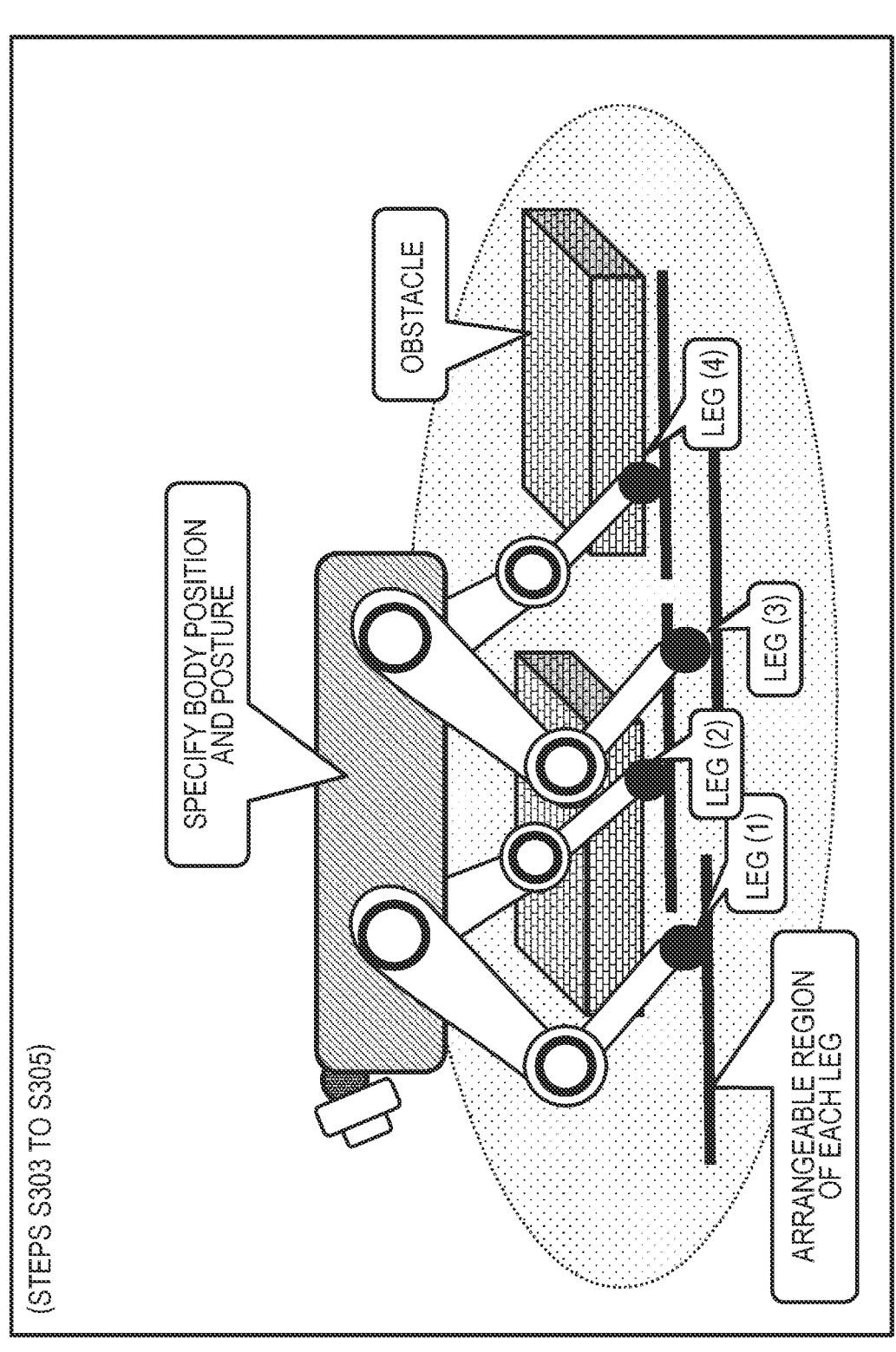
FIG. 36 is a diagram for explaining a specific example of processing executed by the best body path determination unit.

On the other hand, in a case where the movable range of the leg part 12 of the robot 10 is only the front-back direction, the leg arrangeable region is set as illustrated in FIG. 36.

That is, the arrangeable region of each leg is a linear region extending in the front-back direction of the robot 10.

Therefore, in a case of Example 5, in steps S303 to S305 of the flow illustrated in FIG. 18, the processing of calculating the minimum leg arrangement height (min_heights (k)) and the maximum leg arrangement height (max_heights (k)) in the linear leg arrangeable region corresponding to each leg is performed.

(Example 6) Example of Robot that Operates by Receiving Command from User Terminal Next, as (Example 6), an example of a robot that operates by receiving a command from a user terminal is described.

Figure 37:
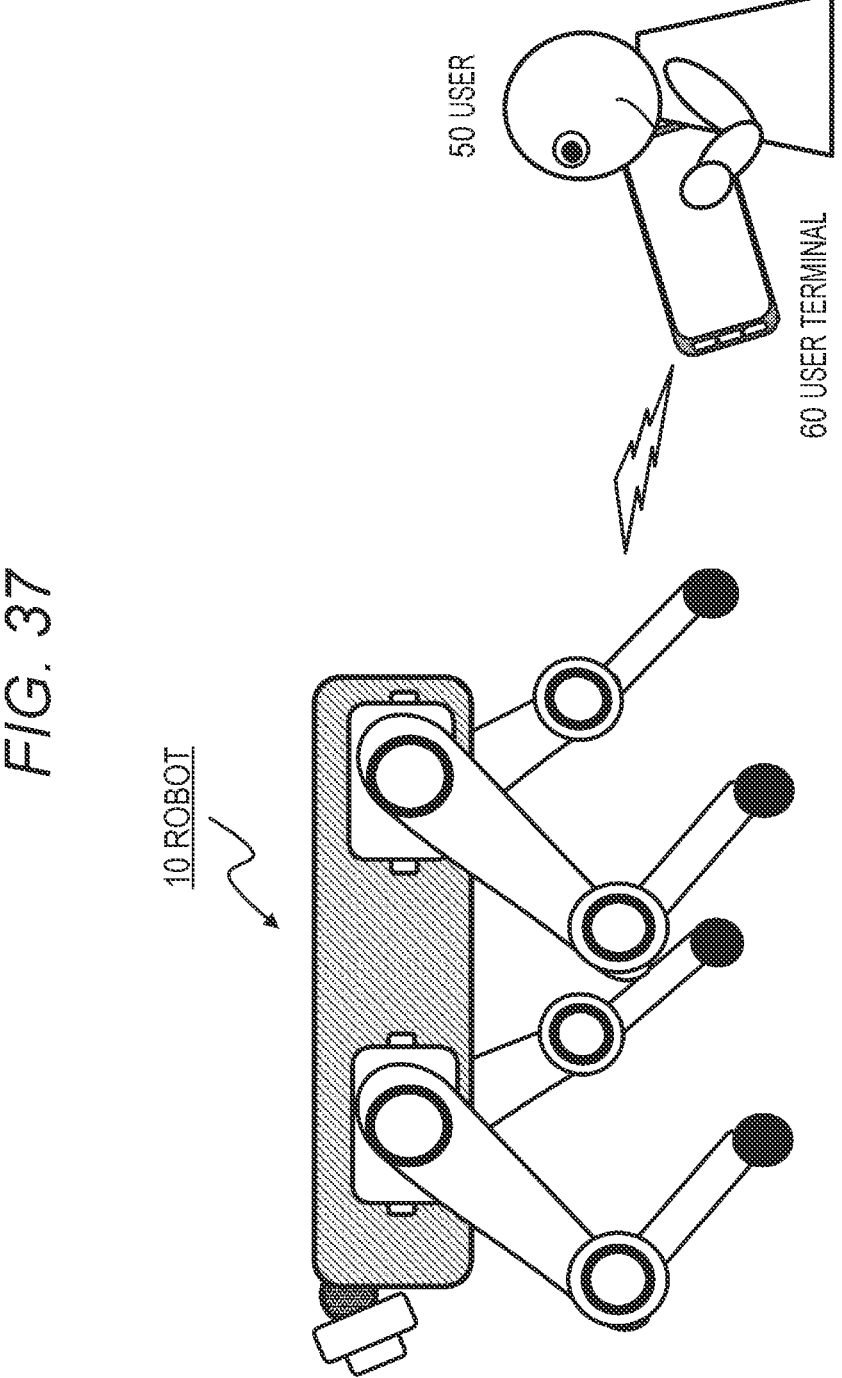
FIG. 37 is a diagram for explaining an example of robot control controlled by data received from a controller operated by a user.

Although the robot apparatus 10 can autonomously travel under the control of the robot 10 itself, for example, as illustrated in FIG. 37, the robot apparatus can also travel by receiving an instruction command such as start of traveling, stop of traveling, or course change from a user terminal 60 operated by a user 50.

Note that a control device (information processing device) for controlling the robot is mounted on the robot 10. The control device inputs detection signals from various sensors and encoders attached to the robot 10, analyzes a position (three-dimensional position) and movement of each leg by analyzing the input signals, and drives and controls each leg on the basis of the analysis result.

7. Hardware Configuration Example of Moving Apparatus of the Present Disclosure

Next, a hardware configuration example of the moving apparatus of the present disclosure is described.

Figure 38:
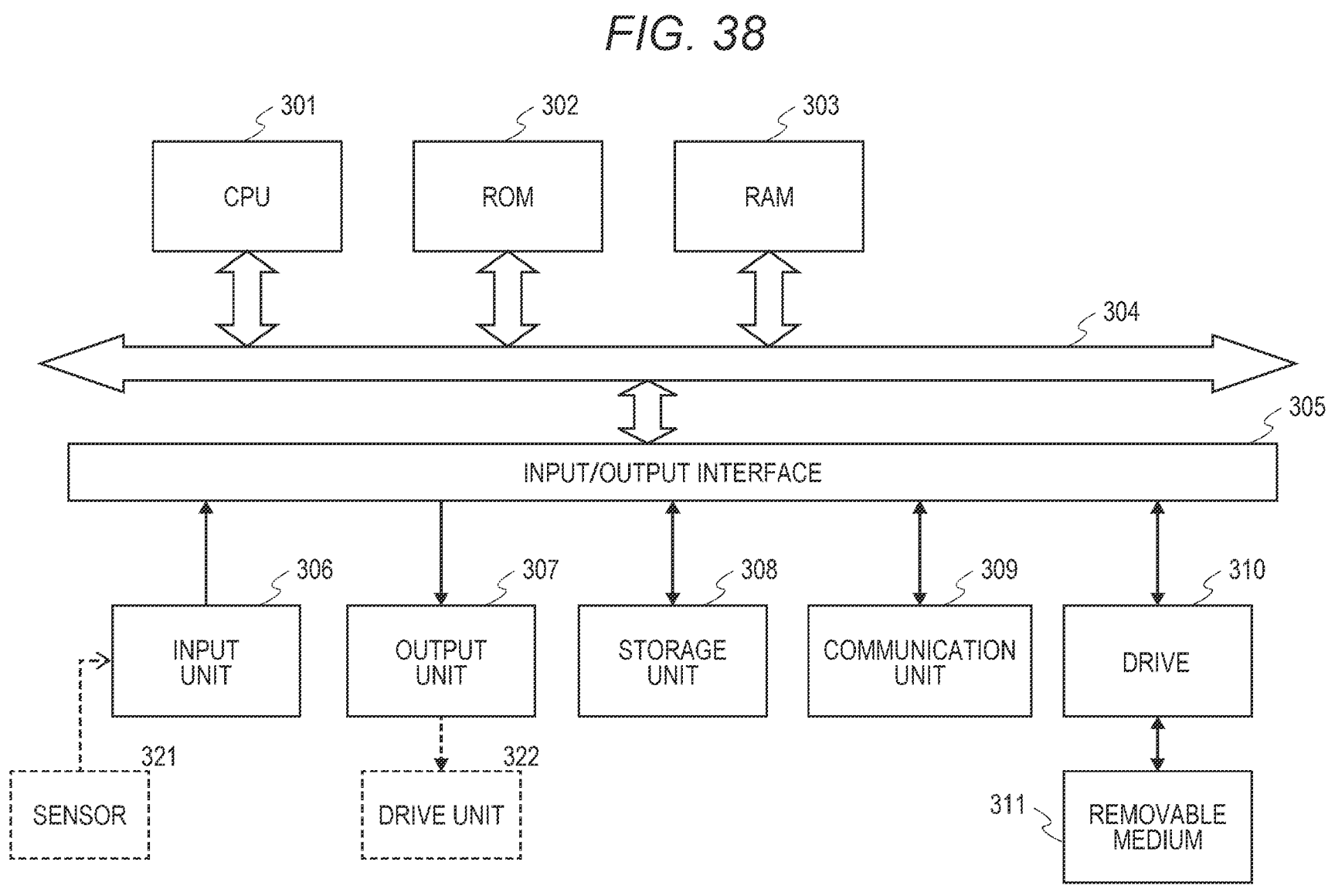

An example of the hardware configuration of the moving apparatus such as the robot 10 of the present disclosure is described with reference to FIG. 38.

A central processing unit (CPU) 301 functions as a data processing unit that performs various types of processing in accordance with a program stored in a read only memory (ROM) 302 or a storage unit 308. For example, processing according to the sequences described in the examples described above is performed. A random access memory (RAM) 303 stores programs, data, and the like to be performed by the CPU 301. The CPU 301, the ROM 302, and the RAM 303 are connected to each other by a bus 304.

The CPU 301 is connected to an input/output interface 305 via the bus 304, and the input/output interface 305 is connected with an input unit 306 including various switches, a touch panel, a mouse, a microphone, a user input unit, and the like, and an output unit 307 including a display, a speaker, and the like.

Note that, the input unit 306 is connected with sensor detection information from various sensors 321 such as a camera and a LiDAR.

The output unit 307 also outputs drive information for a drive unit 322 that drives the moving apparatus.

The CPU 301 inputs commands, status data, and the like input from the input unit 306, executes various types of processing, and outputs processing results to, for example, the output unit 307.

The storage unit 308 connected to the input/output interface 305 includes, for example, a flash memory, a hard disk, or the like, and stores a program executed by the CPU 301 or various types of data.

A communication unit 309 functions as a transmission/reception unit for data communication via a network such as the Internet or a local area network, and communicates with an external device.

Furthermore, in addition to the CPU, a graphics processing unit (GPU) may be provided as a dedicated processing unit for image information and the like input from the camera.

A drive 310 connected to the input/output interface 305 drives a removable medium 311 such as a magnetic disk, an optical disk, a magneto-optical disk, or a semiconductor memory such as a memory card, and records or reads data.

8. Summary of Configuration of Present Disclosure

Hereinabove, the embodiment according to the present disclosure have been described in detail with reference to the specific examples. However, it is obvious that those skilled in the art can modify or substitute the examples without departing from the gist of the present disclosure. That is, the present invention has been disclosed in the form of exemplification, and should not be interpreted in a limited manner. In order to determine the gist of the present disclosure, the claims should be taken into consideration.

Note that the technology disclosed in the present description can have the following configurations.

(1) A moving apparatus including a path planning unit that determines a travel path of the moving apparatus, in which the path planning unit is configured to:

calculate a path cost for each of a plurality of path candidates by applying a cost calculation algorithm in which a path that enables more stable traveling has a lower cost; and determine the path candidate having the path cost that has been calculated to be the lowest cost as the travel path that is best.

(2) The moving apparatus according to (1), in which the path planning unit calculates the path cost by applying a cost calculation algorithm in which a cost becomes higher as a magnitude of an inclination of the moving apparatus becomes larger.

(3) The moving apparatus according to (1) or (2), in which the path planning unit calculates the path cost by applying a cost calculation algorithm in which a cost becomes higher as a magnitude of a left and right inclination of a body part of the moving apparatus becomes larger.

(4) The moving apparatus according to any one of (1) to (3), in which the path planning unit is configured to:

set a plurality of sampling points in a path of the path candidates for each of the plurality of path candidates and calculate a cost corresponding to each of the sampling points; and calculate an addition value of the costs of the plurality of sampling points set in one path candidate as the path cost of the path candidate.

(5) The moving apparatus according to (4), in which the path planning unit calculates the cost corresponding to each of the sampling points by applying a cost calculation algorithm in which the cost becomes higher as the magnitude of the left and right inclination of the body part of the moving apparatus becomes larger.

(6) The moving apparatus according to (4) or (5), the moving apparatus being a walking moving apparatus having a plurality of legs, in which the path planning unit calculates a cost corresponding to each of the sampling points by applying a cost calculation algorithm in which the cost becomes higher as a difference between landing heights of left and right legs at each of the sampling points becomes larger.

(7) The moving apparatus according to (6), in which the path planning unit is configured to:

analyze a plurality of leg arrangement patterns of the moving apparatus at each of the sampling points;

calculate a cost for each of the plurality of leg arrangement patterns; and calculate a cost corresponding to the leg arrangement pattern for which a highest cost is calculated as a cost corresponding to sampling.

(8) The moving apparatus according to (7), in which the path planning unit is configured to:

analyze an arrangeable region of each of the legs of the moving apparatus at each of the sampling points;

calculate a maximum value and a minimum value of a landing height of each of the legs in the arrangeable region of each of the legs; and calculate a cost for each of the plurality of leg arrangement patterns including different combinations of the maximum value and the minimum value of the landing height of each of the legs of the moving apparatus.

(9) The moving apparatus according to (8), in which the path planning unit is configured to:

analyze environment information acquired by a sensor of the moving apparatus; and calculate the maximum value and the minimum value of the landing height of each of the legs in the arrangeable region of each of the legs.

(10) The moving apparatus according to any one of (1) to (9), further including:

a global path planning unit that plans a global path of the moving apparatus;

a local path planning unit that plans a local path on which stable travel is possible in each of partial paths of the global path planned by the global path planning unit, in which the path planning unit is a constituent element in the local path planning unit, and is configured to:

generate a plurality of path candidates as the local paths;

calculate the path cost for each of the plurality of path candidates that has been generated, by applying a cost calculation algorithm in which a path that enables more stable traveling has a lower cost; and determine the path candidate having the path cost that is calculated to be lowest as the travel path that is best.

(11) The moving apparatus according to (10) further including a moving apparatus control unit that generates drive information that causes the moving apparatus to travel along the travel path that is best, the travel path being determined by the local path planning unit.

(12) The moving apparatus according to (10) or (11), in which the global path planning unit includes a target body pose generation unit that generates a target body pose of the moving apparatus on the global path planned by the global path planning unit, and the path planning unit generates a plurality of path candidates that can maintain the target body pose generated by the target body pose generation unit.

(13) The moving apparatus according to (12), in which the target body pose of the moving apparatus is three-dimensional data $(x,y,\theta)$ including a position $(x,y)$ on an xy plane of the moving apparatus and an orientation $(\theta)$ of the moving apparatus.

(14) The moving apparatus according to any one of (1) to (13), in which the path planning unit calculates the path cost by applying a user-defined cost calculation algorithm that follows a user definition.

(15) The moving apparatus according to (14), in which the user-defined cost calculation algorithm is any one of algorithms (a) to (g) or a combination of the algorithms, the user-defined cost calculation algorithm including:

(a) a cost calculation algorithm in which the calculation cost changes according to a magnitude of a margin to a full extension of the leg in a landed state of each of the legs of the moving apparatus;

(b) a cost calculation algorithm in which the calculation cost changes according to a magnitude of a roll angle or a pitch angle of a body part in the landed state of each of the legs of the moving apparatus;

(c) a cost calculation algorithm in which the calculation cost changes according to a height of a center of gravity of the body part in the landed state of each of the legs of the moving apparatus;

(d) a cost calculation algorithm in which the calculation cost changes according to a state of a traveling surface on which the legs of the moving apparatus are landed;

(e) a cost calculation algorithm in which the calculation cost changes according to a distance between the moving apparatus and an obstacle;

(f) a cost calculation algorithm in which a calculation cost changes according to a distance between a landing position of each of the legs of the moving apparatus and a traveling surface step position that is closest to the landing position; and (g) a cost calculation algorithm in which the calculation cost changes according to a size of a support polygon having a vertex at a leg landing point formed in a state where each of the legs of the moving apparatus is in the landed state.

(16) The moving apparatus according to (1), in which the moving apparatus is a walking robot having a plurality of two or more legs.

(17) A moving apparatus control method executed in a moving apparatus, in which the moving apparatus includes a path planning unit that determines a travel path of the moving apparatus, and the path planning unit is configured to:

calculate a path cost for each of a plurality of path candidates by applying a cost calculation algorithm in which a path that enables more stable traveling has a lower cost; and determine the path candidate having the path cost that has been calculated to be a lowest cost as the travel path that is best.

(18) A program that executes moving apparatus control processing in a moving apparatus, in which the moving apparatus includes a path planning unit that determines a travel path of the moving apparatus, and the program causes the path planning unit to:

calculate a path cost for each of a plurality of path candidates by applying a cost calculation algorithm in which a path that enables more stable traveling has a lower cost; and determine the path candidate having the path cost that has been calculated to be a lowest cost as the travel path that is best.

Note that a series of processing described in the description can be executed by hardware, software, or a combined configuration of the both. In a case where processing by software is executed, a program in which a processing sequence is recorded can be installed and executed in a memory in a computer incorporated in dedicated hardware, or the program can be installed and executed in a general-purpose computer capable of executing various types of processing. For example, the program can be recorded in advance in a recording medium. In addition to being installed on a computer from the recording medium, a program can be received via a network such as a local area network (LAN) or the Internet and installed on a recording medium such as an internal hard disk or the like.

Furthermore, the various types of processing described in the description may be performed not only in time series as described, but also in parallel or individually in accordance with the processing capability of the device that performs the processing or as necessary. Furthermore, a system described in the description is a logical set configuration of a plurality of devices, and is not limited to a system in which devices of respective configurations are in the same housing.

INDUSTRIAL APPLICABILITY

As described above, according to a configuration of one embodiment of the present disclosure, an apparatus and a method for efficiently determining a best path on which a moving apparatus such as a walking robot can safely travel are realized.

Specifically, for example, the configuration includes a path planning unit that determines a travel path of the moving apparatus such as a walking robot, and the path planning unit is configured to calculate a path cost for each of a plurality of path candidates by applying a cost calculation algorithm in which a path that enables more stable traveling has a lower cost and to determine the path candidate having the path cost that has been calculated to be the lowest cost as the travel path that is best. The path planning unit sets a plurality of sampling points in a path, calculates a cost corresponding to each sampling point by applying the cost calculation algorithm in which the cost becomes higher as the difference between landing heights of the left and right legs at each sampling point becomes larger, and calculates an addition value of the costs of the sampling points as the path cost.

According to the present configuration, an apparatus and a method that efficiently determine a best path on which a moving apparatus such as a walking robot can safely travel are realized.

REFERENCE SIGNS LIST

10 Robot
11 Body part (Main body part)

46

12 Leg part
13 Landing part
15 Visual sensor
21, 22 Joint part
50 User
60 User terminal
110 Environment information analysis unit
111 Sensor
112 Environmental map generation unit
120 Global path planning unit
121 Global path generation unit
122 Target body pose generation unit
130 Local path planning unit
131 Best body path determination unit
132 path following target speed calculation unit
140 Moving apparatus control unit
141 Drive information generation unit
301 CPU
302 ROM
303 RAM
304 Bus
305 Input/output interface
306 Input unit
307 Output unit
308 Storage unit
309 Communication unit
310 Drive
311 Removable medium
321 Sensor
322 Drive unit

The invention claimed is:

1. A moving apparatus, comprising:

a Central Processing Unit (CPU) configured to:

determine a plurality of path candidates of the moving apparatus, wherein the moving apparatus has a plurality of legs, and the plurality of legs includes a left leg and a right leg;

set a plurality of sampling points in a path of each of the plurality of path candidates, wherein the plurality of sampling points includes a first sampling point and a second sampling point;

calculate a respective pose cost corresponding to each of the plurality of sampling points for the each of the plurality of path candidates, wherein the calculation of the respective pose cost corresponding to the each of the plurality of sampling points is based on a cost calculation algorithm, and in the cost calculation algorithm:

a first path candidate of the plurality of path candidates that enables a more stable travel of the moving apparatus than a second path candidate of the plurality of path candidates, has a first path cost lower than a second path cost of the second path candidate, a first difference between a first landing height of the left leg and a second landing height of the right leg for the first sampling point is larger than a second difference between a third landing height of the left leg and a fourth landing height of the right leg for the second sampling point, and a first pose cost at the first sampling point is higher than a second pose cost at the second sampling point, based on the first difference that is larger than the second difference;

calculate an addition value of pose costs of the plurality of sampling points for a specific path candidate of the plurality of path candidates as a specific path cost of the specific path candidate, wherein the calculation of the addition value of the pose costs of the plurality of sampling points is based on the respective pose cost corresponding to the each of the plurality of sampling points;

determine the specific path candidate of the plurality of path candidates as a travel path of the moving apparatus, wherein the specific path cost of the specific path candidate is a lowest among path costs of the plurality of path candidates; and control the moving apparatus to travel along the travel path based on the determined specific path candidate.

2. The moving apparatus according to claim 1, wherein in the cost calculation algorithm:

a first magnitude of an inclination of the moving apparatus for a third sampling point of the plurality of sampling points is larger than a second magnitude of the inclination of the moving apparatus for a fourth sampling point of the plurality of sampling points, and a third pose cost of the third sampling point is higher than a fourth pose cost of the fourth sampling point, based on the first magnitude of the inclination that is larger than the second magnitude of the inclination.

3. The moving apparatus according to claim 1, wherein in the cost calculation algorithm:

a first magnitude of a left and right inclination of a body part of the moving apparatus for a third sampling point of the plurality of sampling points is larger than a second magnitude of the left and right inclination of the moving apparatus for a fourth sampling point of the plurality of sampling points, and a third pose cost of the third sampling point is higher than a fourth pose cost of the fourth sampling point, based on the first magnitude of the left and right inclination that is larger than the second magnitude of the left and right inclination.

4. The moving apparatus according to claim 1, wherein the CPU is further configured to:

analyze a plurality of leg arrangement patterns of the moving apparatus at the each of the plurality of sampling points, wherein the plurality of leg arrangement patterns includes an arrangement pattern of each of the plurality of legs of the moving apparatus;

calculate a corresponding pose cost for each of the plurality of leg arrangement patterns; and determine a specific pose cost for a specific leg arrangement pattern of the plurality of leg arrangement patterns as a target cost, wherein the determination of the specific pose cost is based on the calculation of the corresponding pose cost, the specific pose cost is determined as the target cost for the calculation of the respective pose cost corresponding to the each of the plurality of sampling points, and the specific pose cost for the specific leg arrangement pattern is a highest pose cost among pose costs for the plurality of leg arrangement patterns.

5. The moving apparatus according to claim 4, wherein the CPU is further configured to:

analyze a corresponding arrangeable region of the each of the plurality of legs of the moving apparatus at the each of the plurality of sampling points; and calculate each of a maximum value and a minimum value of a respective landing height of the each of the plurality of legs in the corresponding arrangeable region, wherein the pose costs for the plurality of leg arrangement patterns includes a respective pose cost of each of a plurality of combinations of the maximum value and the minimum value of the respective landing height.

6. The moving apparatus according to claim 5, further comprising a sensor configured to acquire environment information, wherein the CPU is further configured to:

analyze the acquired environment information; and calculate the each of the maximum value and the minimum value of the respective landing height based on the analysis of the environment information.

7. The moving apparatus according to claim 1, wherein the CPU is further configured to:

generate a global path of the moving apparatus;

generate a local path based on movement of the moving apparatus that is stable in each of a plurality of partial paths of the generated global path;

generate the plurality of path candidates as local paths, wherein the local paths include the local path; and calculate a corresponding path cost for the each of the plurality of path candidates based on the cost calculation algorithm.

8. The moving apparatus according to claim 7, wherein the CPU is further configured to generate drive information to control the moving apparatus to travel along the travel path.

9. The moving apparatus according to claim 7, wherein the CPU is further configured to:

generate a target body pose of the moving apparatus based on the global path; and generate the plurality of path candidates to maintain the target body pose of the moving apparatus.

10. The moving apparatus according to claim 9, wherein the target body pose of the moving apparatus is three-dimensional data $(x,y,\theta)$ including a position $(x,y)$ on an xy plane of the moving apparatus and an orientation $(\theta)$ of the moving apparatus.

11. The moving apparatus according to claim 1, wherein the cost calculation algorithm includes a user-defined cost calculation algorithm that follows a user definition.

12. The moving apparatus according to claim 11, wherein the user-defined cost calculation algorithm includes at least one of:

a first cost calculation algorithm, wherein in the first cost calculation algorithm, the respective pose cost changes based on a magnitude of a margin to a full extension of a leg in a landed state of each of the plurality of legs of the moving apparatus;

a second cost calculation algorithm, wherein in the second cost calculation algorithm, the respective pose cost changes based on a magnitude of one of a roll angle or a pitch angle of a body part of the moving apparatus in the landed state of the each of the plurality of legs of the moving apparatus;

a third cost calculation algorithm, wherein in the third cost calculation algorithm, the respective pose cost changes based on a height of a center of gravity of the body part in the landed state of the each of the plurality of legs of the moving apparatus;

a fourth cost calculation algorithm, wherein in the fourth cost calculation algorithm, the respective pose cost changes based on a state of a traveling surface on which at least one leg of the plurality of legs of the moving apparatus is landed;

a fifth cost calculation algorithm, wherein in the fifth cost calculation algorithm, the respective pose cost changes based on a distance between the moving apparatus and an obstacle;

a sixth cost calculation algorithm, wherein in the sixth cost calculation algorithm, the respective pose cost changes based on a distance between a corresponding landing position of the each of the plurality of legs of the moving apparatus and a traveling surface step position that is closest to the corresponding landing position; and a seventh cost calculation algorithm, wherein in the seventh cost calculation algorithm, the respective pose cost changes based on a size of a support polygon, and the support polygon has a vertex at a leg landing point in a state where the each of the plurality of legs of the moving apparatus is in the landed state.

13. The moving apparatus according to claim 1, wherein the moving apparatus includes a walking robot, and the walking robot includes the plurality of legs.

14. A moving apparatus control method executed in a moving apparatus, the moving apparatus control method comprising:

determining a plurality of path candidates of the moving apparatus, wherein the moving apparatus has a plurality of legs, and the plurality of legs includes a left leg and a right leg;

setting a plurality of sampling points in a path of each of the plurality of path candidates, wherein the plurality of sampling points includes a first sampling point and a second sampling point;

calculating a respective pose cost corresponding to each of the plurality of sampling points for the each of the plurality of path candidates, wherein the calculation of the respective pose cost corresponding to the each of the plurality of sampling points is based on a cost calculation algorithm, and in the cost calculation algorithm:

a first path candidate of the plurality of path candidates that enables a more stable travel of the moving apparatus than a second path candidate of the plurality of path candidates, has a first path cost lower than a second path cost of the second path candidate, a first difference between a first landing height of the left leg and a second landing height of the right leg for the first sampling point is larger than a second difference between a third landing height of the left leg and a fourth landing height of the right leg for the second sampling point, and a first pose cost at the first sampling point is higher than a second pose cost at the second sampling point, based on the first difference that is larger than the second difference;

calculating an addition value of pose costs of the plurality of sampling points for a specific path candidate of the plurality of path candidates as a specific path cost of the specific path candidate, wherein the calculation of the addition value of the pose costs of the plurality of sampling points is based on the respective pose cost corresponding to the each of the plurality of sampling points;

determining the specific path candidate of the plurality of path candidates as a travel path of the moving apparatus, wherein the specific path cost of the specific path candidate is a lowest among path costs of the plurality of path candidates; and controlling the moving apparatus to travel along the travel path based on the determined specific path candidate.

15. A non-transitory computer-readable medium having stored thereon, computer-executable instructions which, when executed by a computer, cause the computer to execute operations for a moving apparatus, the operations comprising:

determining a plurality of path candidates of the moving apparatus, wherein the moving apparatus has a plurality of legs, and the plurality of legs includes a left leg and a right leg;

setting a plurality of sampling points in a path of each of the plurality of path candidates, wherein the plurality of sampling points includes a first sampling point and a second sampling point;

calculating a respective pose cost corresponding to each of the plurality of sampling points for the each of the plurality of path candidates, wherein the calculation of the respective pose cost corresponding to the each of the plurality of sampling points is based on a cost calculation algorithm, and in the cost calculation algorithm:

a first path candidate of the plurality of path candidates that enables a more stable travel of the moving apparatus than a second path candidate of the plurality of path candidates, has a first path cost lower than a second path cost of the second path candidate, a first difference between a first landing height of the left leg and a second landing height of the right leg for the first sampling point is larger than a second difference between a third landing height of the left leg and a fourth landing height of the right leg for the second sampling point, and a first pose cost at the first sampling point is higher than a second pose cost at the second sampling point, based on the first difference that is larger than the second difference;

calculating an addition value of pose costs of the plurality of sampling points for a specific path candidate of the plurality of path candidates as a specific path cost of the specific path candidate, wherein the calculation of the addition value of the pose costs of the plurality of sampling points is based on the respective pose cost corresponding to the each of the plurality of sampling points;

determining the specific path candidate of the plurality of path candidates as a travel path of the moving apparatus, wherein the specific path cost of the specific path candidate is a lowest among path costs of the plurality of path candidates; and controlling the moving apparatus to travel along the travel path based on the determined specific path candidate.

\* \* \* \* \*